US012278421B2

(12) United States Patent
Lee et al.

(10) Patent No.: US 12,278,421 B2
(45) Date of Patent: *Apr. 15, 2025

(54) SMARTPHONE WITH WIRELESS POWER CHARGING ANTENNA

(71) Applicant: AQ Corporation, Seongnam-si (KR)

(72) Inventors: Sang Hoon Lee, Gwangju-si (KR); Kyoung Jun Choi, Seoul (KR); Sae Rom Lee, Incheon (KR)

(73) Assignee: AQ Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,162

(22) Filed: May 28, 2024

(65) Prior Publication Data

US 2024/0313392 A1 Sep. 19, 2024

Related U.S. Application Data

(63) Continuation of application No. 18/216,409, filed on Jun. 29, 2023, now Pat. No. 12,003,018, which is a continuation of application No. 17/955,126, filed on Sep. 28, 2022, now Pat. No. 11,728,564, which is a continuation of application No. 17/864,078, filed on Jul. 13, 2022, now Pat. No. 11,495,875, which is a (Continued)

(51) Int. Cl.

*H01Q 1/24* (2006.01)
*H01Q 1/38* (2006.01)
*H01Q 7/00* (2006.01)

(52) U.S. Cl.

CPC ............... *H01Q 1/243* (2013.01); *H01Q 1/38* (2013.01); *H01Q 7/00* (2013.01)

(58) Field of Classification Search

CPC .......... H01Q 21/067; H01Q 1/38; H01Q 1/48; H01Q 21/0006; H01Q 21/0087; H01Q 1/241; H01Q 1/243; H01Q 9/065; H01Q 9/26; H01Q 21/0075; H01Q 21/08; H01Q 1/248; H01Q 21/28; H01Q 7/00

See application file for complete search history.

(56) References Cited

U.S. PATENT DOCUMENTS 3,017,633 A 1/1962 Marston et al.
5,808,587 A 9/1998 Shima (Continued)

FOREIGN PATENT DOCUMENTS

CN 103219808 A 7/2013
CN 203103042 U 7/2013

(Continued)

OTHER PUBLICATIONS

Office Action dated Feb. 1, 2024 in U.S. Appl. No. 18/216,409.

(Continued)

*Primary Examiner* — David E Lotter

(74) *Attorney, Agent, or Firm* — K&L Gates LLP

(57) ABSTRACT

A thin, flexible antenna module is provided for use in a smartphone. When the antenna module is assembled in the smartphone, the antenna module provides an MST antenna and an NFC antenna. For this, the antenna module includes a flexible PCB containing coils and further includes a magnetic sheet engaged with flexible PCB. The flexible PCB and the magnetic sheet are attached to each other to form a single body.

28 Claims, 52 Drawing Sheets

Related U.S. Application Data continuation of application No. 17/546,893, filed on Dec. 9, 2021, now Pat. No. 11,437,712, which is a continuation of application No. 17/105,012, filed on Nov. 25, 2020, now Pat. No. 11,303,011.

(60) Provisional application No. 62/941,636, filed on Nov. 27, 2019.

(56) References Cited

U.S. PATENT DOCUMENTS

| | | | | |
|---|---|---|---|---|
| 5,929,825 | A | 7/1999 | Niu et al. | |
| 6,772,546 | B2 | 8/2004 | Latschbacher et al. | |
| 7,000,837 | B2 | 2/2006 | Akiho et al. | |
| 7,345,583 | B2 | 3/2008 | Reid et al. | |
| 7,545,335 | B1 | 6/2009 | Wang | |
| D605,642 | S | 12/2009 | Yakubo | |
| D613,727 | S | 4/2010 | Xie et al. | |
| D614,175 | S | 4/2010 | Gladstone | |
| 7,712,672 | B2 | 5/2010 | Takahashi et al. | |
| D645,029 | S | 9/2011 | Yakubo et al. | |
| D664,126 | S | 7/2012 | Feit | |
| 8,294,629 | B2 | 10/2012 | Yosui et al. | |
| 8,422,190 | B2 | 4/2013 | Ito et al. | |
| 8,436,780 | B2 | 5/2013 | Schantz et al. | |
| 8,604,992 | B2 | 12/2013 | Kobayashi et al. | |
| 8,638,268 | B2 | 1/2014 | Yosui et al. | |
| D698,764 | S | 2/2014 | Zeng | |
| 8,680,960 | B2 | 3/2014 | Singh et al. | |
| 8,698,591 | B2 | 4/2014 | Singh et al. | |
| 8,710,948 | B2 | 4/2014 | Singh et al. | |
| 8,855,786 | B2 | 10/2014 | Derbas et al. | |
| D717,282 | S | 11/2014 | Forster | |
| 9,001,001 | B2 | 4/2015 | Nakano et al. | |
| D729,215 | S | 5/2015 | Leibovich | |
| 9,166,276 | B2 | 10/2015 | Chateau et al. | |
| 9,300,046 | B2 | 3/2016 | Singh et al. | |
| D761,235 | S | 7/2016 | Man | |
| D766,881 | S | 9/2016 | Man | |
| 9,543,655 | B2 | 1/2017 | Lee et al. | |
| 9,553,476 | B2 | 1/2017 | An et al. | |
| 9,607,757 | B2 | 3/2017 | Hirobe et al. | |
| 9,620,282 | B2 | 4/2017 | Asanuma et al. | |
| 9,627,762 | B2 | 4/2017 | Itc | |
| D786,838 | S | 5/2017 | Chang et al. | |
| D789,914 | S | 6/2017 | Chang et al. | |
| D793,371 | S | 8/2017 | Makimura et al. | |
| D795,227 | S | 8/2017 | Chang et al. | |
| 9,786,989 | B2 | 10/2017 | Horikoshi et al. | |
| 9,812,768 | B2 | 11/2017 | Youm et al. | |
| D816,643 | S | 5/2018 | Schulteis et al. | |
| D817,936 | S | 5/2018 | Yokoi et al. | |
| 9,960,628 | B2 | 5/2018 | Peralta et al. | |
| 9,960,629 | B2 | 5/2018 | Rajagopalan et al. | |
| 10,003,120 | B2 | 6/2018 | Kang et al. | |
| 10,027,020 | B2 | 7/2018 | Ju et al. | |
| D828,827 | S | 9/2018 | Manivannan et al. | |
| 10,074,891 | B2 | 9/2018 | Kang et al. | |
| D829,695 | S | 10/2018 | Wu | |
| D831,009 | S | 10/2018 | Horn | |
| D838,705 | S | 1/2019 | He et al. | |
| D841,607 | S | 2/2019 | Sunagawa | |
| D850,424 | S | 6/2019 | Kang et al. | |
| 10,389,183 | B2 | 8/2019 | Han et al. | |
| D865,724 | S | 11/2019 | Kang et al. | |
| 10,475,571 | B2 | 11/2019 | Jang | |
| 10,547,112 | B2 | 1/2020 | Kang et al. | |
| 10,607,770 | B2 | 3/2020 | Noh et al. | |
| 10,608,340 | B2 | 3/2020 | Kim et al. | |
| 10,658,870 | B2 | 5/2020 | Jang | |
| 10,784,030 | B2 | 9/2020 | Lee et al. | |
| 10,784,044 | B2 | 9/2020 | Qi et al. | |
| 10,868,356 | B1 | 12/2020 | Da Costa Bras Lima et al. | |
| 10,931,151 | B2 | 2/2021 | Baek et al. | |
| 10,998,771 | B2 | 5/2021 | Hemphill et al. | |
| 11,303,011 | B2 * | 4/2022 | Lee | H01Q 1/248 |
| 11,321,701 | B2 | 5/2022 | Lee et al. | |
| 11,437,712 | B2 * | 9/2022 | Lee | H01Q 1/248 |
| 11,495,875 | B1 * | 11/2022 | Lee | H01Q 1/243 |
| 11,539,401 | B2 | 12/2022 | Baek et al. | |
| 11,728,564 | B2 * | 8/2023 | Lee | H01Q 21/28 336/192 |
| 11,862,383 | B2 | 1/2024 | Kurz et al. | |
| 12,003,018 | B2 * | 6/2024 | Lee | H01Q 21/28 |
| 2007/0069961 | A1 | 3/2007 | Akiho et al. | |
| 2008/0150693 | A1 | 6/2008 | You et al. | |
| 2008/0245880 | A1 | 10/2008 | Yamazaki | |
| 2009/0189729 | A1 | 7/2009 | Kubo et al. | |
| 2010/0309081 | A1 * | 12/2010 | Kobayashi | H01Q 1/2225 343/788 |
| 2012/0081258 | A1 | 4/2012 | Yosui et al. | |
| 2013/0134225 | A1 | 5/2013 | Teshima | |
| 2014/0049436 | A1 | 2/2014 | Kubo et al. | |
| 2014/0071011 | A1 | 3/2014 | Yosui et al. | |
| 2014/0139380 | A1 | 5/2014 | Ouyang et al. | |
| 2014/0184462 | A1 | 7/2014 | Yosui | |
| 2014/0339915 | A1 | 11/2014 | Kanno | |
| 2015/0077296 | A1 | 3/2015 | An et al. | |
| 2015/0145742 | A1 | 5/2015 | Cao | |
| 2015/0207207 | A1 | 7/2015 | Park et al. | |
| 2016/0132865 | A1 | 5/2016 | Park et al. | |
| 2016/0149305 | A1 | 5/2016 | Jeon et al. | |
| 2016/0180120 | A1 | 6/2016 | Wallner | |
| 2016/0254589 | A1 | 9/2016 | Ju et al. | |
| 2016/0261026 | A1 | 9/2016 | Han et al. | |
| 2016/0336645 | A1 * | 11/2016 | Orihara | H01Q 1/2208 |
| 2017/0005399 | A1 | 1/2017 | Ito et al. | |
| 2017/0040107 | A1 | 2/2017 | Peralta et al. | |
| 2017/0054213 | A1 | 2/2017 | Singh et al. | |
| 2017/0085301 | A1 | 3/2017 | Chen et al. | |
| 2017/0133744 | A1 | 5/2017 | An et al. | |
| 2017/0179574 | A1 | 6/2017 | Noh et al. | |
| 2017/0194711 | A1 | 7/2017 | Nakano | |
| 2017/0345535 | A1 | 11/2017 | Kim et al. | |
| 2018/0097275 | A1 | 4/2018 | Lee et al. | |
| 2018/0248255 | A1 | 8/2018 | Noh et al. | |
| 2018/0301790 | A1 | 10/2018 | Kim et al. | |
| 2018/0309191 | A1 | 10/2018 | Ju et al. | |
| 2019/0027826 | A1 | 1/2019 | Won et al. | |
| 2019/0109373 | A1 | 4/2019 | Ahn et al. | |
| 2019/0252923 | A1 | 8/2019 | Hemphill et al. | |
| 2019/0260235 | A1 | 8/2019 | Hemphill et al. | |
| 2019/0393604 | A1 | 12/2019 | Ichikawa | |
| 2022/0085489 | A1 | 5/2022 | Nam et al. | |

FOREIGN PATENT DOCUMENTS

| | | | |
|---|---|---|---|
| CN | 109192474 | A | 1/2019 |
| CN | 209015853 | U | 6/2019 |
| EP | 3657519 | A1 | 5/2020 |
| JP | 2003-022912 | A | 1/2003 |
| JP | 2006-195802 | A | 7/2006 |
| JP | 2006-270681 | A | 10/2006 |
| JP | 2010-278518 | A | 12/2010 |
| JP | 2012-209619 | A | 10/2012 |
| JP | 2013-013144 | A | 1/2013 |
| JP | 2013-038821 | A | 2/2013 |
| JP | 2013-055637 | A | 3/2013 |
| JP | 2013-121247 | A | 6/2013 |
| JP | 5360202 | B2 | 12/2013 |
| JP | 2014-64284 | A | 4/2014 |
| JP | 6030991 | B2 | 11/2016 |
| KR | 10-2003-0076039 | A | 9/2003 |
| KR | 10-2006-0008332 | A | 1/2006 |
| KR | 100604694 | B1 | 7/2006 |
| KR | 10-2007-0006702 | A | 1/2007 |
| KR | 10-2008-0008687 | A | 1/2008 |
| KR | 10-2010-0005071 | A | 1/2010 |
| KR | 10-2012-0099131 | A | 9/2012 |
| KR | 10-1185503 | B1 | 9/2012 |
| KR | 10-1210941 | B1 | 12/2012 |
| KR | 10-1282268 | B1 | 7/2013 |
| KR | 10-1339020 | B1 | 12/2013 |
| KR | 10-2015-0051739 | A | 5/2015 |

(56) References Cited

FOREIGN PATENT DOCUMENTS

| | | | |
|---|---|---|---|
| KR | 10-1532052 | B1 | 6/2015 |
| KR | 10-1574322 | B1 | 12/2015 |
| KR | 10-1640023 | B1 | 7/2016 |
| KR | 10-1649259 | B1 | 8/2016 |
| KR | 10-1697303 | B1 | 1/2017 |
| KR | 10-1719915 | B1 | 3/2017 |
| KR | 10-1811611 | B1 | 12/2017 |
| KR | 10-2018-0033104 | A | 4/2018 |
| KR | 10-2018-0046243 | A | 5/2018 |
| KR | 10-2018-0047823 | A | 5/2018 |
| KR | 10-1872399 | B1 | 6/2018 |
| KR | 10-1901715 | B1 | 9/2018 |
| KR | 10-1991011 | B1 | 6/2019 |
| KR | 102056262 | B1 | 12/2019 |
| KR | 10-2099310 | B1 | 4/2020 |
| KR | 10-2137633 | B1 | 7/2020 |
| KR | 10-2178575 | B1 | 11/2020 |
| KR | 10-2200083 | B1 | 1/2021 |
| KR | 10-2239249 | B1 | 4/2021 |
| KR | 10-2021-0078368 | A | 6/2021 |
| KR | 10-2021-0100871 | A | 8/2021 |
| KR | 10-2021-0153484 | A | 12/2021 |
| KR | 102410097 | B1 | 6/2022 |
| WO | WO 2011/062238 | A1 | 5/2011 |
| WO | WO 2013/019455 | A1 | 2/2013 |
| WO | WO 2013/069465 | A1 | 5/2013 |
| WO | WO 2015/009072 | A1 | 1/2015 |
| WO | WO 2016/056736 | A1 | 4/2016 |
| WO | WO 2017/200236 | A1 | 11/2017 |
| WO | WO 2018/056765 | A1 | 3/2018 |
| WO | WO 2018/117431 | A1 | 6/2018 |
| WO | WO 2019/151693 | A1 | 8/2019 |

OTHER PUBLICATIONS

Notice of Allowance dated Feb. 29, 2024 in U.S. Appl. No. 18/216,409.

Notice of Allowance dated Jan. 30, 2023 in U.S. Appl. No. 17/955,126.

Corrected Notice of Allowability dated Jun. 22, 2023 in U.S. Appl. No. 17/955,126.

Notice of Allowance dated Sep. 20, 2022 in U.S. Appl. No. 17/864,078.

Notice of Allowance dated Mar. 9, 2022 in U.S. Appl. No. 17/546,893.

Corrected Notice of Allowability dated Apr. 20, 2022 in U.S. Appl. No. 17/546,893.

Corrected Notice of Allowability dated Jul. 13, 2022 in U.S. Appl. No. 17/546,893.

Corrected Notice of Allowability dated Aug. 11, 2022 in U.S. Appl. No. 17/546,893.

Supplemental Notice of Allowability dated Aug. 22, 2022 in U.S. Appl. No. 17/546,893.

Notice of Allowance dated Jan. 20, 2022 in U.S. Appl. No. 17/105,012.

Corrected Notice of Allowability dated Mar. 4, 2022 in U.S. Appl. No. 17/105,012.

Office Action dated Aug. 10, 2018 in U.S. Appl. No. 29/587,670.

Notice of Allowance dated Jan. 28, 2019 in U.S. Appl. No. 29/587,670.

Notice of Allowance dated Jun. 17, 2019 in U.S. Appl. No. 29/606,321.

Notice of Allowance dated Jul. 8, 2019 of U.S. Appl. No. 15/916,211—26 pages.

Notice of Allowance dated Apr. 20, 2018 of U.S. Appl. No. 15/682,473—5 pages.

Hong, S., Lee, S., Jeong, S., Kim, D. H., Song, J., Kim, H., & Kim, J. (May 2017). Dual-Directional Near Field Communication Tag Antenna with Effective Magnetic Field Isolation from Wireless Power Transfer System. In 2017 IEEE Wireless Power Transfer Conference (WPTC), pp. 1-3.

Hong, S., Jeong, S., Lee, S., Sim, B., Kim, H., & Kim, J. (2019, July). A Dual Resonance Near Field Communication Coil for EMF Reduction in Near Field Communication and Wireless Power Transfer Dual Coil System. In 2019 IEEE International Symposium on Electromagnetic Compatibility, Signal & Power Integrity (Emc+SIPI), pp. 644-647.

Lee, H. H., Kang, S. H., & Jung, C. W. (Aug. 2016). Transparent Electrode Resonators for MRWPT. In 2016 URSI Asia-Pacific Radio Science Conference (URSI AP-RASC), pp. 716-718.

Office Action from U.S. Appl. No. 15/614,484, dated Sep. 22, 2017, 44 pages.

Office Action from U.S. Appl. No. 15/682,473, dated Oct. 20, 2017, 29 pages.

Notice of Allowance from U.S. Appl. No. 15/614,484, dated Feb. 23, 2018, 13 pages.

* cited by examiner

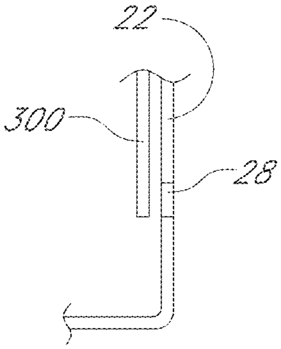
FIG. 13
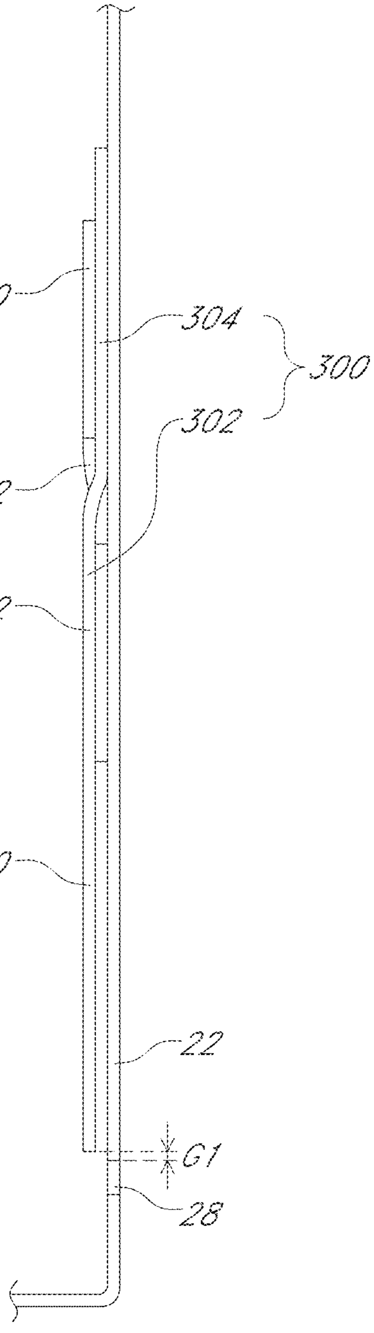
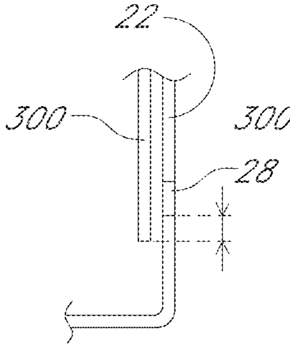
FIG. 14
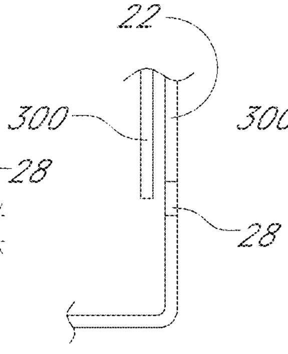
FIG. 12
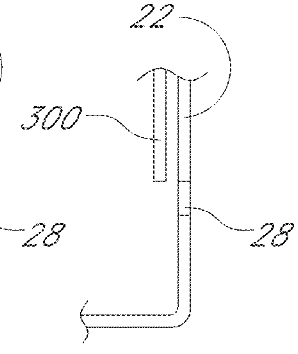
FIG. 11
FIG. 10

Examples of sheet-like smartphone antenna with different WPC coil design

<Example of non-parallel-coil design>

Total 14 turns (9.35uH / 0.27Ω

(a)

<Example of parallel-coil design>

<Outer coil>
line width 0.45 mm
12 turns
space 0.1mm
<Inner coil>
line width 0.35mm
17 turns
space 0.1mm Total 29 Turns (10.52uH / 0.3Ω)

(b)

Examples of WPC coil – outer diameter: 42ø, inner diameter: 14ø

Example of WPC coil – outer diameter: 42ø, inner diameter: 14ø

Charging efficiency: 66.0% @1000mA

Examples of WPC coil – outer diameter: 42ø, inner diameter: 9ø

FIGURE 55

Charging efficiencies of WPC coil depending on coil width ratio

| RX Current | 0.6A | 0.7A | 0.8A | 0.9A | 1.0A |
|---|---|---|---|---|---|
| 2:8* 6** /23*** | 58.7%**** | 59.6% | 59.1% | 57.9% | 57.3% |
| 3:7 9 / 20 | 68.5% | 68.5% | 67.0% | 64.5% | 62.7% |
| 4:6 12 / 17 | 70.9% | 70.3% | 69.6% | 67.0% | 65.6% |
| 5:5 15 / 14 | 69.2% | 68.0% | 67.5% | 64.8% | 62.9% |
| 6:4 17 / 12 | 63.6% | 64.1% | 63.3% | 61.2% | 60.4% |

* Coil width ratio (outer coil width : inner coil width)
** number of lines of outer coil
*** number of lines of inner coil
**** Charging efficiency = RX power / TX power
= (RX voltage X RX current) / (TX voltage X TX current)

SMARTPHONE WITH WIRELESS POWER CHARGING ANTENNA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to a smartphone antenna module for use in a smartphone and further relates to a smartphone having the antenna module.

Discussion of Related Technology

Recently, smartphones include a circuit and an antenna for enabling near field RF communication (NFC). Also, some smartphones include other wireless communication circuits and antennas for use in transactions and payments in stores and restaurants with smartphones. For example, a circuit and an antenna for magnetic secure transmission (MST) are applied to some smartphones. However, wireless communication circuits and components for providing various kinds of wireless communications (e.g., LTE communication, Wi-Fi communication and Bluetooth communication) are already housed in smartphones, and various antennas are also mounted in smartphones. In addition, smartphones also have components that may affect the wireless communication, such as a battery. Accordingly, spaces for installing an NFC antenna or MST antenna are limited. This requires additional efforts for designing antennas' structures and layout of components in smartphones.

The foregoing discussion in this section is to provide general background information and does not constitute an admission of prior art.

SUMMARY

In one aspect of the invention provides a smartphone antenna module, which may comprise:

- a flexible PCB comprising a sheet-like body with a first major surface and a second major surface facing away from the first major surface;
- the flexible PCB further comprising a first hole and a second hole formed through the sheet-like body, wherein the flexible PCB comprises a first PCB section, the first hole, a second PCB section, the second hole, and a third PCB section consecutively arranged along an axis such that the axis passes the first PCB section, the first hole, the second PCB section, the second hole, and the third PCB section;
- the flexible PCB further comprising a first coil, a second coil and a third coil formed in the sheet-like body between the first and second major surfaces,
- the first coil surrounding the first hole and comprising a first coil segment located in the first PCB section and a second coil segment located in the second PCB section;
- the second coil surrounding the second hole and comprising a second coil segment located in the second PCB section and a third coil segment located in the third PCB section;

- a magnetic sheet comprising a first sheet portion, a second sheet portion and a third sheet portion, the second sheet portion interposed between the first and third sheet portions,
- wherein the magnetic sheet engaged with the flexible PCB through the first and second holes such that:
  - the first sheet portion is located on the side of the first major surface and overlaps the first coil segment of the first coil, in which at least one line of the first coil segment of the first coil overlaps the first sheet portion,
  - the second sheet portion interposed between the first and third sheet portions is located on the side of the second major surface and overlaps both the second coil segment of the first coil and the second coil segment of the second coil, in which each line of the second coil segment of the first coil overlaps the second sheet portion and each line of the second coil segment of the second coil overlaps the second sheet portion, and
  - the third sheet portion is located on the side of the first major surface and overlaps the third coil segment of the second coil, in which each line of the third coil segment of the second coil overlaps the third sheet portion.

In the foregoing smartphone antenna module, the third coil may surround both the first and second coils, wherein the third coil comprises a first coil segment located in the first PCB section and a third coil segment in the third PCB section, wherein the first coil segment of the third coil does not have a line overlapping the first sheet portion, wherein the third sheet portion overlaps the third coil segment of the third coil, in which each line of the third coil segment of the third coil overlaps the third sheet portion. In the foregoing antenna module, the third coil may surround the first coil, but does not surround the third coil, wherein the third coil comprises a first coil segment located in the first PCB section and a second coil segment in the second PCB section, wherein the first sheet portion overlaps the first coil segment of the third coil, in which at least one line of the first coil segment of the third coil overlaps the first sheet portion, wherein the second sheet portion overlaps the second coil segment of the third coil, in which each line of the second coil segment of the third coil overlaps the third sheet portion.

Still in the foregoing smartphone antenna module, the magnetic sheet does not include a portion extending from the first sheet portion beyond an edge of the flexible PCB that overlaps the first PCB section. Each line of the first coil segment of the first coil may overlap the first sheet portion. The magnetic sheet may include a portion extending from the third sheet portion beyond an edge of the flexible PCB that overlaps with the third PCB section. The magnetic sheet may continuously extend from the first sheet portion to the third sheet portion via the second sheet portion without an air gap between the first sheet portion and the second sheet portion and without air gap between the second sheet portion and the third sheet portion.

Yet in foregoing smartphone antenna module, the first coil may comprise two non-overlapping coil segments that do not overlap the magnetic sheet at all, wherein the first coil segment, one of the two non-overlapping coil segments, the second coil segment, the other non-overlapping coil segment of the first coil are arranged in order surrounding the first hole. The second coil may comprise two non-overlapping coil segments that do not overlap the magnetic sheet at all, wherein the second coil segment, one of the two non-overlapping coil segments, the third coil segment, the other non-overlapping coil segment of the second coil are arranged in order surrounding the second hole.

Further in the foregoing smartphone antenna module, the first coil and the second coil may be electrically connected to each other in the flexible PCB to form a combined coil antenna having two end terminals, wherein the flexible PCB further comprises a PCB connector for electrically connecting the first and second coils to a counterpart connector of a smartphone, wherein the PCB connector is electrically connected to the two end terminals. The first and second coils are connected in series to each other such that when current flows from one of the two end terminals toward the other end terminal through the first and second coils, the current flows in the first coil in a first rotational direction around the first hole and further flows in the second coil in a second rotational direction around the second hole when viewed in a viewing direction perpendicular to the first major surface, in which the second rotational direction is opposite to the first rotational direction. The first and second coils are connected to each other in series such that when current flows from one of the two end terminals toward the other end terminal through the first and second coils, the current flows in lines of the second coil segment of the first coil in a linear direction and the current flows in lines of the second coil segment of the second coil in the same linear direction. The third coil surrounds the first coil and the second coil, wherein the flexible PCB further may comprise connection lines interconnecting the two end terminals of the combined coil antenna and the PCB connector, wherein one of the connection lines crosses over the third coil when viewed in a viewing direction perpendicular to the first major surface. The first coil and the second coil may be electrically connected to each other in series.

Still further in the foregoing smartphone antenna module, wherein the flexible PCB may comprise a first layer and a second layer stacked over each other, wherein the first layer comprises the first and second coils, and the second layer comprises a fourth coil that surrounds the first hole, wherein the fourth coil comprises a first coil segment located in the first PCB section and a second coil segment located in the second PCB section, wherein the first sheet portion overlaps the first coil segment of the fourth coil, in which at least one line of the first coil segment of the fourth coil overlaps the first sheet portion, wherein the second sheet portion overlaps the second coil segment of the fourth coil, in which each line of the second coil segment of the fourth coil overlaps the second sheet portion. The first, second and fourth coils may be electrically connected to one another in series in the flexible PCB to form a combined coil antenna having two end terminals, wherein the flexible PCB further comprises a PCB connector for electrically connecting the first, second and fourth coils to a counterpart connector of a smartphone, wherein the PCB connector is electrically connected to the two terminals. The first, second and fourth coils are connected in series such that when current flows from one of the two end terminals toward the other end terminal through the first, second and fourth coils, the current flows in the first and fourth coils in a first rotational direction around the first hole and further flows in the third coil in a second rotational direction around the second hole when viewed in a direction perpendicular to the first major surface, wherein the first rotational direction is opposite to the second rotational direction. The first, second and fourth coils are connected in series such that when current flows from one of the two end terminals toward the other end terminal through the first, second and fourth coils, the current flows in lines of the second coil segment of the first coil in a linear direction, the current flows in lines of the second coil segment of the second coil in the same linear direction, and the current flows in lines of the second coil segment of the fourth coil in the same linear direction.

Still further in the smartphone antenna module, the third coil may surround the first coil, but does not surround the third coil, wherein the flexible PCB further may comprise a fifth coil that surrounds the second coil, wherein the first and second coils are connected to each other for providing a combined coil antenna and the third and fifth coils are connected to each other in the flexible PCB for providing another combined coil antenna.

Another aspect of the invention provides a smartphone, which may comprise: a display module comprising a display surface; one of the foregoing smartphone antenna modules; and a rear wall facing away from the display surface and made of a non-magnetic material, wherein the magnetic sheet is arranged generally parallel to the rear wall.

In the foregoing smartphone, at least part of the first sheet portion and at least part of the third sheet portion may be interposed between the rear wall and the first PCB section while at least part of the second PCB section is interposed between the rear wall and the second sheet portion. The first and second coils may be electrically connected to each other in the flexible PCB and connected to a first smartphone circuit for magnetic secure transmission (MST) using a frequency range of 85-100 KHz, wherein the second coil is connected to a second smartphone circuit for near field communication (NFC) using 13.56 MHz.

Still another aspect of the invention provides a smartphone antenna module which may comprise:

- a magnetic sheet comprising a first magnetic sheet portion, a second magnetic sheet portion and a third magnetic sheet portion interposed between the first and second magnetic sheet portions;
- a flexible PCB comprising a first coil antenna (e.g., coil A) and a second coil antenna (e.g., coil B); and
- a through hole formed through the flexible PCB such that the flexible PCB comprises a first PCB section and a second PCB section located on an opposite side of the first PCB section across the through hole,
- wherein, when viewed in a thickness direction of the flexible PCB, the first coil antenna surrounds the through hole, and the second coil antenna surrounds the first coil antenna,
- wherein no electrical connection is formed between the first coil antenna and the second antenna coil within the flexible PCB,
- wherein the flexible PCB and the magnetic sheet are integrated in a single, flexible body, in which the flexible PCB and the magnetic sheet are arranged relative to each other such that: at least part of the third magnetic sheet portion passes the through hole, the first magnetic sheet portion is placed over the first PCB section and overlaps a first coil portion of the first coil antenna formed in the first PCB section of the flexible PCB, and the second magnetic sheet portion is placed under the second PCB section and overlaps a second coil portion of the first coil antenna formed in second PCB section of the flexible PCB.

In the foregoing antenna module, the first magnetic sheet portion placed over the first PCB section further may overlap a first coil portion of the second coil antenna that are formed in the first PCB section. The first magnetic sheet portion placed over the first PCB section may extend in a direction away from the second magnetic sheet portion beyond the first coil portion of the second coil antenna. The first magnetic sheet portion placed over the first PCB section may extend in a direction away from the second magnetic sheet portion beyond an edge of the flexible PCB that overlaps with the first PCB section.

Still in the foregoing antenna module, the first coil antenna may comprise a third portion that does not overlap the magnetic sheet at all. The first coil antenna may comprise a fourth portion that does not overlap the magnetic sheet at all, wherein the first, third, second and fourth portions of the first coil antenna are arranged in order surrounding the through hole. The second coil antenna may comprise a third portion and fourth portion that do not overlap the magnetic sheet at all, wherein the first, third, second and fourth portions of the second coil antenna are arranged in order surrounding the through hole.

Yet in the foregoing antenna module, the second magnetic sheet portion placed under the second PCB section further may overlap a second coil portion of the second coil antenna that are formed in the second PCB section. The first magnetic sheet portion placed over the first PCB section may further overlap a first coil portion of the second coil antenna that are formed in the first PCB section. The first magnetic sheet portion may have a first width for passing through the through hole without bending thereof whereas the second magnetic sheet portion has a second width for not passing through the through hole without bending thereof. The through hole may have a maximum linear length of an opening thereof, wherein the first magnetic sheet portion has a first width smaller than the maximum linear length whereas the second magnetic sheet portion has a second width larger than the maximum linear length.

Further in the foregoing antenna module, the through hole may have a maximum linear length of an opening thereof, wherein the first magnetic sheet portion has a first width larger than the maximum linear length whereas the second magnetic sheet portion has a second width larger than the maximum linear length. The through hole may have a maximum linear length of an opening thereof, wherein the first magnetic sheet portion has a first width smaller than the maximum linear length whereas the second magnetic sheet portion has a second width smaller than the maximum linear length.

Still further in the foregoing antenna module, the first coil antenna may comprise a first inner terminal and a first outer terminal, wherein the flexible PCB may further comprise a PCB connector for electrically connecting the first coil antenna to a first counterpart connector of a smartphone, wherein the PCB connector is electrically connected to the first inner terminal and the first outer terminal. The flexible PCB may further comprise a connection line interconnecting the first inner terminal and the PCB connector, wherein the connection line crosses over the first coil antenna and the second coil antenna. The second coil antenna comprises a second inner terminal and a second outer terminal, wherein the PCB connector is also for electrically connecting the second coil antenna to a second counterpart connector of the smartphone, wherein the PCB connector is also electrically connected to the second inner terminal and the second outer terminal. The smartphone antenna module may further comprise a third coil antenna that is not part of the flexible PCB.

Yet another aspect of the invention provides a smartphone, which may comprise: a display module comprising a display surface; the foregoing smartphone antenna module; and a rear wall facing away from the display surface and made of a non-magnetic material, wherein the magnetic sheet is arranged generally parallel to the rear wall.

In the foregoing smartphone, at least part of the first magnetic sheet portion may be interposed between the rear wall and the first PCB section whereas at least part of the second PCB section is interposed between the rear wall and the second magnetic sheet portion. The first coil antenna may be connected to a first smartphone circuit for magnetic secure transmission (MST) using a frequency range of 85-100 KHz, wherein the second coil antenna is connected to a second smartphone circuit for near field communication (NFC) using 13.56 MHz. The antenna module may further comprise a third coil antenna that is not part of the flexible PCB.

Still another aspect of the invention provides a smartphone antenna module, which may comprise:

- a flexible PCB comprising a first coil antenna and a second coil antenna that are not electrically connected with each other within the flexible PCB;
- a through hole formed through the flexible PCB such that the flexible PCB comprises a first PCB section and a second PCB section located on an opposite side of the first PCB section across the through hole, wherein when viewed in a thickness direction of the flexible PCB, the first coil antenna surrounds the through hole and the second coil antenna surrounds the first coil antenna;
- a first magnetic sheet placed under or over the first PCB section and overlapping a first coil portion of the first coil antenna that are formed in the first PCB section, the first magnetic sheet comprising a first edge;
- a second magnetic sheet placed under or over the second PCB section and overlapping a second coil portion of the first coil antenna that are formed in the second PCB section located on an opposite side of the first PCB section across the through hole, the second magnetic sheet comprising a second edge,
- wherein the first magnetic sheet and the second magnetic sheet are arranged such that the first edge of the first magnetic sheet overlaps the second magnetic sheet or that the first edge and the second edge are in proximity with each other with a gap therebetween,
- wherein the flexible PCB, the first magnetic sheet and the second magnetic sheet are integrated in a single, flexible body.

In the foregoing antenna module, the gap may be greater than 0 mm and less than a distance in a range of 0.1 mm to 3 mm.

A further aspect of the invention provides a smartphone, which may comprise: a display module comprising a display surface; the foregoing smartphone antenna module; and a rear wall facing away from the display surface and made of a non-magnetic material, wherein the magnetic sheet is arranged generally parallel to the rear wall.

In the foregoing smartphone, the first coil antenna is connected to a first smartphone circuit for magnetic secure transmission (MST) using a frequency range of 85-100 KHz, wherein the second coil antenna is connected to a second smartphone circuit for near field communication (NFC) using 13.56 MHz.

Still a further aspect of the invention provides a smartphone antenna module comprising:

- a magnetic sheet comprising a first sheet portion, a second sheet portion and a third sheet portion, the second sheet portion interposed between the first and third sheet portions;
- a flexible PCB comprising a first coil (coil A) and a second coil (coil C), wherein when viewed in a thickness direction of the flexible PCB, the first and second coils are arranged side by side;

a first through hole formed through the flexible PCB and surrounded by the first coil when viewed in the thickness direction;

a second through hole formed through the flexible PCB and surrounded by the second coil when viewed in the thickness direction; and the flexible PCB comprises a first PCB section, a second PCB section and a third PCB section, the second PCB section interposed between the first and second through holes, wherein the first and second PCB sections are located opposite to each other across the first through hole and the second and third PCB sections are located opposite to each other across the second through hole such that the second PCB section is located between the first and third PCB sections, wherein the flexible PCB and the magnetic sheet are integrated in a single, flexible body, in which the flexible PCB and the magnetic sheet are arranged relative to each other such that:

the first sheet portion is placed over the first PCB section and overlaps a first coil portion of the first coil formed in the first PCB section of the flexible PCB, the second sheet portion is placed under the second PCB section, overlaps a second coil portion of the first coil formed in the second PCB section and further overlaps a first coil portion of the second coil formed in the second PCB section, the magnetic sheet comprises a first intermediate sheet portion connecting the first and second sheet portions and passing through the first through hole, the third sheet portion is placed over the third PCB section and overlaps a second coil portion of the second coil formed in the third PCB section of the flexible PCB, and the magnetic sheet comprises a second intermediate portion connecting the second and third sheet portions and passing through the second through hole.

One aspect of the invention provides a smartphone antenna module which may comprise the following:

a flexible PCB comprising a sheet-like body with a first major surface and a second major surface facing away from the first major surface;

the flexible PCB further comprising a through-hole formed through the sheet-like body, wherein the flexible PCB comprises a first PCB section, the through-hole and a second PCB section arranged along an axis such that the axis passes the first PCB section, the through-hole and the second PCB section in order;

the flexible PCB further comprising a first coil, a second coil and a third coil formed in the sheet-like body between the first and second major surfaces;

the first coil comprising a first coil segment located in the first PCB section and a second coil segment located in the second PCB section;

the second coil comprising a first coil segment located in the first PCB section and a second coil segment located in the second PCB section;

the third coil located in the second PCB section;

the second coil surrounding the first coil, the through hole and at least a portion of the third coil; and a magnetic sheet comprising a head portion, a base portion and a neck portion interposed between and interconnecting the head and base portions, wherein no electric connection is formed between any two coils of the first, second and third coils in the flexible PCB, wherein the magnetic sheet is engaged with the flexible PCB:

such that the head portion is located on the side of the first major surface and overlaps the first coil segment of the first coil, in which the head portion overlaps at least one line of the first coil segment of the first coil while the head portion does not overlap any line of the first coil segment of the second coil, such that the neck portion passes through and overlaps the through-hole; and such that the base portion is located on the side of the second major surface and overlaps the third coil, the second coil segment of the first coil and the second coil segment of the second coil, in which the base portion overlaps each line of the second coil segment of the first coil, each line of the second coil segment of the second coil and each line of the third coil and the entire portion of the third coil, wherein the magnetic sheet overlaps each line of the second coil segment of the second coil whereas the magnetic sheet does not overlap any line of the first coil segment of the second coil.

In the foregoing smartphone antenna module, the third coil may be located between the second segment of the first coil and the second segment of the second coil, wherein the second coil surrounds the entire third coil. The second coil segment of the second coil may comprise a plurality of lines generally perpendicular to the axis, wherein the plurality of lines comprises a first line and a second line located inside the first line, wherein the second line crosses the third coil when viewed in a thickness direction of the flexible PCB whereas a first line does not cross the third coil such that the entire portion of the third coil is located between the second line and the second segment of the first coil. The second coil may comprise two or more turns that comprises a first turn and a second turn, wherein the first turn surrounds entire portion of the third coil whereas the second turn surrounds a portion of the third coil and comprises a line crossing the third coil when viewed in a thickness direction of the flexible PCB.

Still in the foregoing module, each of the first, second and third coils may comprise a printed wire that is coiled to form one or more turns in a spiral shape when viewed in a thickness direction of the flexible PCB. The printed wire may comprise a first wire segment and a second wire segment formed in different layers of the flexible PCB and connected through a connection via. Each line of the second coil segment of the first coil may comprise a linear extension along a direction perpendicular to the axis, wherein the base portion overlaps the entire portion of the linear extension of the first coil along the direction, wherein each line of the second coil segment of the second coil comprises a linear extension along a direction perpendicular to the axis, wherein the base portion overlaps the entire portion of the linear extension of the second coil along the direction.

Yet in the foregoing module, each line of the first coil segment of the first coil may comprise a linear extension along a direction perpendicular to the axis, wherein the head portion overlaps the at least one line of the first coil segment such that only a central portion of the linear extension of the at least one line overlaps the head portion with non-overlapped portions at both ends of the central portion. The magnetic sheet may include a portion extending from the base portion beyond an edge of the flexible PCB that overlaps with the second PCB section. The first coil antenna may comprise third and fourth coil segments that do not overlap the magnetic sheet at all, wherein the first, third, second and fourth coil segments of the first coil are arranged in order surrounding the through hole. The second coil antenna may comprise third and fourth coil segments that do not overlap the magnetic sheet at all, wherein the first, third, second and fourth coil segments of the second coil are arranged in order surrounding the through hole. The head portion may have a first width for passing through the through hole without bending thereof whereas the base portion has a second width for not passing through the through hole without bending thereof. The base portion may have a width greater than that of the neck portion, and the head portion has a width equal to or smaller than that of the neck portion. The neck portion may have a width smaller than those of the head portion and the base portion.

Further in the foregoing module, the through-hole may have a maximum linear length of an opening thereof, wherein the head portion has a first width smaller than the maximum linear length whereas the base portion has a second width larger than the maximum linear length. Each of the first, second and third coils may comprise an inner terminal and an outer terminal, wherein the flexible PCB further comprises a PCB connector for electrically connecting each coil to a counterpart connector of a smartphone, wherein the PCB connector is electrically connected to the inner terminal and the outer terminal. The flexible PCB further may comprise a connection line interconnecting the inner terminal of the first coil antenna and the PCB connector, wherein the connection line crosses over the first coil antenna and the second coil antenna without electric connection with the second coil in the flexible PCB. The flexible PCB may further comprise a fourth coil formed in a layer different from that of the first coil, wherein the fourth coil surrounds the through-hole, wherein the fourth coil is coiled in a rotational direction opposite that of the first coil when viewed in a thickness direction of the flexible PCB, wherein the first coil and the fourth coil are electrically connected in series. The flexible PCB may further comprise a fourth coil formed in a layer different from that of the first coil, wherein the fourth coil surrounds the through-hole, wherein the first and fourth coils are coiled in the same rotational direction when viewed in a thickness direction of the flexible PCB, wherein the first coil and the fourth coil are electrically connected in parallel. The flexible PCB may further comprises a fourth coil formed in a layer different from that of the first coil, wherein the fourth coil surrounds the through-hole, wherein the fourth coil comprising a first coil segment located in the first PCB section and a second coil segment located in the second PCB section such that the first coil segment of the fourth coil overlaps the head portion while the second coil segment of the fourth coil overlaps the base portion.

Another aspect of the invention provides a smartphone which may comprise a display module comprising a display surface; the foregoing smartphone antenna module; and a rear wall facing away from the display surface and made of a non-magnetic material, wherein the magnetic sheet is arranged generally parallel to the rear wall. In the foregoing smartphone, at least part of the base portion may be interposed between the rear wall and the second PCB section whereas at least part of the first PCB section is interposed between the rear wall and the head portion. The first coil antenna may be connected to a first smartphone circuit and configured for magnetic secure transmission (MST) using a frequency range of 85-100 KHz, wherein the second coil antenna is connected to a second smartphone circuit and configured for near field communication (NFC) using 13.56 MHz, wherein the third coil antenna is connected to a third smartphone circuit and configured for wireless charging of the smartphone.

Still another aspect of the invention provides a smartphone antenna module which may comprise:

- a magnetic sheet comprising a first magnetic sheet portion, a second magnetic sheet portion and a third magnetic sheet portion interposed between the first and second magnetic sheet portions,
- a flexible PCB in form of a sheet having a thickness, the flexible PCB comprising a first coil antenna and a second coil antenna; and
- a through hole formed through the thickness of the sheet of the flexible PCB such that the flexible PCB comprises a first PCB section and a second PCB section located on an opposite side of the first PCB section across the through hole,
- wherein, when viewed in a thickness direction of the flexible PCB, the first coil antenna comprises two or more turns turning around the through hole, and the second coil antenna comprises two or more turns turning around the first coil antenna and the through hole,
- wherein no electrical connection is formed between the first coil antenna and the second coil antenna within the flexible PCB,
- wherein the flexible PCB and the magnetic sheet are integrated in a single, flexible body, in which the flexible PCB and the magnetic sheet are arranged relative to each other such that:
  - at least part of the third magnetic sheet portion passes the through hole,
  - the first magnetic sheet portion is placed over the first PCB section and overlaps, when viewed in the thickness direction, a first coil portion of the first coil antenna formed in the first PCB section of the flexible PCB while not overlapping, when viewed in the thickness direction, a second coil portion of the first coil antenna formed in the second PCB section that is placed across the through hole,
  - the second magnetic sheet portion is placed under the second PCB section and overlaps, when viewed in the thickness direction, the second coil portion of the first coil antenna formed in the second PCB section of the flexible PCB while not overlapping, when viewed in the thickness direction, the first coil portion of the first coil antenna formed in the first PCB section placed across the through hole, and
  - the second magnetic sheet portion further overlaps, when viewed in the thickness direction, a second coil portion of the second coil antenna formed in the second PCB section while not overlapping, when viewed in the thickness direction, a first coil portion of the second coil antenna formed in the first PCB section that is placed across the through hole.

Yet another aspect of the invention provides a smartphone antenna module which may comprise:

- a magnetic sheet comprising a first magnetic sheet portion, a second magnetic sheet portion and a third magnetic sheet portion interposed between the first and second magnetic sheet portions,
- a flexible PCB in form of a sheet having a thickness, the flexible PCB comprising a first coil antenna, a second coil antenna and a third coil antenna; and a through hole formed through the thickness of the sheet of the flexible PCB such that the flexible PCB comprises a first PCB section and a second PCB section located on an opposite side of the first PCB section across the through hole, wherein, when viewed in a thickness direction of the flexible PCB, the first coil antenna comprises two or more turns turning around the through hole, and the second coil antenna comprises two or more turns turning around the first coil antenna, the third coil antenna and the through hole, wherein no electrical connection is formed between the first coil antenna and the second coil antenna within the flexible PCB, no electrical connection is formed between the third coil and the first coil antenna within the flexible PCB, and no electrical connection is formed between the third coil and the second coil antenna within the flexible PCB, wherein the flexible PCB and the magnetic sheet are integrated in a single, flexible body, in which the flexible PCB and the magnetic sheet are arranged relative to each other such that:

at least part of the third magnetic sheet portion passes the through hole, the first magnetic sheet portion is placed over the first PCB section and overlaps, when viewed in the thickness direction, a first coil portion of the first coil antenna formed in the first PCB section of the flexible PCB while not overlapping, when viewed in the thickness direction, a second coil portion of the first coil antenna formed in the second PCB section that is placed across the through hole, the second magnetic sheet portion is placed under the second PCB section and overlaps, when viewed in the thickness direction, the second coil portion of the first coil antenna formed in the second PCB section of the flexible PCB while not overlapping, when viewed in the thickness direction, the first coil portion of the first coil antenna formed in the first PCB section that is placed across the through hole, and the second magnetic sheet portion further overlaps, when viewed in the thickness direction, a second coil portion of the second coil antenna formed in the second PCB section while not overlapping, when viewed in the thickness direction, a first coil portion of the second coil antenna formed in the first PCB section that is placed across the through hole.

A further aspect of the invention provides a smartphone antenna module that may comprise:

a flexible PCB comprising a sheet-like body with a first major surface and a second major surface facing away from the first major surface;

the flexible PCB further comprising a first hole and a second hole formed through the sheet-like body, wherein the flexible PCB comprises a first PCB section, the first hole, a second PCB section, the second hole, and a third PCB section arranged along an axis such that the axis passes the first PCB section, the first hole, the second PCB section, the second hole, and the third PCB section in order;

the flexible PCB further comprising a first coil, a second coil and a third coil formed in the sheet-like body between the first and second major surfaces;

the first coil surrounding the first hole and comprising a first coil segment located in the first PCB section and a second coil segment located in the second PCB section;

the second coil surrounding the second hole and comprising a second coil segment located in the second PCB section and a third coil segment located in the third PCB section;

the third coil surrounding all of the first coil, the first hole, the second coil and the second hole and comprising a first coil segment located in the first PCB section and a third coil segment located in the third PCB section; and a magnetic sheet comprising a first sheet portion, a second sheet portion and a third sheet portion, the second sheet portion interposed between the first and third sheet portions, wherein the magnetic sheet engaged with the flexible PCB through the first and second holes:

such that the first sheet portion is located on the side of the first major surface and overlaps the first coil segment of the first coil, in which the first sheet portion overlaps at least one line of the first coil segment of the first coil while the first sheet portion does not overlap any line of the first coil segment of the third coil, such that the second sheet portion interposed between the first and third sheet portions is located on the side of the second major surface and overlaps both the second coil segment of the first coil and the second coil segment of the second coil, in which the second sheet portion overlaps each line of the second coil segment of the first coil and each line of the second coil segment of the second coil, and such that the third sheet portion is located on the side of the first major surface and overlaps the third coil segment of the second coil and the third coil segment of the third coil, in which the third sheet portion overlaps each line of the third coil segment of the second coil and each line of the third coil segment of the third coil, wherein the magnetic sheet overlaps each line of the third coil segment of the third coil whereas the magnetic sheet does not overlap any line of the first coil segment of the third coil.

Still a further aspect of the invention provides a smartphone antenna module that may comprise:

a flexible PCB comprising a sheet-like body with a first major surface and a second major surface facing away from the first major surface;

the flexible PCB further comprising a first hole and a second hole formed through the sheet-like body, wherein the flexible PCB comprises a first PCB section, the first hole, a second PCB section, the second hole, and a third PCB section arranged along an axis such that the axis passes the first PCB section, the first hole, the second PCB section, the second hole, and the third PCB section in order;

the flexible PCB further comprising a first coil, a second coil, a third coil and a fourth coil formed in the sheet-like body between the first and second major surfaces, wherein the sheet like body comprises a first layer and a second layer stacked over the first layer, wherein the first and second coils are formed in the first layer while the fourth coil is formed in the second layer;

the first coil surrounding the first hole and comprising a first coil segment located in the first PCB section and a second coil segment located in the second PCB section;

the fourth coil surrounding the first hole and comprising a first coil segment located in the first PCB section and a second coil segment located in the second PCB section;

the second coil surrounding the second hole and comprising a second coil segment located in the second PCB section and a third coil segment located in the third PCB section;

the third coil surrounding all of the first coil, the fourth coil, the first hole, the second coil and the second hole and comprising a first coil segment located in the first PCB section and a third coil segment located in the third PCB section; and a magnetic sheet comprising a first sheet portion, a second sheet portion and a third sheet portion, the second sheet portion interposed between the first and third sheet portions, wherein the magnetic sheet engaged with the flexible PCB through the first and second holes:

such that the first sheet portion is located on the side of the first major surface and overlaps the first coil segment of the first coil and the first coil segment of the fourth coil, in which the first sheet portion overlaps at least one line of the first coil segment of the first coil and at least one line of the first coil segment of the fourth coil while the first sheet portion does not overlap any line of the first coil segment of the third coil, such that the second sheet portion interposed between the first and third sheet portions is located on the side of the second major surface and overlaps the second coil segment of the first coil, the second coil segment of the second coil and the second coil segment of the fourth coil, in which the second sheet portion overlaps each line of the second coil segment of the first coil, each line of the second coil segment of the second coil and each line of the second coil segment of the fourth coil, and such that the third sheet portion is located on the side of the first major surface and overlaps the third coil segment of the second coil and the third coil segment of the third coil, in which the third sheet portion overlaps each line of the third coil segment of the second coil and each line of the third coil segment of the third coil, wherein the magnetic sheet overlaps each line of the third coil segment of the third coil whereas the magnetic sheet does not overlap any line of the first coil segment of the third coil, wherein each of the first, second and fourth coils comprises an inner terminal and an outer terminal, wherein the first coil is coiled about the first hole from the inner terminal of the first coil to the outer terminal of the first coil in a first rotational direction, the second coil is coiled about the second hole from the inner terminal of the second coil to the outer terminal of the second coil in a second rotational direction that is opposite to the first rotational direction, the fourth coil is coiled about the first hole from the inner terminal of the fourth coil and the outer terminal of the fourth coil in the second rotational direction, and the first, second and fourth coils are connected to each other to form a serial connection such that, when current flows through the first, second and fourth coils, the current flows in the same direction in each line of the second coil segments of the first, second and fourth coils.

BRIEF DESCRIPTION OF THE DRAWINGS

FIG. 10 is a sectional view of a rear cover of a smartphone and an antenna module according to an embodiment of the invention, showing locational relationship between the rear cover and the antenna module.

FIGS. 11-14 are partial sectional views of a rear cover of a smartphone and an antenna module, each showing locational relationship between the rear cover and the antenna module according to various embodiments of the invention.

FIGS. 18A and 18B show examples of electrical connection of two coils, in which FIG. 18A shows a series connection and FIG. 18B shows a parallel connection.

FIG. 55 shows charging efficiencies of the various examples.

DETAILED DESCRIPTION OF EMBODIMENTS

Embodiments of the invention are now described with reference to the accompanying drawings. The terminology used in the description presented herein is not intended to be interpreted in any limited or restrictive manner, simply because it is being utilized in conjunction with a detailed description of certain specific embodiments of the invention.

Various Components in Smartphone

Figure 1:
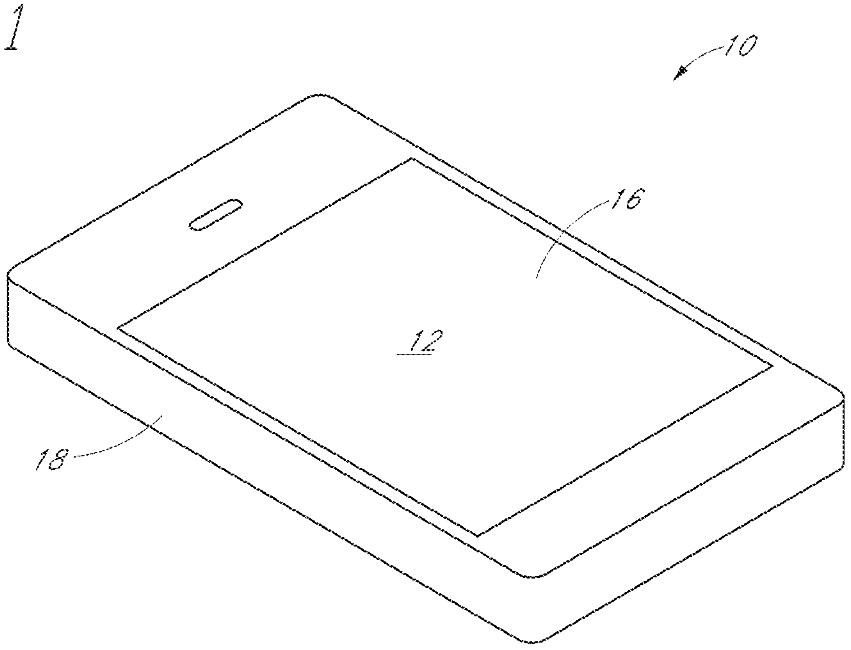
FIG. 1 is a perspective view of a smartphone according to embodiments of the present invention, showing a front side of the smartphone.
Figure 2:
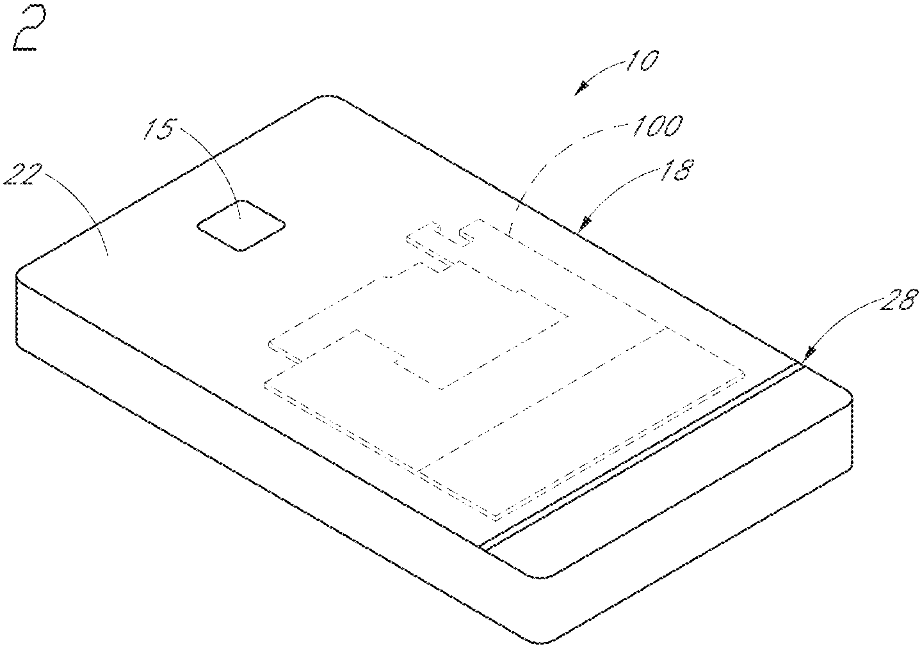
FIG. 2 is a perspective view of the smartphone shown in FIG. 1, showing a backside of the smartphone with an antenna module inside the smartphone according to an embodiment of the invention.
Figure 3:
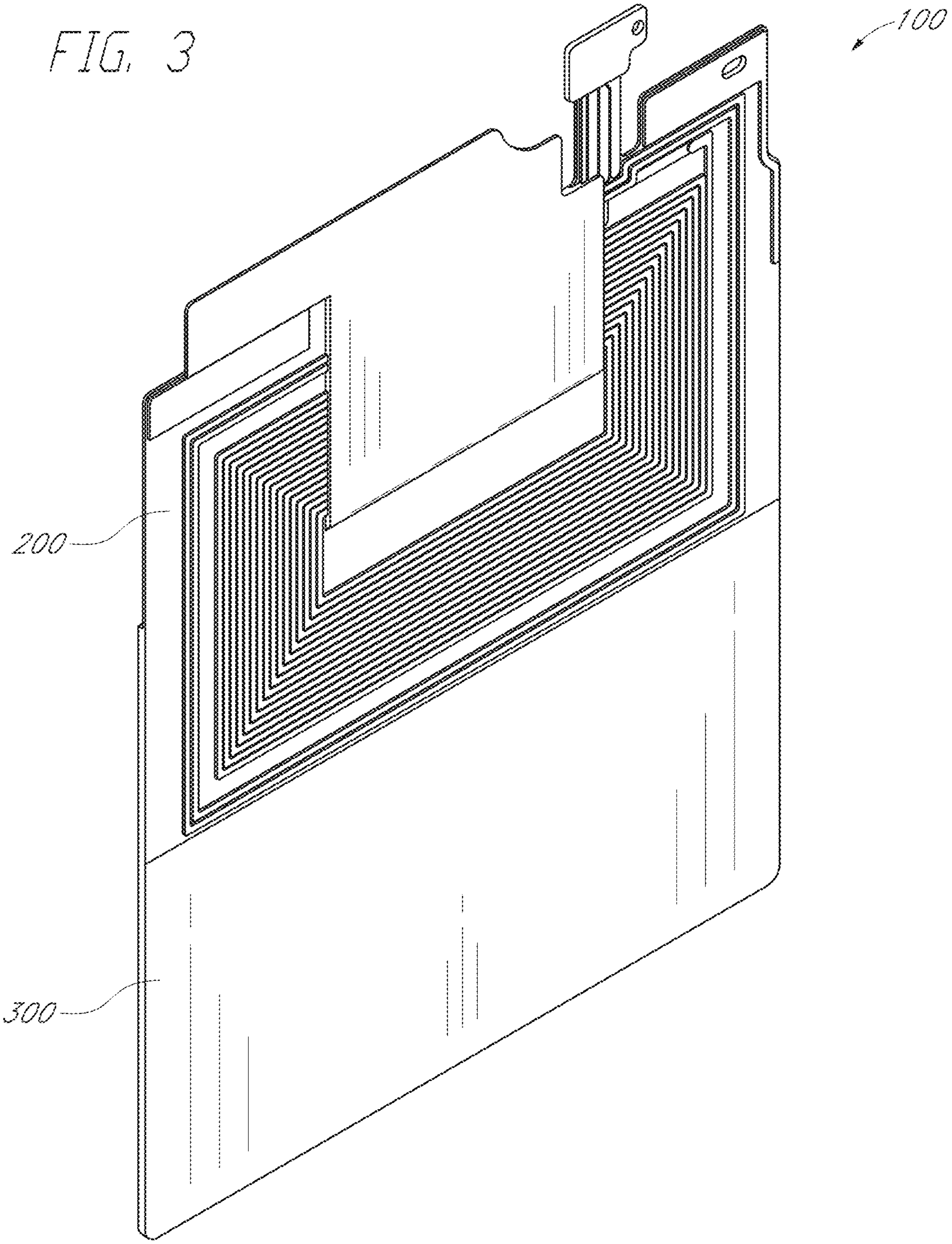
FIG. 3 is a perspective view of an antenna module according to an embodiment of the invention.
Figure 4:
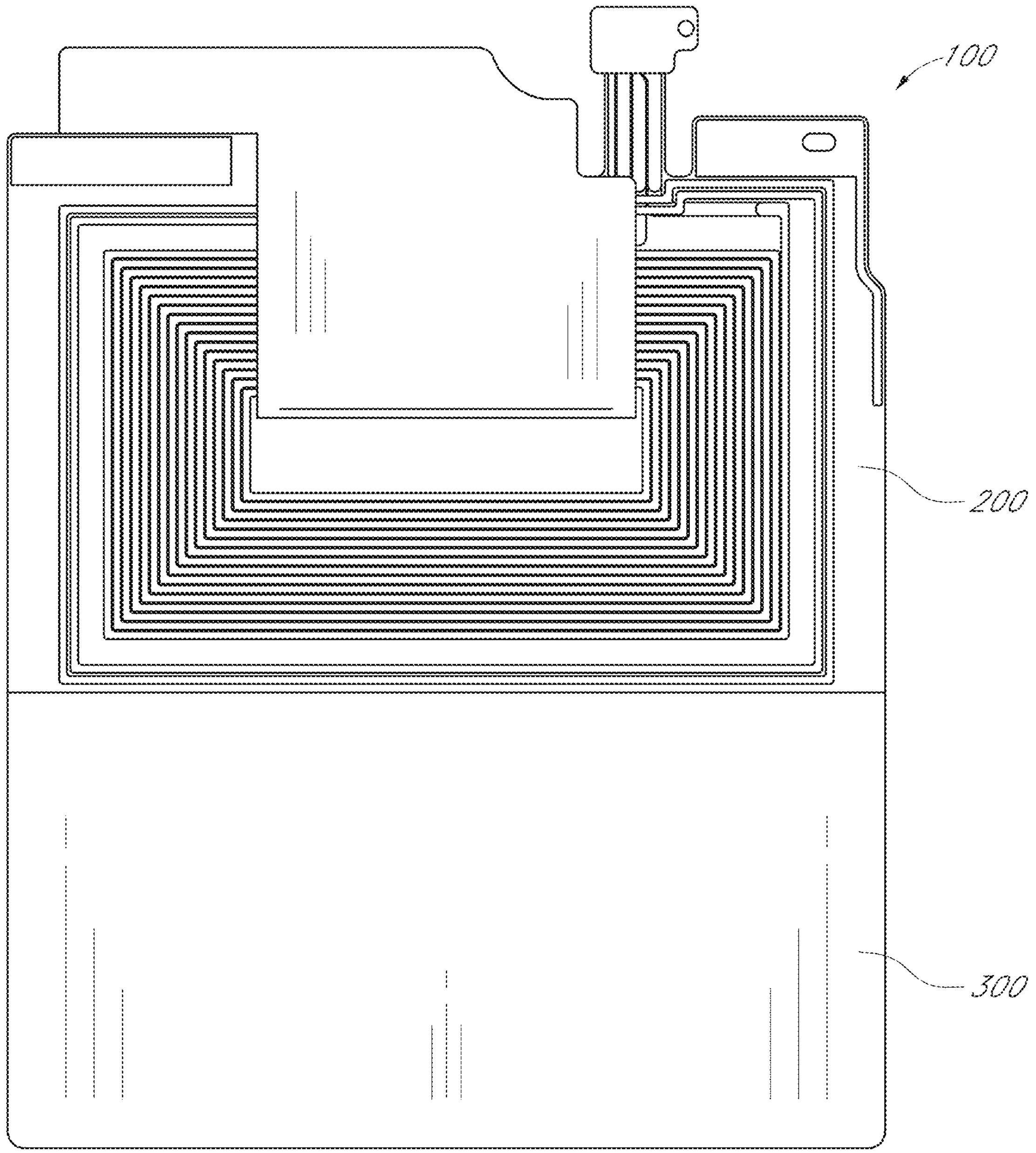
FIG. 4 is a front view of the antenna module shown in FIG. 3.
Figure 5:
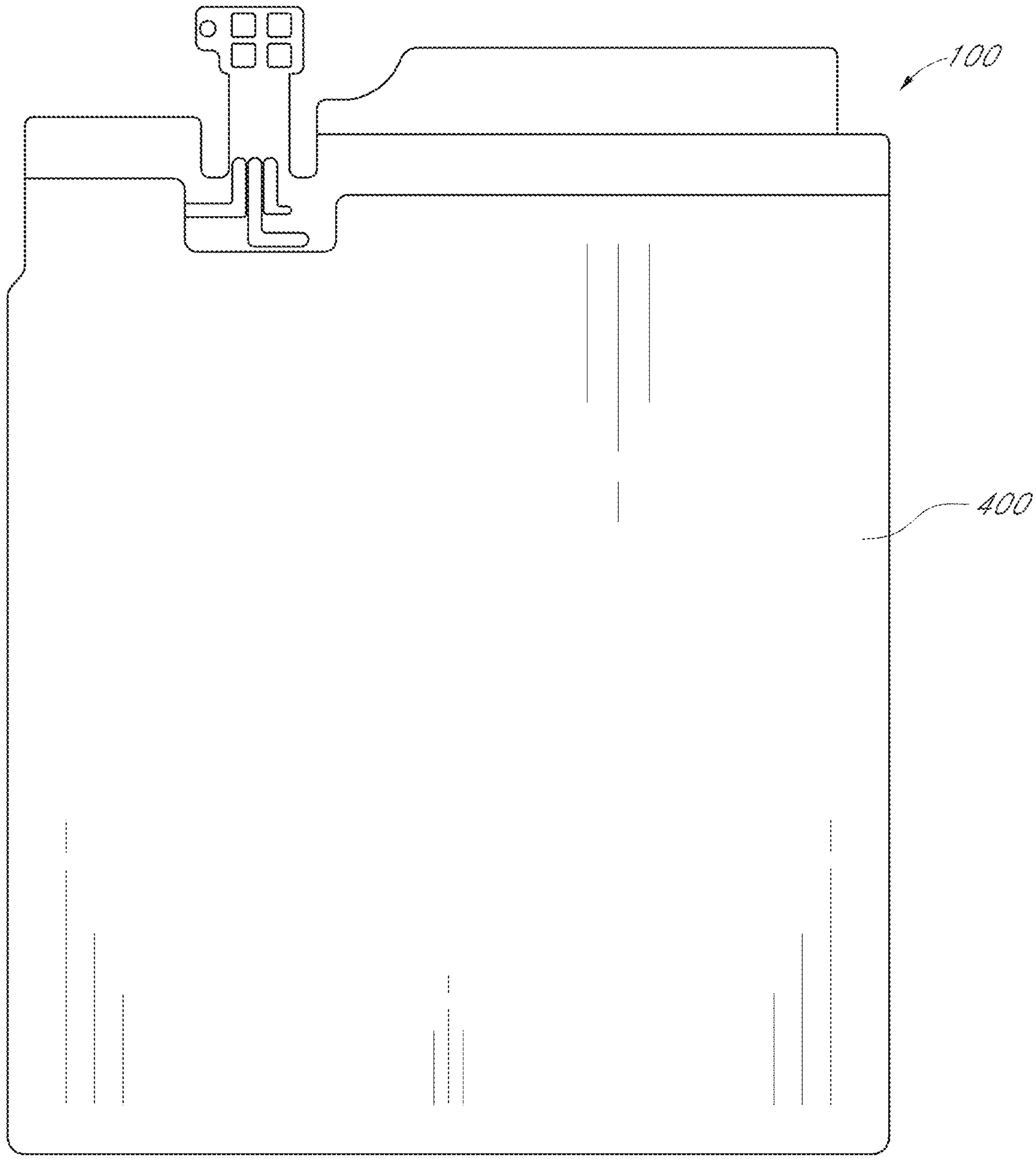
FIG. 5 is a rear view of the antenna module shown in FIG. 3.

In embodiments, referring to FIGS. 1 and 2, a smartphone 10 includes components which include circuits, a display 12, a battery, a camera 15, communication modules and the like. The components are densely integrated in a housing 18 of the smartphone. Recently, for various reasons, the housing of the smartphone tends to be made of a metal. However, the metal housing may significantly affect operations of various antennas in the smartphone. Even in smartphones using non-metallic housing, due to the high degree of compactness, internal components such as a battery may also significantly affect the operations of the antennas.

NFC Antenna and MST Antenna

In embodiments, a smartphone can include an NFC antenna and an MST antenna. The NFC antenna and the MST antenna, among the antennas, use a considerably low frequency band and handle wireless signals of considerably long wavelengths as compared with other wireless antennas, it is typical that the NFC antenna and the MST antenna have sizes greater than those of other antennas. Accordingly, the location of the NFC antenna and the MST antenna overlap with the location of the metal housing, the battery or the like more than those of the other antennas. This requires improvements in the structures of the NFC antenna and the MST antenna and further requires improved layout arranging the NFC antenna and the MST antenna. In embodiments, referring to FIG. 2, a flexible antenna module or apparatus 100 is included in the smartphone.

Flexible Antenna Module

In embodiments, referring to FIGS. 2-5, a flexible antenna module or apparatus 100 is formed in a single, thin, flexible body in which coil antennas for providing an MST antenna and an NFC antenna are integrated. The flexible antenna module includes a flexible PCB 200 with coil antenna (coil A) 204 and coil antenna (coil B) 206 for providing the MST antenna and the NFC antenna and further includes a magnetic sheet 300 which is engaged with the flexible PCB 200. The flexible PCB 200 and the magnetic sheet 300 are integrated with each other to form the single, thin, flexible body. In embodiments, additional protective and insulating coatings 400 may be coated over surfaces of the single body (see FIG. 5).

Flexible PCB

In embodiments, referring to FIGS. 3-6, 8, and 9, the flexible PCB 200 has a rectangular sheet shape with a through hole 202 at its center. The flexible PCB 300 includes two coil antennas 204, 206 and coatings coated over the coil antennas to form the sheet shape. Each coil antenna includes a printed wire coil. The two coil antennas include a first coil antenna 204 which functions as an MST antenna and a second coil antenna 206 which functions as an NFC antenna.

First Coil Antenna and Second Coil Antenna

In embodiments, referring to FIGS. 3-6, 8, and 9, the first coil antenna 204 surrounds or encircles the through hole 202 and the second coil antenna 206 surrounds encircles the first coil antenna 204 and the through hole 202. In embodiments, the first coil 204 may include 6, 7, 8, 9, 10, 11 or 12 turns coiled to turn around the through hole 202, but the invention is not limited thereto. The second coil 306 may include 2, 3, 4, 5 or 6 turns coiled to turn around the first coil 204 and the through hole 202, but the invention is not limited thereto. The number of turns of each coil may be modified or adjusted to provide an antenna length for a specific antenna function. In embodiments, the first coil antenna 204 includes turns more than that of the second coil antenna 206.

PCB Connector Portion

In embodiments, referring to FIGS. 3-6, 8, and 9, the flexible PCB 200 includes a PCB connector portion 208 for connecting the coil antennas 204, 206 to a counterpart connection terminal of a smartphone 10. The connector portion 208 includes an extension 210 located outside the second coil antenna 206 and four connector terminal pads 212 (see FIG. 9) formed in an end portion of the extension 210. Each coil antenna includes an inner terminal and an outer terminal. In an embodiment, the first coil antenna 204 includes a first inner terminal located in its inner portion and a first outer terminal located in its outer portion. Likewise, the second coil antenna 206 includes a second inner terminal located in its inner portion and a second outer terminal located in its outer portion. Each of the first and second inner terminals and the first and second outer terminals 204 and 206 is connected to one of the four terminal pads 212 via one or more connector lines.

Location of Connector Portion

Figure 19:
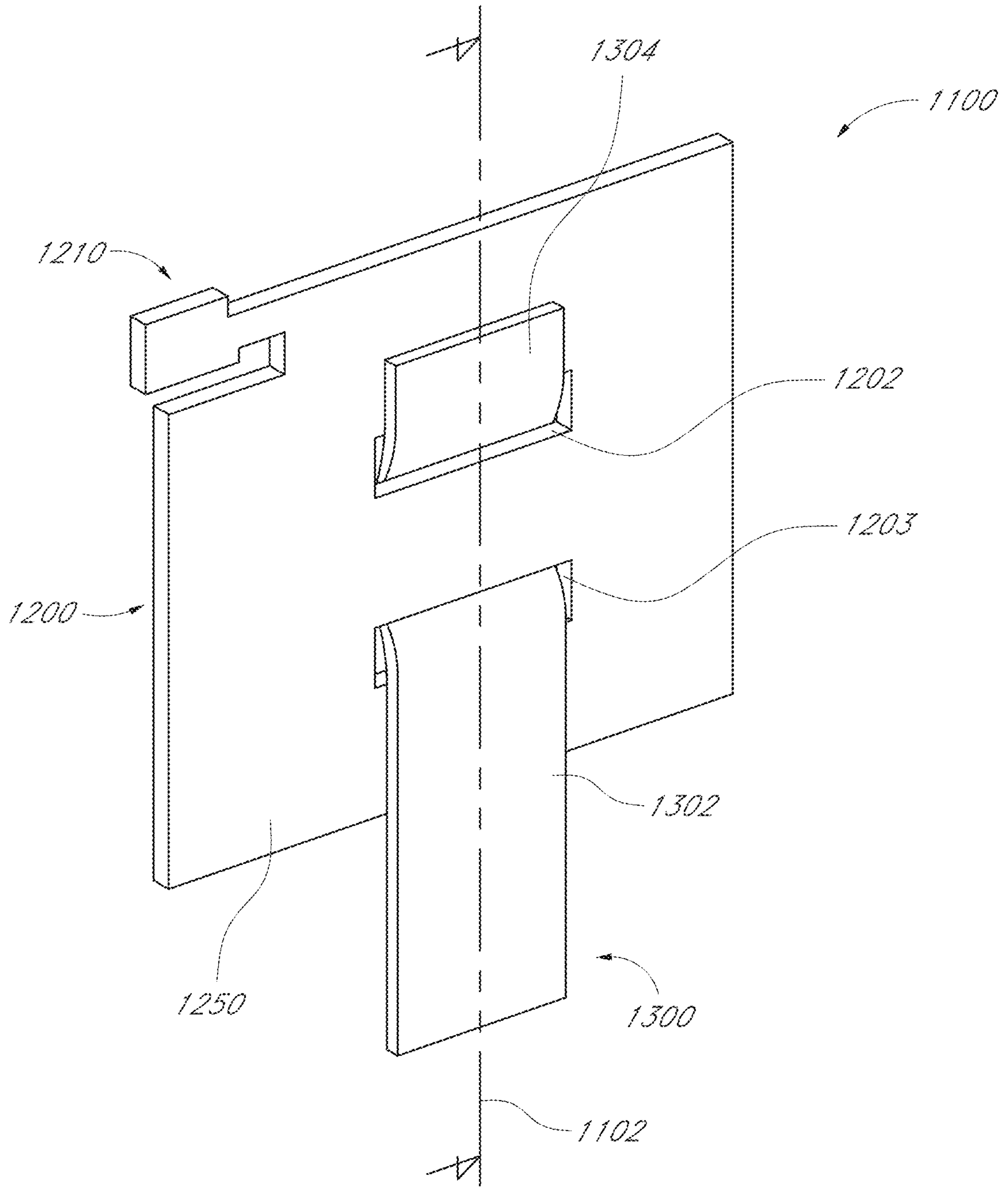
FIG. 19 is a perspective view of the antenna module according to an embodiment of the invention.

In the embodiments illustrated in FIGS. 3-6, 8, and 9, the connector portion 208 includes the extension 210 extending from an upper edge of the flexible PCB. In some embodiments, the extension 210 may extend from a side of the flexible PCB 200 as shown in FIG. 19. Further, in other embodiments, may extend from a lower edge of the flexible PCB. In the discussion of embodiments, the terms "upper" and "lower" do not refer to their absolute location. In some circumstances, for example, an item labeled with the term "upper" may be located lower or under an item labeled with the term "lower.

Connector Lines

In embodiments, referring to FIGS. 3-6, 8, and 9, the flexible PCB 200 includes connector lines interconnecting between four terminal pads 212 and the terminals of the coil antennas, respectively. Connector lines include printed conductive lines. For example, a connector line 214 connects the inner terminal of the first coil antenna and one of the terminal pads 212. The connector line 214 extends from the inner portion of the first coil antenna 204 and the outer portion of the second coil antenna 206 (see FIGS. 6 and 9), while crossing lines of the first and second coil antennas 204 and 206 when viewed in a viewing direction along an arrow A shown in FIG. 6 and while extending over the front side of the first coil antenna 204 and the rear side of the second coil antenna 206. (Throughout the discussion of embodiments in the specification, the viewing direction is defined as a thickness direction of the flexible PCB generally perpendicular to a major flat surface of the flexible PCB. In some instances, the viewing direction may also be the same as a thickness direction of the magnetic sheet generally perpendicular to a major flat surface of the magnetic sheet. In other instances, the viewing direction may also be the same as a direction generally perpendicular to a major flat surface of the rear cover or rear wall of the smartphone when the antenna module is assembled in the smartphone.) Another connector line 216 among the connector lines connects the outer terminal of the first coil antenna 204 and one of the terminal pads 212. In embodiments, the connector lines may be formed in a layer of the flexible PCB that is different from another layer in which the first and second coils are formed.

Width and Thickness of Connector Lines

In embodiments, the connector line has a width greater than that of a line in the first coil antenna 204 and has a thickness smaller than that of the line in the first coil antenna 204. This configuration can reduce or minimize overall thickness of the antenna module when the coil antenna and the connector line are overlaid. The connector line 216 extends from the inner portion of the second coil antenna 206 and the outer portion of the first coil antenna 204, while crossing lines of the second coil antenna 206 when viewed in the viewing direction and while extending over the rear side of the second coil antenna 206. In the flexible PCB 200, the connector lines are insulated from the coil antennas 204 and 206 that they are crossing via insulation layers.

No Electrical Connection Between First Coil Antenna and Second Coil Antenna

In embodiments, referring to FIGS. 3-6, 8, and 9, there is no electric connection between the first coil antenna 204 and the second coil antenna 206 in the antenna module. Specifically, the first coil antenna 204 and the second coil antenna 206 are spaced apart from each other while the second coil antenna 206 surrounds or encircles the first coil antenna 204. Further, each of the connector lines is also spaced from other connector lines. One or more insulation layers are interposed between the first or second coil antenna and the connector lines crossing the first or second coil antenna. Also, each of the four connector terminal pads is apart from other connector terminal pads.

Magnetic Sheet

In embodiments, referring to FIGS. 3-5, and 7-9, the magnetic sheet 300 includes a generally rectangular base portion 302 and a head portion 304 extending from an edge 306 of the base portion 302. The head portion is contoured and sized to pass through the through hole 202 and has a width smaller than that of the base portion. In embodiments discussed above and below, the magnetic sheet may function as a magnetic core when the magnetic sheet passes through a through hole that a coil surrounds or the magnetic sheet is placed adjacent a coil.

Material of Magnetic Sheet

In embodiments, the magnetic sheet 300 contains magnetic material which is referred to as soft magnetic material or ferromagnetic material having a high magnetic permeability and a low coercive force. For example, ferrite or ferromagnetic metal or alloy can be used. In embodiments, the magnetic sheet is entirely made of the magnetic material. In other embodiments, the magnetic material powder or particles are dispersed in a plastic resin matrix of flexible sheet shape.

Ferrite Magnetic Sheet

In embodiments, the magnetic sheet 300 includes ferrite material. In one embodiment, ferrite magnetic material powder or particles are prepared and sintered to make the ferrite magnetic material sheet.

Nanocrystal Magnetic Sheet

In embodiments, the magnetic sheet 300 includes a laminate of plural nanocrystal sheets or layer. In one embodiment, each nanocrystal sheet or layer contains an alloy including or essentially consisting of iron (Fe), silicon (Si) and boron (B). Additionally, a small amount of copper (Cu), molybdenum (Mo), niobium (Nb) and nickel (Ni) may be added to the alloy. Typically, each nanocrystal sheet or layer is made thin, and thus, plural nanocrystal sheets (e.g., four or more nanocrystal magnetic sheets) are laminated to form the magnetic sheet 300.

Assembled State of Flexible PCB and Magnetic Sheet

In embodiments, referring to FIGS. 6-9, the flexible PCB 200 and the magnetic sheet 300 may be assembled as shown in the drawings. When assembled, the head portion 304 of the magnetic sheet 300 passes through the through hole 202. The head portion 304 has a first sheet portion 320 placed over a first PCB section 220 of the flexible PCB while the base portion 302 has a second sheet portion 322 placed under a second PCB section 222 of the flexible PCB. The second PCB section 222 is located on an opposite side of the first PCB section 220 across the through hole 202.

Coils and Magnetic Sheet

As a result, in embodiments, the first sheet portion 320 overlaps coil portions of the first coil antenna 204 which are located in the first PCB section 220. Further, the first sheet portion 320 further overlaps coil portions of the second coil antenna 206 which are located in the first PCB section 220. Similarly, the second sheet portion 322 overlaps coil portions of the first coil antenna 204 which are located in the second PCB section 222. Further, the second sheet portion 322 further overlaps coil portions of the second coil antenna 206 which are located in the second PCB section. In other embodiments, the first sheet portion does not overlap the coil portions of the second coil antenna 206 which are located in the first PCB section 220 while the first sheet portion 320 further overlaps coil portions of the second coil antenna 206 which are located in the first PCB section 220.

Through Hole and Magnetic Sheet

Figure 8:
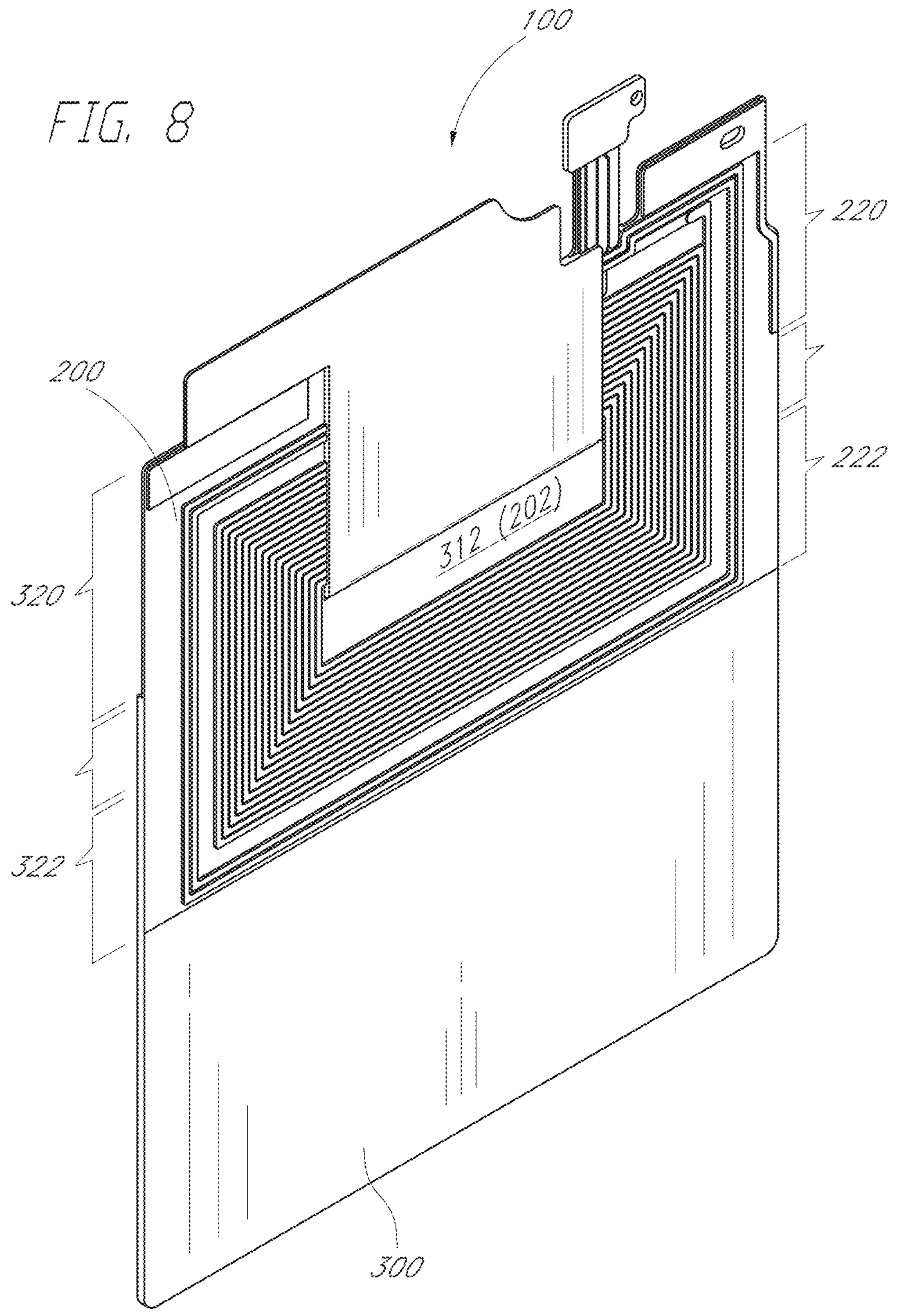
FIG. 8 is a perspective view of an assembly of the flexible PCB of FIG. 6 and the magnetic sheet of FIG. 7 according to an embodiment.
Figure 9:
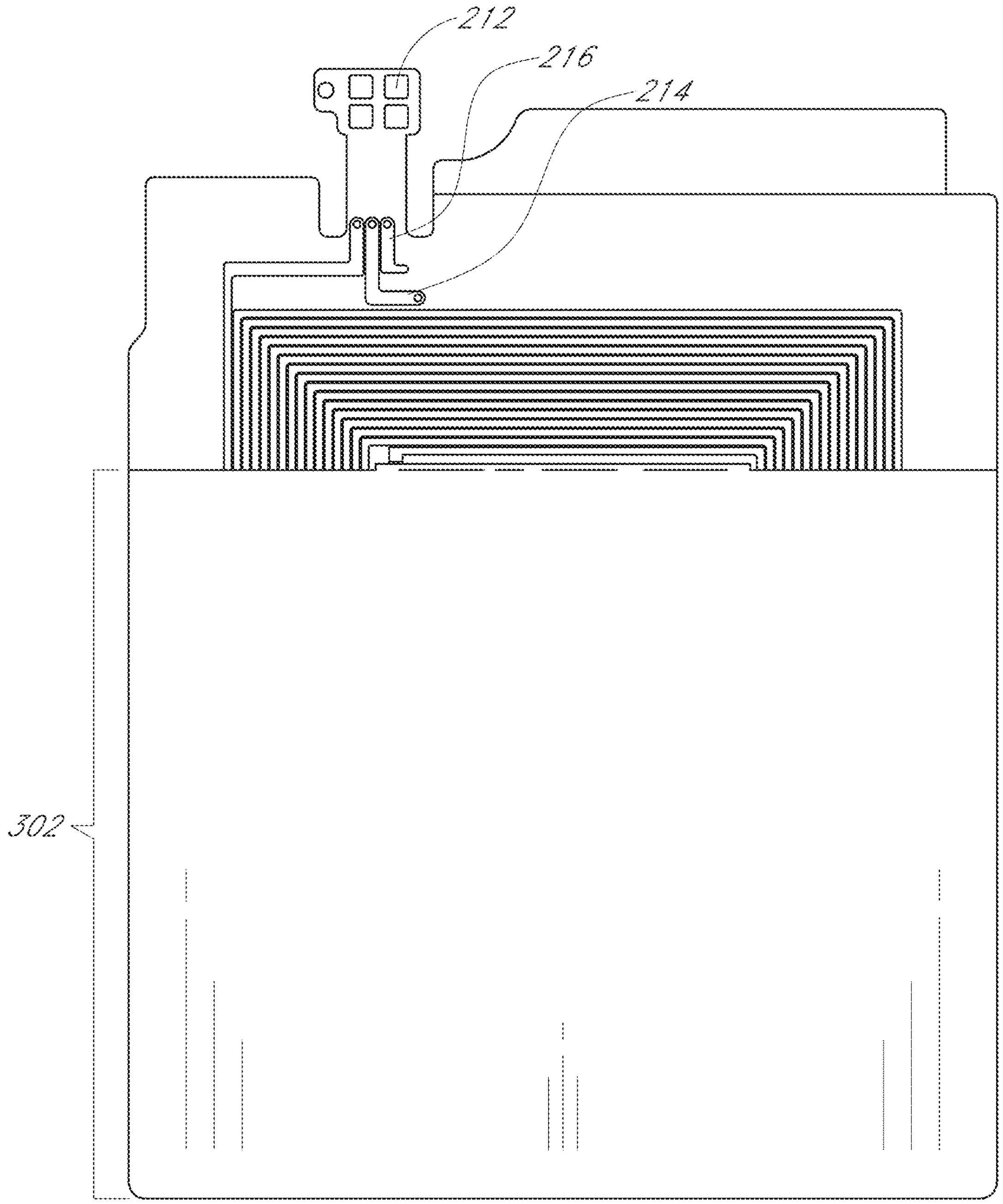
FIG. 9 is a rear view of the assembly shown in FIG. 8.

In embodiments, referring to FIG. 8, the magnetic sheet 300 further includes an intermediate sheet portion 312 overlapping the through hole 202. The intermediate sheet portion 312 interconnects the first sheet portion 320 and the second sheet portion. In one embodiment, the intermediate sheet portion 312 may be a portion of the head portion 304. In another embodiment, the intermediate sheet portion 312 may be a portion of the base portion 302. In other embodiments, the intermediate sheet portion 321 may include both a portion of the head portion 304 and a portion of the base portion 302.

Assembling Flexible PCB and Magnetic Sheet

In embodiments, referring to FIGS. 6-9, when assembling, the head portion 304 is inserted through the through hole 202 and passes the through hole 202 until the edge 306 contacts the flexible PCB. Then, the base portion 302 is attached to the second PCB section 222 by using, for example, an adhesive. In other embodiments, the head portion 304 is attached to the first PCB section 220.

Sizes of Portions of Flexible PCB and the Portions of Magnetic Sheet

Figure 6:
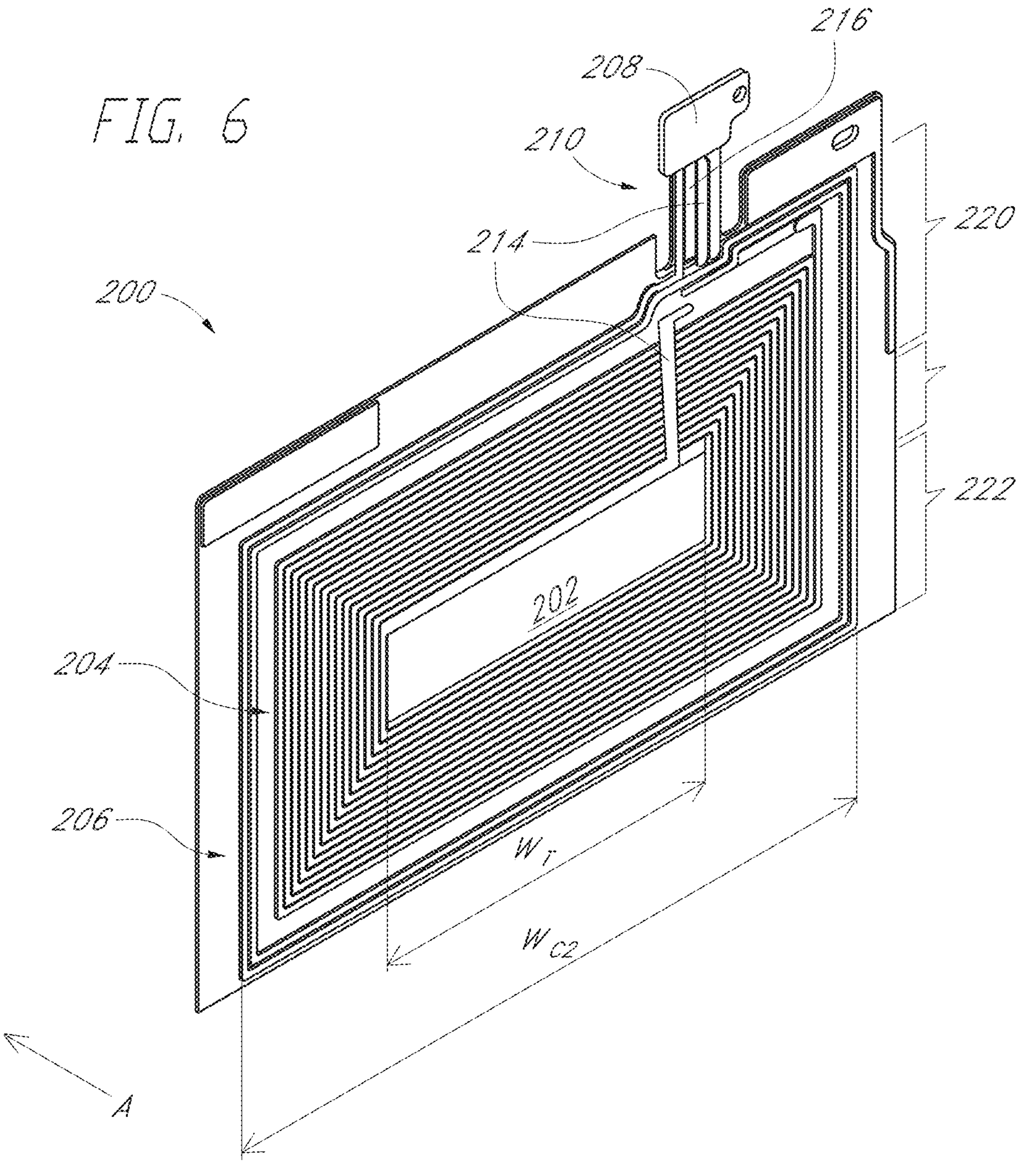
FIG. 6 is a perspective view of a flexible PCB according to an embodiment of the invention.
Figure 7:
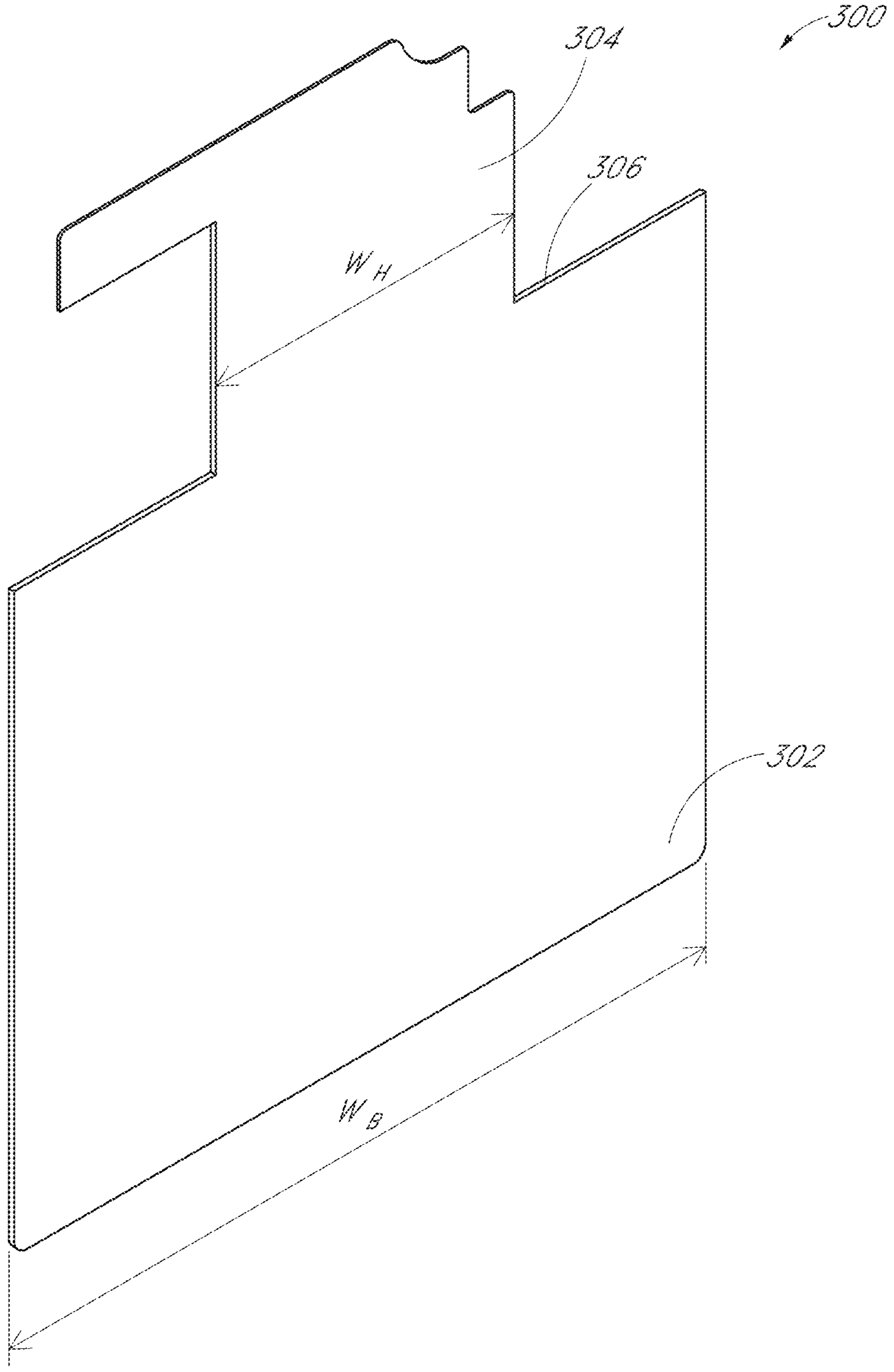
FIG. 7 is a perspective view of a magnetic sheet according to an embodiment of the invention.

In embodiments, referring to FIGS. 6, 7 and 8, the head portion 304 (the first sheet portion 320) has a width $W_H$ smaller than that $W_T$ of the through hole 202 such that the head portion 304 passes through the through hole without bending the magnetic sheet 300. Further, the base portion 302 (the second sheet portion 322) has a width $W_B$ greater than that $W_T$ of the through hole 202 such that the head portion 304 cannot pass through the through hole without bending the magnetic sheet 300. Additionally, the base portion 302 (the second sheet portion 322) has a width $W_B$ greater than that $W_{C2}$ of the second coil antenna 206. However, the invention is not limited thereto. In another embodiment, the base portion 302 (the second sheet portion 322) has a width $W_B$ smaller than that $W_T$ of the through hole 202. In a further embodiment, the head portion 304 (the first sheet portion 320) has a width $W_H$ greater than that $W_T$ of the through hole 202 such that the head portion 304 passes through the through hole with bending the magnetic sheet 300. In other embodiments, the head portion 304 (the first sheet portion 320) has a width $W_H$ substantially the same as that $W_B$ of the base portion 302 (the second sheet portion 322).

Single Body of Flexible Antenna Module

Over surfaces of the assembly of the flexible PCB and the magnetic sheet, in embodiments, protective and insulation coatings are further coated to complete making the single body of the flexible antenna module.

Flexible Antenna Module in Smartphone

In embodiments, referring to FIGS. 2 and 10, the flexible antenna module 100 is attached to the smartphone's rear cover 22. The connector terminal pads 212 of the connector portion 208 are electrically connected to circuits in the smartphone 10.

Coil Antenna for MST Antenna

In embodiments, the inner and outer terminals of the first coil antenna may be connected to an MST circuit in the smartphone 10 such that the first coil antenna functions as an MST antenna or MST inductor. Magnetic secure transmission (MST) is also referred as magnetic stripe transmission or magnetic secure transmission as disclosed in US 2016/0180120 A1 entitled "MAGNETIC SECURE TRANSMISSION DEVICE HARDWARE," the entire disclosure of which is incorporated by reference herein. In other embodiments, however, the second coil antenna may function as an MST antenna.

Coil Antenna for NFC Antenna

In embodiments, the inner and outer terminals of the second coil antenna 206 are connected to an NFC circuit in the smartphone 10 such that the second coil antenna functions as an NFC antenna. Near Field Communication (NFC) is a standard allowing wireless communication in a Radio Frequency (RF) band between portable devices, such as smartphones, or between a portable device and a fixed device (an NFC terminal). In other embodiments, however, the first coil antenna may function as an NFC antenna.

Operation of First and Second Coil Antennas

In embodiments, the smartphone with the antenna module has a controller which operates the first and second coils as an MST antenna and an NFC antenna, respectively. The controller can operate the antenna coils such that the first coil antenna does not operate as an MST antenna while the second coil is operating as an NFC antenna. Similarly, the controller operates the antenna coils such that the second coil antenna does not operate as an NFC antenna while the first coil is operating as an MST antenna. In some embodiments, the antenna module may have three or more coil antennas and the controller operates the three or more coil antennas such that only one coil antenna among the three or more coil antennas is operating and the other coil antennas is not working. In embodiments, the controller does not allow two coil antennas among the three or more coil antennas to work at the same time.

One Coil Antenna Functioning as Two Different Antennas

In embodiments, one of the coil antennas in the antenna module can function as both the MST antenna and the NFC antenna according to control signals from the controller of the smartphone. In one embodiment, the first coil antenna may function as the MST antenna in one period of time and the NFC antenna in another period of time. The second coil antenna may function as another antenna, for example, a wireless power charging antenna.

Smartphone's Rear Cover and Antenna Module

In embodiments, referring to FIGS. 2 and 10, the antenna module 100 is attached to the smartphone's rear cover 22 such that the head portion 304 is interposed between the first PCB section 220 and the rear cover or rear wall 22 while the second PCB section 222 is interposed between the base portion 302 and the rear cover 22. However, the invention is not limited thereto. In other embodiments, the base portion is interposed between the second PCB section and the rear cover while the first PCB section is interposed between the head portion and the rear cover.

Material of Rear Cover

In embodiments, referring to FIGS. 2 and 10, the smartphone 10 includes a rear cover 22. The rear cover can be made of non-metal material, for example, a plastic resin. Generally, non-metal rear covers do not interfere with wireless communications between antennas inside the smartphone and devices outside the smartphone. In other embodiments, the rear cover can be made of a metal which is electrically conductive and non-magnetic. For example, copper or aluminum may be used for the rear cover. Generally, metal rear covers can interfere with wireless communications between antennas inside the smartphone and devices outside the smartphone.

Metal Rear Cover of Smartphone

In embodiments, referring to FIGS. 2 and 10, when the rear cover 22 is made of a metallic material, a smartphone 10 has a non-metal strip portion 28 in the rear cover and the antenna module is located with respect to the non-metal strip portion 28 to reduce or minimized interference caused by the metallic rear cover.

Locational Relationship Between Magnetic Sheet and Non-Metal Portion of Rear Cover In embodiments, referring to FIG. 10, the magnetic sheet 300 has a lower end and the antenna module is located in the smartphone such that the lower end of the magnetic sheet 300 is sufficiently close to the non-magnetic strip portion 28. This configuration allows the electromagnetic signals generated from the first coil antenna 204 or the second coil antenna 206 to be transmitted through the non-magnetic strip portion 28. In other embodiments, as shown in FIGS. 11-14, the antenna module is attached to the rear cover such that the magnetic sheet 300 partially or completely overlaps or covers the non-magnetic strip portion 28.

Other Embodiments of Magnetic Sheet

In embodiments, the head portion has a width greater than that of the through hole. In this configuration, the head portion is bent when passing through the through hole. The magnetic sheet further includes a neck portion between the base portion and the head portion. The neck portion has a width smaller than that of the through hole.

Two or More Magnetic Sheet Pieces

Figure 15:
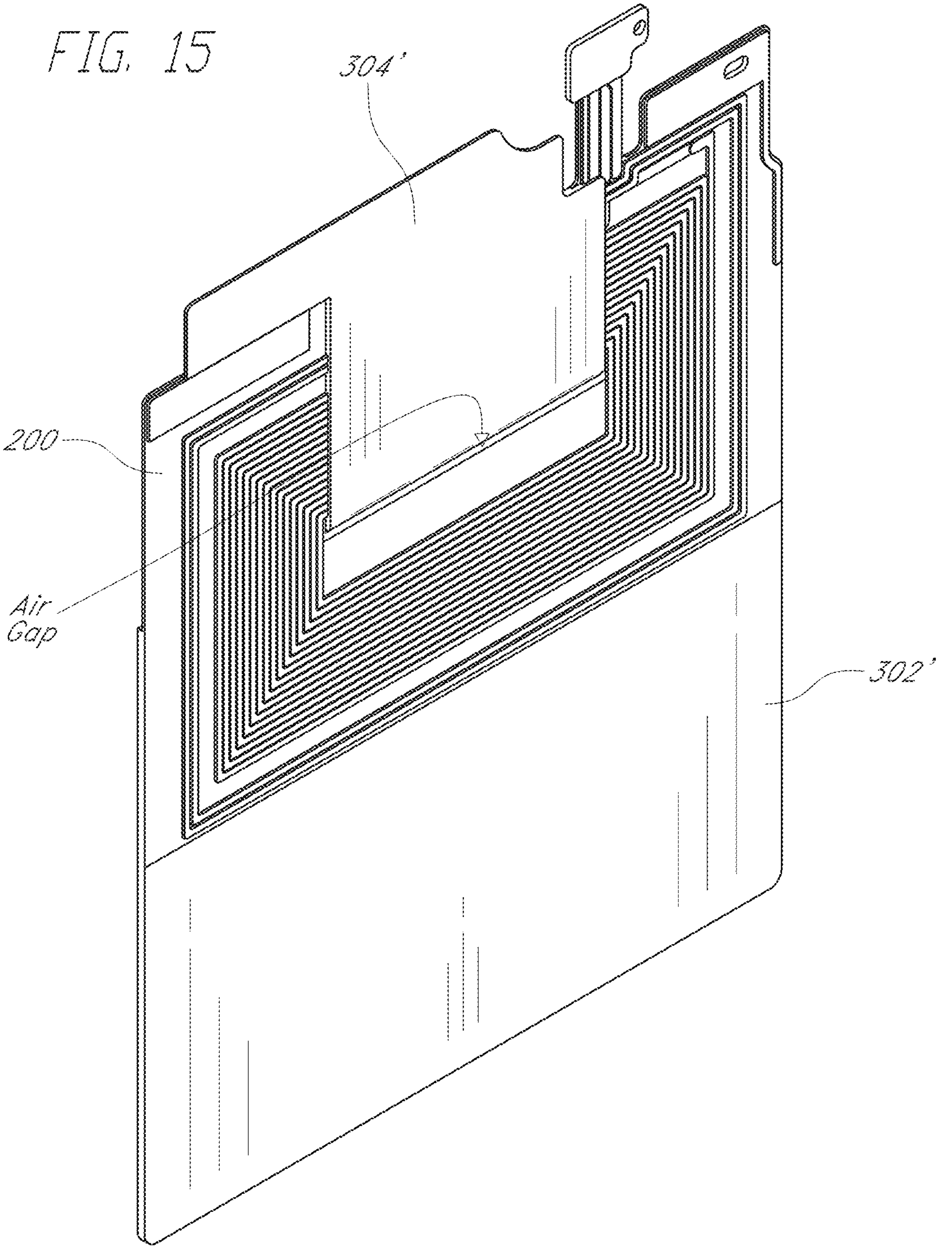
FIG. 15 is a perspective view of an assembly of a flexible PCB and multiple magnetic sheet pieces according to another embodiment of the invention.

In embodiments, instead of the magnetic sheet 300 discussed in the above, two or more magnetic sheet pieces can be used. In embodiments, referring to FIG. 15, the two or more magnetic sheet pieces include a first magnetic sheet piece 304' and a second magnetic sheet piece 302'. In one embodiment, the first magnetic sheet piece 304' can have substantially the same size and shape as the head portion 304 of the magnetic sheet 300 shown in the drawings. Further, the second magnetic sheet piece 302' can have substantially the same the same size and shape as the base portion 302 of the magnetic sheet 300 shown in the drawings. As shown in FIG. 15, the first magnetic sheet piece 304' and the second magnetic sheet piece 302' are slightly spaced from each other and have an air gap therebetween.

Gap Between Two Magnetic Sheet Pieces

As shown in FIG. 15, in embodiments, the first magnetic sheet piece 304' includes a first edge and the second magnetic sheet piece 302' includes a second edge which is opposing the first edge. The first and second magnetic sheet pieces 304' and 302' are slightly spaced from each other to form a gap. The size of the gap (distance between the first edge and the second edge) can be at or about 0.05 mm, 0.1 mm, 0.15 mm, 0.2 mm, 0.25 mm, 0.3 mm, 0.35 mm, 0.4 mm, 0.45 mm, 0.5 mm, 0.6 mm, 0.7 mm, 0.8 mm, 0.9 mm, 1 mm, 2 mm, 3 mm or 4 mm. In embodiments, the size of air gap may be within a range formed by selecting any two numbers listed in the immediately previous sentence, e.g., between about 0.05 mm and about 0.5 mm or between about 0.3 mm and about 1 mm. However, the invention is not limited thereto. In another embodiment the first edge contacts the second edge. In other embodiments, the first magnetic sheet piece 304' and the second magnetic sheet piece 302' can slightly overlap each other in the through hole of the flexible PCB.

Material of First and Second Magnetic Sheet Pieces

In embodiments, the first and second magnetic sheet pieces 304' and 302' together provide path for magnetic flux. Thus, like the magnetic sheet 300, the first and second magnetic sheet pieces 304' and 302' are made of soft magnetic material. Both the first and second magnetic sheet pieces are made of the same magnetic material. In other embodiments, the first magnetic sheet piece is made of a material different from that of the second magnetic sheet piece. For example, the first magnetic sheet piece is made of a ferrite magnetic sheet and the second magnetic sheet piece is made of a laminate of nanocrystal magnetic layers, or vice versa.

Two or More Stacked Magnetic Sheets

Figure 16:
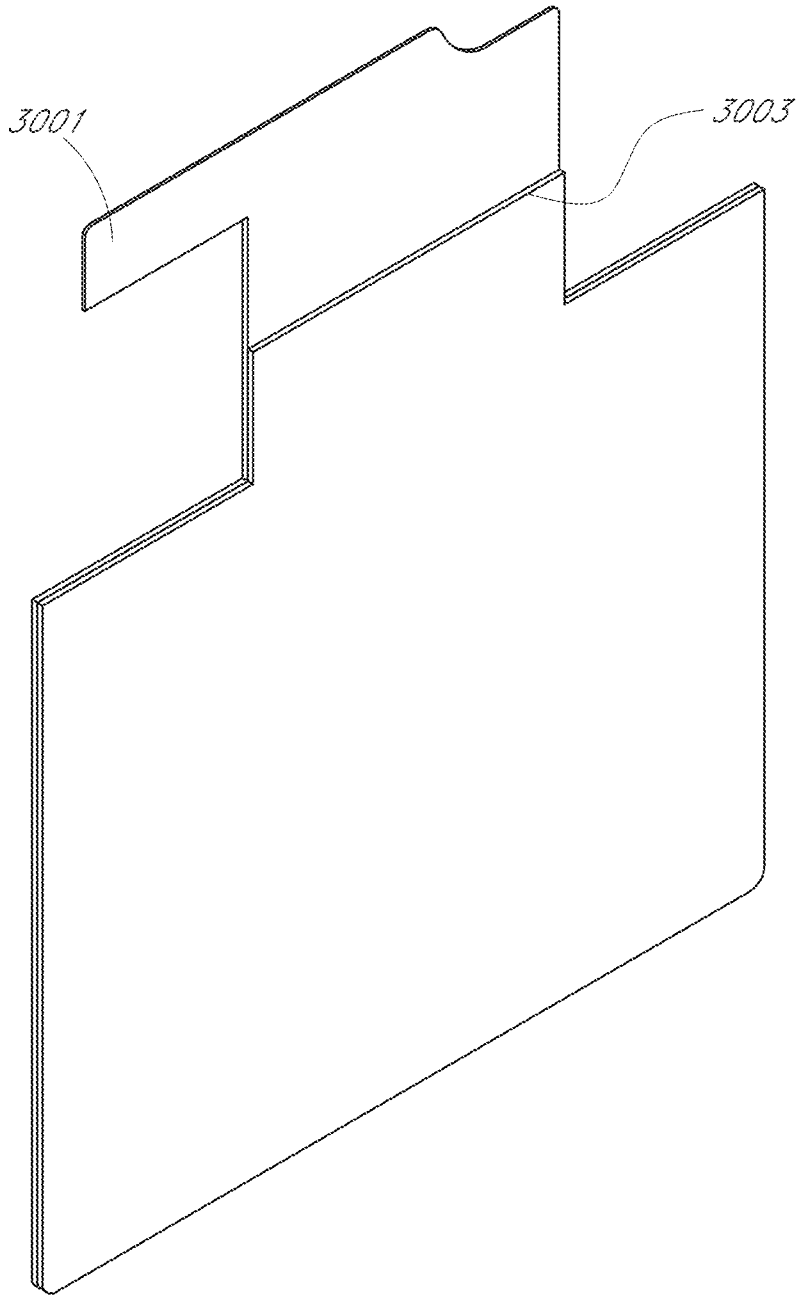
FIG. 16 is a perspective view of two overlapping magnetic sheets according to a further embodiment of the invention, in which the two overlapping magnetic sheets have different sizes and different materials.

In embodiments, rather than using a single magnetic sheet 300 as shown in FIG. 7, two or more overlapping magnetic sheets can be used. In one embodiment, as shown in FIG. 16, the two or more overlapping magnetic sheets include a first magnetic sheet 3001 and a second magnetic sheet 3003. The first magnetic sheet 3001 is made of a material different from that of the second magnetic sheet 3003. For example, the first magnetic sheet 3001 is made of the ferrite magnetic sheet discussed above and the second magnetic sheet 3003 is made of a nanocrystal magnetic sheet laminate discussed above. In some embodiments, more than two of the ferrite magnetic sheets and more than two of the nanocrystal magnetic sheet laminates are alternatingly stacked. The two or more overlapping magnetic sheets can be bonded to each other to form a single body. In other embodiments, the two or more magnetic sheets are not bonded until the flexible PCB and the magnetic sheets are made into a single body of the flexible antenna module as discussed below.

Operation of Plural Magnetic Sheets

The ferrite magnetic sheet and the nanocrystal magnetic sheet laminate may have different magnetic properties or characteristics. Generally, the nanocrystal magnetic sheet laminate has permeability greater than that of the ferrite magnetic sheet. For this reason, the ferrite magnetic sheet shows performance higher than the nanocrystal magnetic sheet laminate when working with an NFC antenna which works at a frequency greater than that of an MST antenna. On the other hand, the nanocrystal magnetic sheet laminate shows performance higher than the ferrite magnetic sheet when working with an MST antenna. Thus, the overlapping structure of different magnetic sheets works effectively when the first coil antenna and the second coil antenna work for different antenna functions, for example, an MST antenna and an NFC antenna as discussed below.

Locational Relationship Between Coil Portions and Magnetic Sheets

Figure 17:
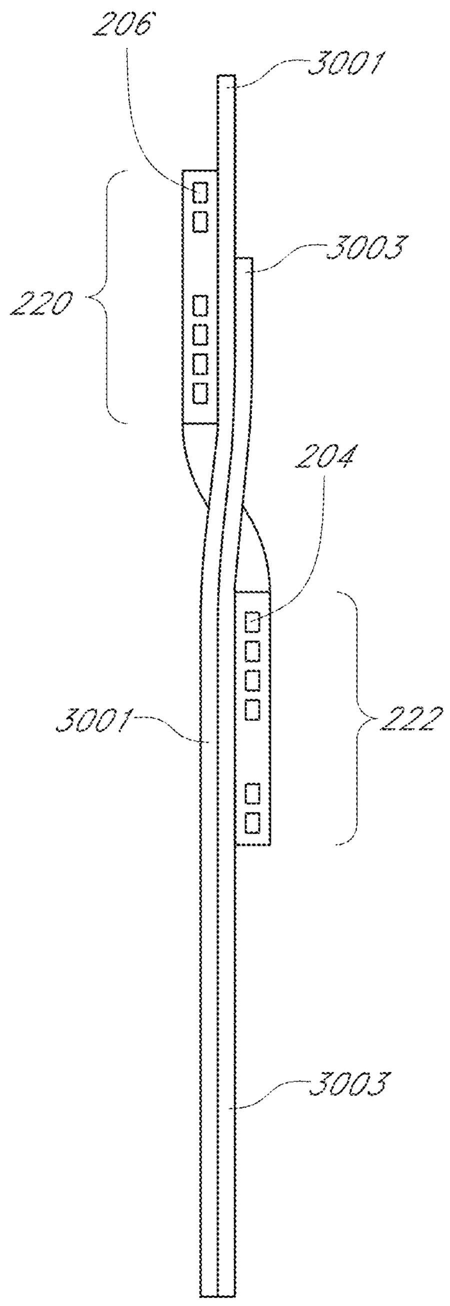
FIG. 17 is a sectional view of an assembly of a flexible PCB and the two overlapping magnetic sheets shown in FIG. 16.
Figure 22:
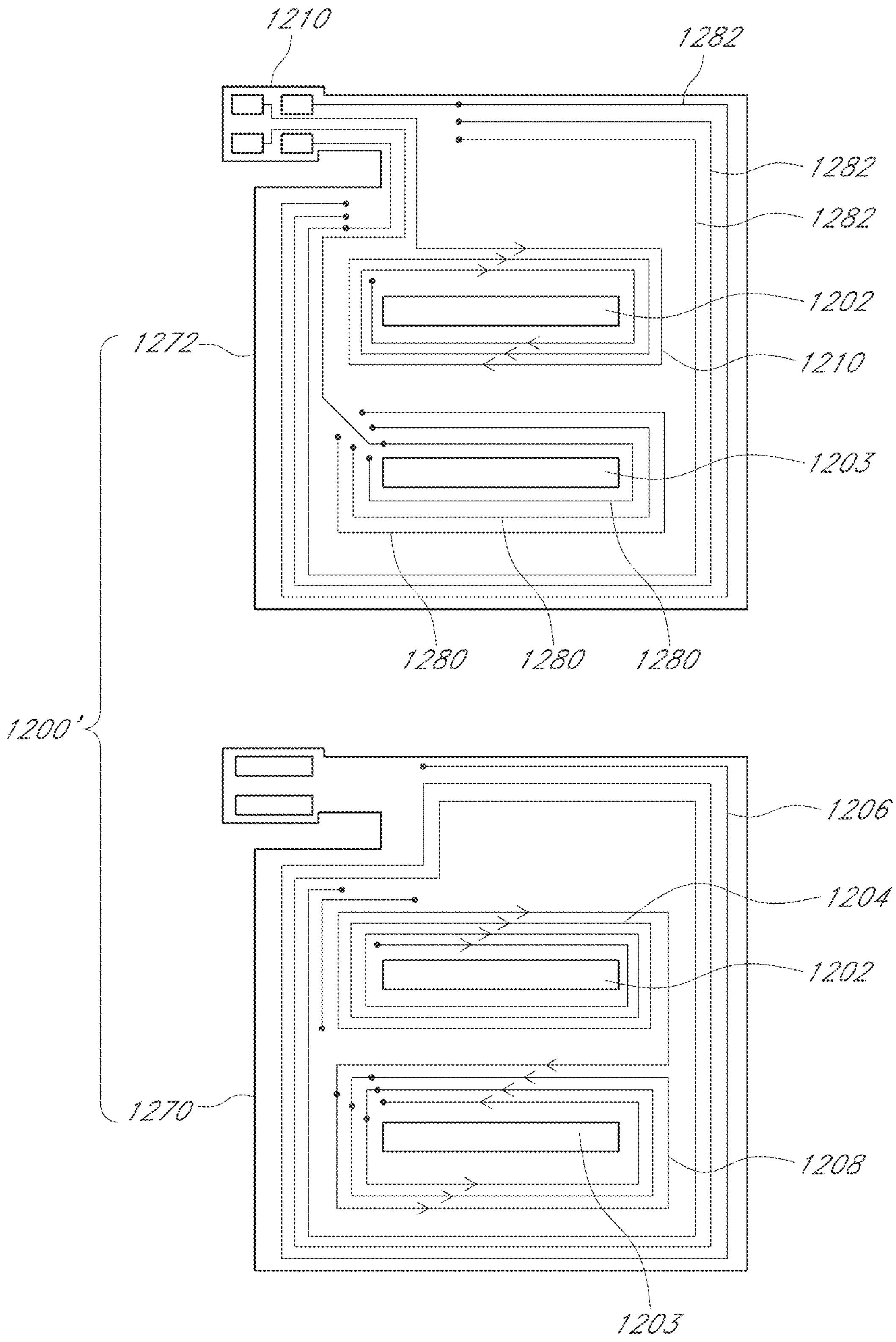
FIG. 22 shows front views of bottom and top layers of a flexible PCB according to an alternative embodiment of the antenna module shown in FIG. 19, schematically illustrating patterns of coils, conductive lines and terminal pads in the top and bottom layers of the flexible PCB.

In embodiments, referring to FIGS. 6 and 22, when the first coil 204 is used for an MST antenna and the second coil 206 is used for an NFC antenna, both a ferrite magnetic sheet 3001 and a nanocrystal magnetic sheet laminate 3003 that are stacked can be used. In one embodiment, the ferrite magnetic sheet and the nanocrystal magnetic sheet have the same shape and the same size such that they completely overlap each other, and the magnetic sheet assembly works as a single magnetic sheet shown in FIG. 7. In other embodiments, referring to FIGS. 16 and 17, the ferrite magnetic sheet is longer than the nanocrystal magnetic sheet laminate in the magnetic sheet assembly. When assembled with the flexible PCB, the ferrite magnetic sheet 3001 overlaps coil portions of the second coil antenna 206 which are located in the first PCB section 220 whereas the nanocrystal magnetic sheet laminate 3003 does not overlap the coil portions of the second coil antenna 206 which are located in the first PCB section 220, when viewed in the viewing direction. However, the invention is not limited thereto. In embodiments, when the first coil 204 is used for an NFC antenna and the second coil 206 is used for an MST antenna, the ferrite magnetic sheet is shorter than the nanocrystal magnetic sheet laminate such that the ferrite magnetic sheet does not overlap coil portions of the second coil antenna 206 which are located in the first PCB section 220 whereas the nanocrystal magnetic sheet laminate overlaps the coil portions of the second coil antenna 206 which are located in the first PCB section 220 when viewed in the viewing direction.

Modification of Embodiments Shown in FIGS. 3-17

The embodiments discussed above can be modified in various ways. In modified embodiments, the first coil antenna includes two or more coils electrically connected to each other in series or in parallel in the flexible PCB. In one modified embodiment, the two or more coils of the first coil can be arranged side by side. In another modified embodiment, the two or more coils are arranged to overlap each other when viewed in the viewing direction. Likewise, the second coil antenna may include two or more coils electrically connected to each other in series or parallel in the flexible PCB.

Further Modification of Embodiments Shown in FIGS. 3-17

In one modified example, a smartphone antenna module includes a magnetic sheet and a flexible PCB. The magnetic sheet includes a first sheet portion, a second sheet portion and an intermediate portion located between and connecting the first and second sheet portions. The flexible PCB includes a first coil, a second coil and a third coil. When viewed in the viewing direction, the first and third coils are arranged side by side and the second coil surrounds both the first and third coils. The flexible PCB has a first core area that the first coil surrounds when viewed in the viewing direction and a second core area that the third coil surrounds when viewed in the viewing direction. A through hole is formed in the first core area through the flexible PCB. The flexible PCB includes a first PCB section, a second PCB section and a third PCB section. The second PCB section is interposed between the first and third PCB sections. The first and second PCB sections are located opposite to each other across the first core area, and the second and third PCB sections are located opposite to each other across the second core area. No electrical connection is formed between the first coil and the second coil within the flexible PCB and no electrical connection is formed between the second coil and the third coil in the flexible PCB. The flexible PCB and the magnetic sheet are integrated in a single, flexible body, in which the flexible PCB and the magnetic sheet are arranged relative to each other such that: the first sheet portion is placed over the first PCB section and overlaps a first coil portion of the first coil formed in the first PCB section; the second sheet portion is placed under the second PCB section, overlaps a second coil portion of the first coil formed in the second PCB section and further overlaps a first coil portion of the third coil formed in the second PCB section, and at least part of the intermediate portion passes through the first through hole. Further, the second sheet portion is placed under the third PCB section and overlaps a second coil portion of the third coil formed in the third PCB section. The first and third coils may be connected in the antenna module either in series or parallel. The current in the first coil and the current in the third coil flow either in the same rotational direction or in the opposite rotational directions.

Other Embodiments of Flexible PCB

In embodiments discussed above, the antenna module includes two coils in which one coil surrounds the other. The invention is not limited thereto. In some embodiments, the antenna module includes three or more coils. In one embodiment, two coils among the three or more coils are arranged side by side. In another embodiment, one of the three or more coils surrounds another coil that surrounds one or more coils.

Electrical Connection Between Multiple Coils

Figure 18A:
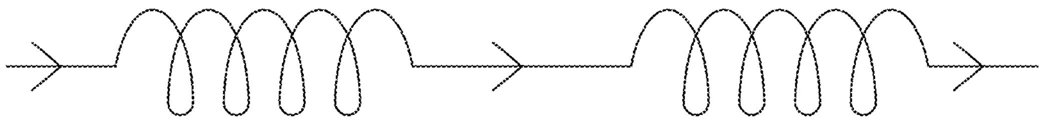
Figure 18B:
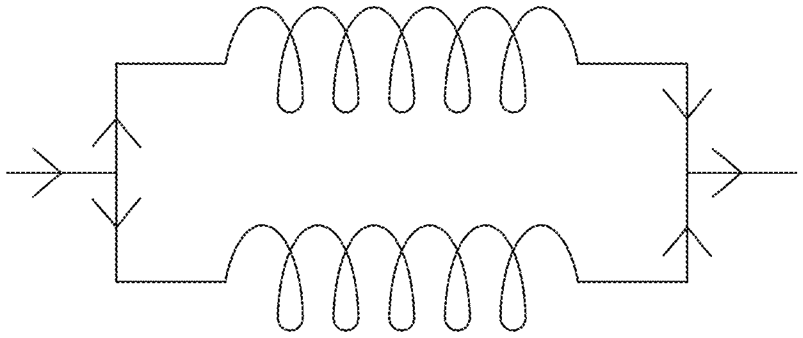

In embodiments, each coil is electrically decoupled or disconnected from other coils in the same antenna module, and each coil is used for a specific antenna function different from the antenna functions of the other coils. For example, a first one of the multiple coils is used as an MST antenna, a second one of the multiple coils is used as an NFC antenna and a third one of the multiple coils is used as a wireless power charging antenna. In another embodiment, two coils among the multiple are electrically connected in the same antenna module. For example, to form a serially connected coil antenna as shown in FIG. 18A the two coils may be connected in series. To form a connected-in-parallel coil antenna as shown in FIG. 18B the two coils may be connected in parallel. In embodiments, the two coils connected to each other can be used as a single antenna. For example, in an antenna module that includes coil A, coil B and coil C, coil A and coil C are connected to each other and can be used as an MST antenna while coil B is decoupled from coil A and coil C and can be used as an NFC antenna. Details of configurations and functions of multiple coils in a single antenna module are further discussed below.

Coil a, Coil B and Coil C in the Same Flexible PCB

Figure 20:
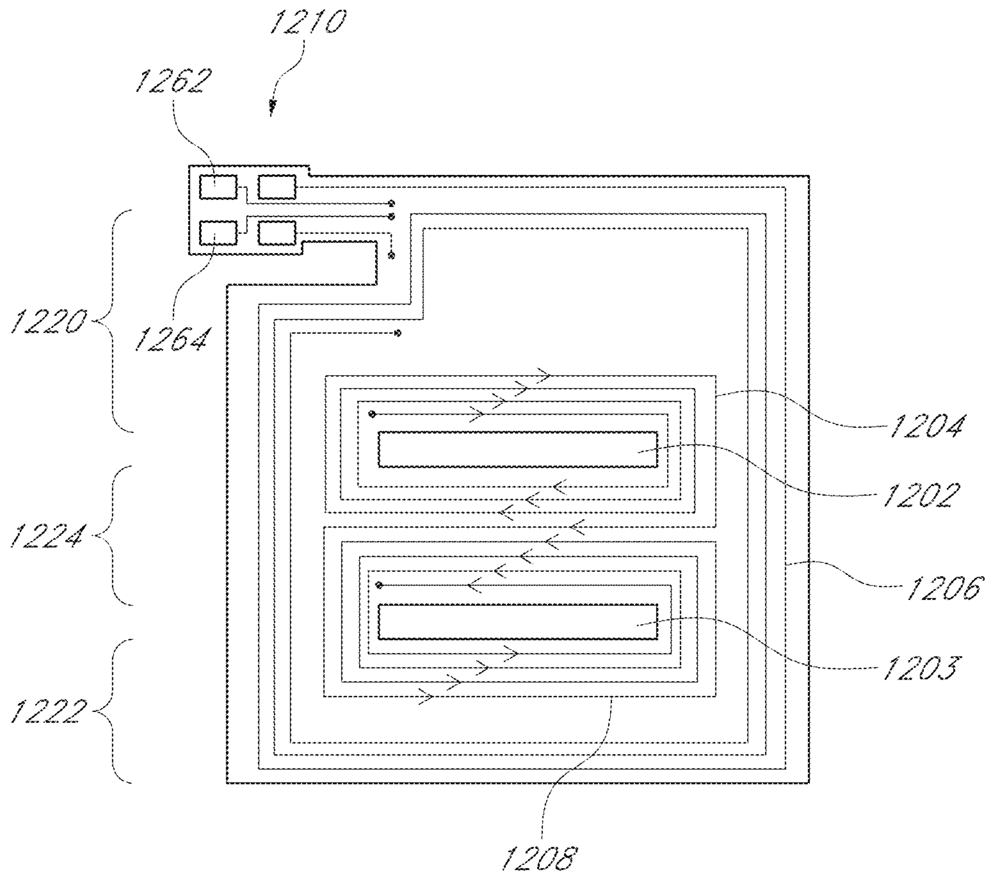
FIG. 20 is a front view of a flexible PCB of the antenna module shown in FIG. 19, schematically showing a pattern of coils, conductive lines and terminal pads in the flexible PCB.
Figure 21:
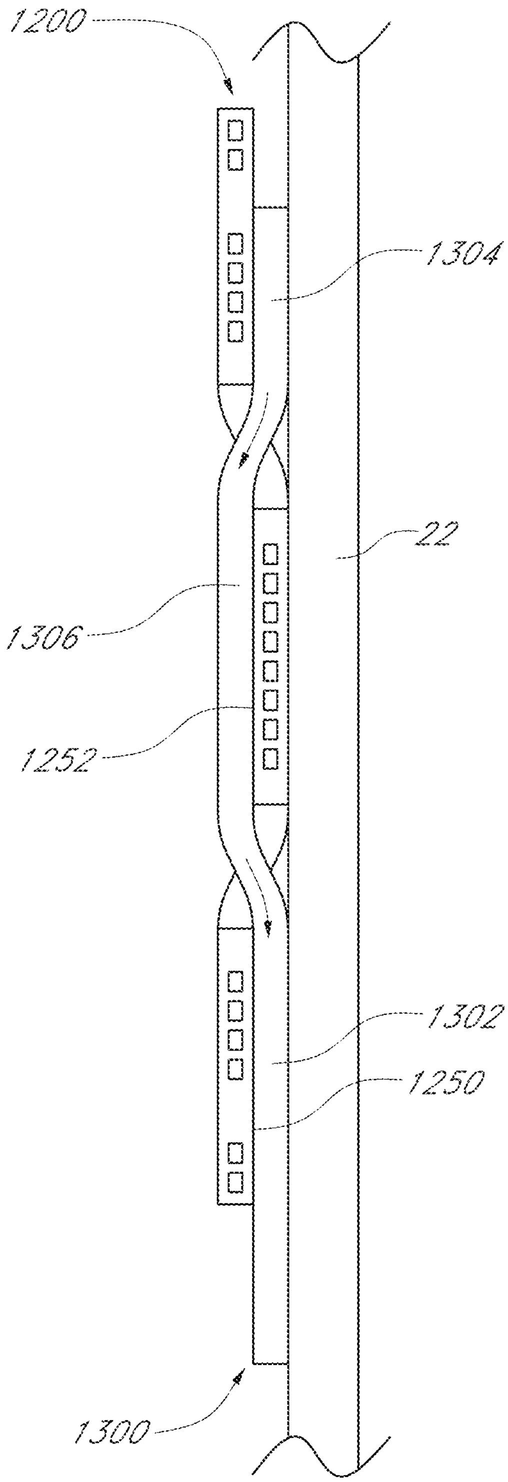
FIG. 21 is a sectional view of the antenna module shown in FIG. 19, in which a rear cover of a smartphone is partially illustrated as well.

In embodiments, referring to FIGS. 19-21, an antenna module 1100 includes a flexible PCB 1200 and a magnetic sheet 1300. The antenna module 1100 further includes coil 1204 (coil A), coil 1206 (coil B) and coil 1208 (coil C) in the flexible PCB 1200. Coil A 1202 and coil C 1208 are arranged side by side while coil B 1206 surrounds or encircles both coil A and coil C. The flexible PCB 1200 includes an upper edge and a lower edge. The flexible PCB includes an upper through-hole 1202 that coil A 1204 surrounds and a lower through-hole 1203 that coil C 1208 surrounds or encircles. The upper hole is located between the upper edge and the lower hole, while the lower hole is located between the upper hole and the lower edge. The flexible PCB 1200 includes an upper PCB section 1220 located between an upper edge 1232 and the upper hole 1202, a lower PCB section 1222 located between the lower edge 1232 and the lower hole 1203 and an intermediate PCB section 1224 located between the upper and lower holes. Referring to FIGS. 19-21, in embodiments, the upper PCB section 1220, the first hole 1202, the intermediate PCB section 1224, the second hole 1203, and the lower PCB section 1222 are consecutively arranged along an axis 1102 such that the axis 1102 passes the upper PCB section 1220, the first hole 1202, the intermediate PCB section 1224, the second hole 1203, and the lower PCB section 1222.

Coiling Direction of Coil A and Coil C

In one embodiment, as shown in FIG. 20, the conductive line of coil A 1204 is coiled in a first coiling direction, for example, clockwise direction as shown in FIG. 20. The conductive line of coil B 1206 is coiled in a second coiling direction that is opposite to the first coiling direction. The conductive line of coil C 1208 is coiled in the first coiling direction. However, the invention is not limited thereto. In another embodiment, coil B may be coiled in the first coiling direction. Coil A may be coiled in the second coiling direction. In this disclosure, the coiling direction is determined as a rotational direction when the conductive line is coiled from its inner terminal to its outer terminal.

Number of Turns of Each Coil

In embodiments, coil A 1204 includes one or more turns coiled to encircle or turn around the upper hole 1202 and coil C 1208 includes one or more turns coiled to encircle or turn around the lower hole 1203. Coil B 2206 includes one or more turns coiled to encircle or turn around the upper hole 1202, coil A 1204, the lower hole 1203 and coil C 1208. In embodiments, the number of turns of coil A 1204 may be the same as that of coil A 204 shown in FIG. 6. In embodiments, the number of turns of coil B 1206 may be the same as that of coil B 206 shown in FIG. 6. Further, the number of turns of coil C 1208 may be the same as that of coil A 1204. However, the invention is not limited thereto. The number of turns of each coil may be modified or adjusted to provide an antenna length required for a specific antenna function.

Assembled with Magnetic Sheet

In embodiments, referring to FIGS. 19 and 21, a magnetic sheet 1300 includes a base portion 1302, a head portion 1304 and a neck portion 1306 connecting the base portion 1302 and head portion 1304. When assembled with the flexible PCB 1200, the head portion 1304 overlaps the upper PCB section 1220, the base portion 1302 overlaps the lower PCB section 1222 and the neck portion 1306 overlaps the intermediate PCB section 1224. Referring to FIGS. 19-21, when assembling the magnetic sheet 1300 with the flexible PCB 1200, in one embodiment, the neck portion 1306 and the head portion 1304 go through the lower hole 1203, and then the head portion 1304 further goes through the upper hole 1202. Thus, when assembled, the head portion 1304 and the base portion 1302 are placed on a sider of a major surface 1250 of the flexible PCB 1200 while the neck portion 1306 is placed on a side of a major surface 1252 of the flexible PCB that faces away from the first surface 1250.

Locational Relationship of Magnetic Sheet and Coil A and Coil C

In the assembled configuration, in embodiments, the conductive line portions of coil A 1204 that are in the upper PCB section 1220 overlap the head portion 1304 when viewed in the viewing direction. The conductive line portions of coil C 1208 that are in the lower PCB section 1222 overlap the base portion 1302 when viewed in the viewing direction. The conductive line portions of coil A 1204 that are in the intermediate PCB section 1224 overlap the neck portion 1306 when viewed in the viewing direction. The conductive line portions of coil C 1208 that are in the intermediate PCB section 1224 also overlap the neck portion 1306 when viewed in the viewing direction. In the illustrated embodiments, coil B 1206 does not include a conductive line portion that overlaps the head portion 1220 while coil B 1206 includes conductive line portions that are in the lower PCB section 1222 and overlap the base portion 1302 when viewed in the viewing direction. When the antenna module 1100 is assembled in a smartphone 10 as shown in FIG. 21, the antenna module 1100 is arranged such that the first surface 1250 of the flexible PCB 1200 faces a rear cover 22 of the smartphone. Thus, the head portion 1304 is located between the rear cover 22 and the upper PCB section 1220 and the base portion 1302 is located between the rear cover 22 and the lower PCB section 1222. Since the neck portion 1306 is located over the second surface 1252, the intermediate PCB section 1224 includes a portion located between the rear cover 22 and the neck portion 1306. However, the invention is not limited thereto. When the antenna module 1100 is arranged such that the second surface 1252 of the flexible PCB 1200 faces the rear cover 22 of the smartphone, the neck portion may be located between the intermediate PCB section 1224 and the rear cover 22.

Size and Shape of Magnetic Sheet

In the embodiments in FIGS. 19 and 21, the head portion 1304, the neck portion 1306 and the base portion 1302 have substantially the same width. However, the invention is not limited thereto. In another embodiment, the head portion has a width (measured in horizontal direction) the same as that of the neck portion, but smaller than that of the base portion. In another embodiment, each of the base, neck and head portions has a width different from those of the others.

Series Connection and Current Direction

In embodiments shown in FIG. 20, coil A 1204 and coil C 1208 are electrically connected to each other. For example, the outer terminals of coil A 1204 and coil C 1208 are connected while the inner terminal of each of coil A 1204 and coil C 1208 is connected to one of terminal pads 1262 and 1264 in a connector portion 1210 of the flexible PCB 1200. This connection configuration provides a series circuit of coil A and coil C as shown in FIG. 18A. When the conductive lines of coil A and coil C are coiled in the same coiling direction as shown in FIG. 20 and coil A and coil C are further connected in series as illustrated in FIG. 18A, the current signal of coil A 1204 flows in a first rotational current direction while the current signal of coil C 1208 flows in a second rotational current direction that is opposite to the first rotational current direction. For example, as indicated in FIG. 20 using arrowheads, the current of coil A 1204 flows in the clockwise direction while the current of coil C 1208 flows in the counterclockwise direction when viewed in the viewing direction. In this current flow configuration, in conductive line portions of coil A 1204 and coil C 1208 which overlap the neck portion 1306 of the magnetic sheet, the current flows in the same linear direction as shown in FIG. 20.

Magnetic Flux in Magnetic Sheet

The current flow as discussed above and shown in FIG. 20 would generate magnetic flux that extends from the head portion 1304 to the base portion 1302 via the neck portion 1306 of the magnetic sheet 1300 as indicated as arrows. Further, the density of the magnetic flux generated in the magnetic sheet would be sufficient such that the smartphone wirelessly communicates with an outside device via an antenna having coil A and coil C. If the current of coil A and coil C flows in the same rotational direction, the current flow of conductive line portions of coil A that overlap the neck portion would be in a linear direction opposite to another linear direction of current flow of the conductive line portions of coil C that overlap the neck portion, and then, the magnetic flux generated in the head and base portions would extend out of the neck portion toward air.

Other Embodiments of Coiling Direction and Current Direction

In alternative embodiments, the coiling direction of coil A is different from that of coil C. In this embodiment, the outer terminal of coil A is connected to the inner terminal of coil C. The inner terminal of coil A and the outer terminal of coil C are connected to terminal pads of the connector portion, respectively. This connection configuration can ensure that the current of coil A flows in a rotational current direction opposite to that of coil C.

Coil a and Coil C for MST Antenna and Coil B for NFC Antenna

In embodiments illustrated in FIGS. 19-21, coil A 1204 and coil C 1208 form a single coil antenna functioning as an MST antenna while coil B 1206 functions as an NFC antenna. In one embodiment, the magnetic sheet may include both a nanocrystal magnetic sheet laminate and a ferrite magnetic sheet.

Additional Coil in Different Layer of Flexible PCB

Figure 25:
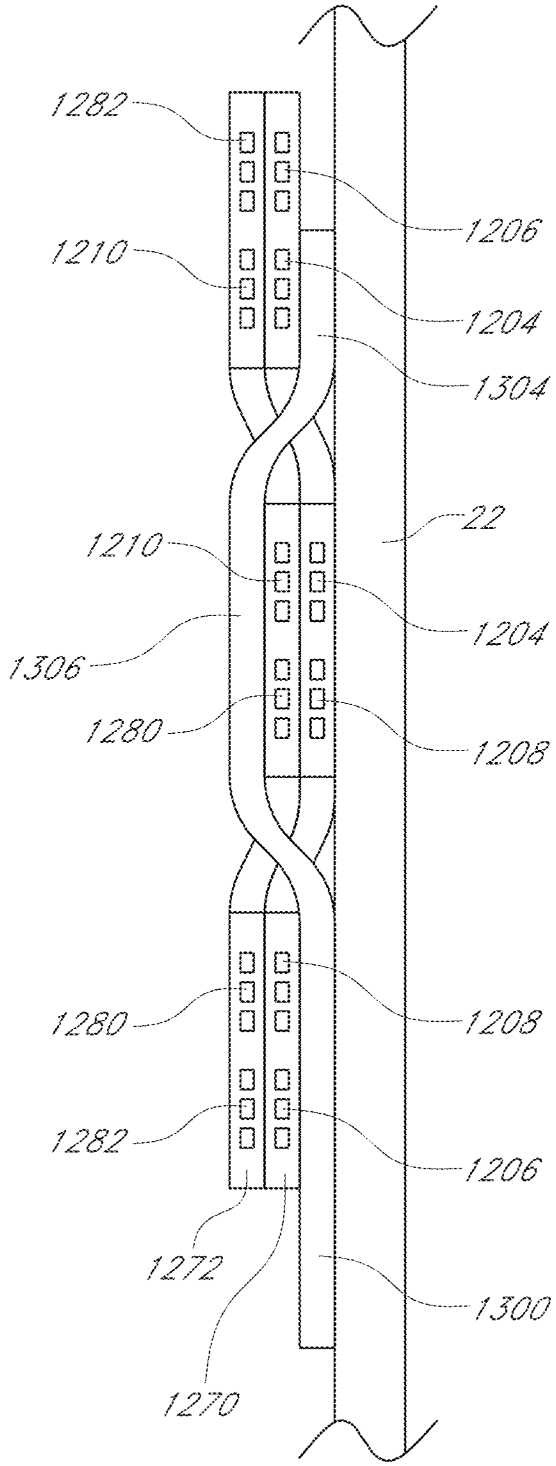
FIG. 25 is a sectional view of the antenna module with the flexible PCB shown in FIG. 22, in which a rear cover of a smartphone is partially illustrated as well.

In embodiments, the flexible PCB may include two or more layers, each of which includes at least one coil. For example, referring to FIGS. 19, 22 and 23, the antenna module 1100 includes a flexible PCB 1200' which includes a bottom layer 1270, a top layer 1272 over the bottom layer 1270 and an insulation layer interposed therebetween. In embodiments, the top layer 1272 is placed over the bottom layer 1270 such that the upper holes 1202 of the upper and lower layers are aligned and the lower holes 1204 of the upper and lower layers are aligned. The bottom layer 1270 includes coil 1204 (coil A), coil 1206 (coil B) and coil 1208 (coil C), and the top layer 1272 includes coil 1210 (coil D). In embodiments, the coiling direction and the current flow direction of coil A, coil B and coil C illustrated in FIG. 22 are the same as those in the embodiments illustrated in FIG. 20. Further, as shown in FIG. 25, the locational relationship between the magnetic sheet 1300 and each of coil A 1204, coil B 1206 and coil C 1208 is the same as the locational relationship illustrated in FIG. 21. In the discussion of embodiments, the terms "top" and "bottom" do not refer to their absolute location. In some circumstances, for example, an item labeled with term "top" may be located lower or under an item labeled with the term "bottom.

Coil D of Top Layer

Figure 23A:
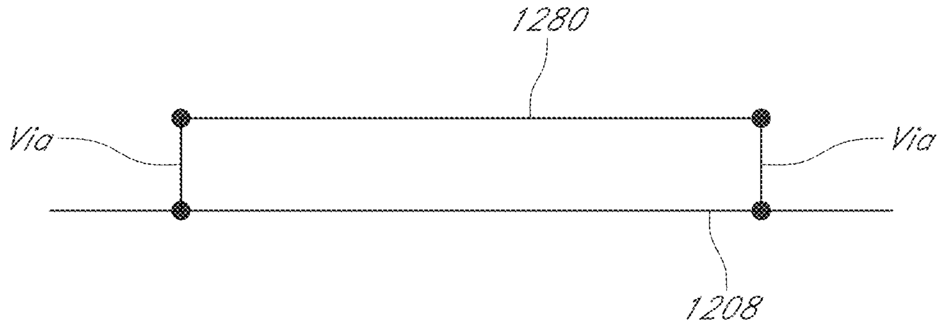
FIGS. 23A and 23B show examples of parallel connections between coils in the bottom layer of the flexible PCB shown in FIG. 22 and conductive line segments in the top layer.
Figure 23B:
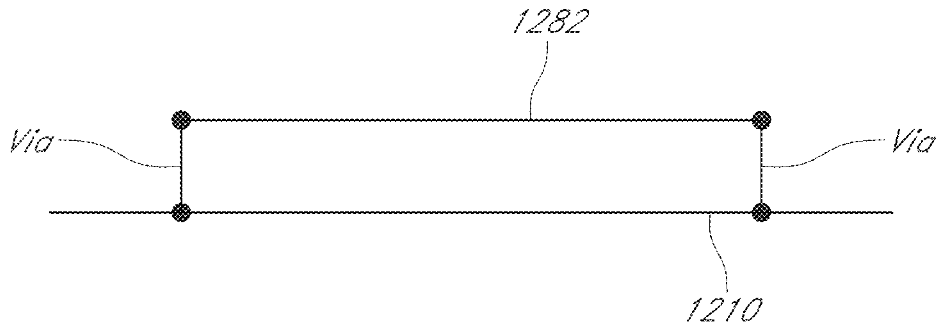
Figure 24:
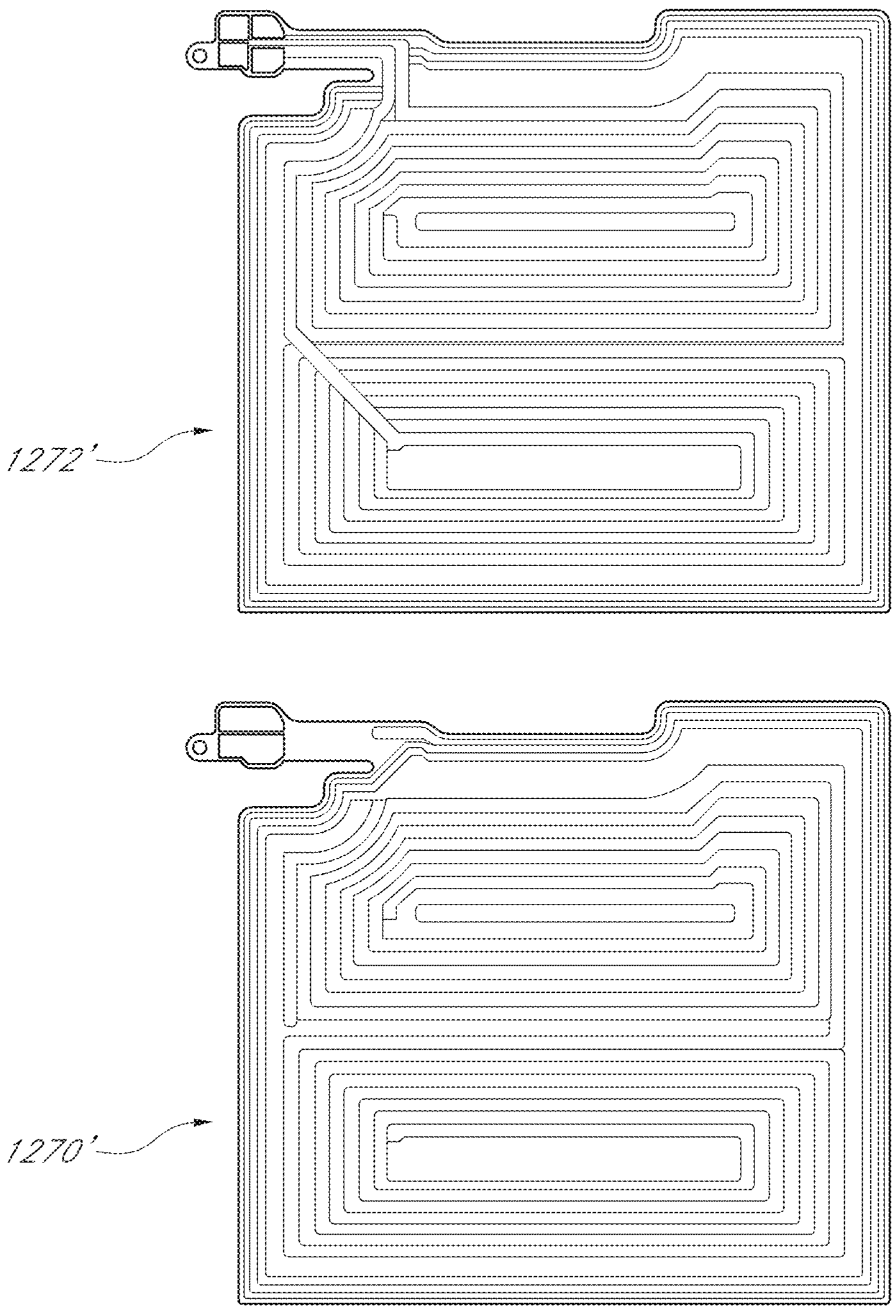
FIG. 24 is a computer design printout of patterns of coils, conductive lines and terminal pads of the bottom and top layers of the flexible PCB.

As shown in FIG. 22, the top layer 1272 includes coil D 1210 surrounding the upper hole 1202. As shown in FIG. 22, coil D 1210 is coiled in the second coiling direction, for example, counterclockwise direction, which is opposite to the coiling direction of coil A and coil B. The outer terminal of coil D 1210 is connected to one of the terminal pads of the connector portion 1210. The inner terminal of coil D 1210 is connected to the inner terminal of coil A 1204. As shown in FIG. 22, the top layer 1272 further includes a plurality of conductive line segments 1280 and 1282. Two end terminals of each conductive line segment 1280 are connected to coil C 1208 to form a parallel connection between coil C 1208 and each of the conductive line segment 1280 as shown in FIG. 23A. Two end terminals of each conductive line segment 1282 are connected to coil B 1206 to form a parallel connection between coil B 1206 and each of the conductive line segment 1282 as shown in FIG. 23B. The connection of conductive line segments can reduce resistance in coil B 1206 and coil C 1208. FIG. 24 shows an example of a conductive line pattern design of the top layer 1272' and bottom layer 1270' to form coil A, coil B, coil C and coil D and conductive line segments.

Locational Relationship Between Coil D and Magnetic Sheet

In embodiments, referring to FIG. 25, when the magnetic sheet 1300 is assembled with the flexible PCB 1200', the conductive line portions of coil D 1210 that are in the upper PCB section 1220 overlap the head portion 1304 when viewed in the viewing direction. The conductive line portions of coil D 1210 that are in the intermediate PCB section 1224 overlap the neck portion 1306 when viewed in the viewing direction. The relationship between the magnetic sheet 1300 and each of coil A, coil B and coil C 1204, 1206 and 1208 is the same as that of the embodiments illustrated in FIGS. 20 and 21.

Series Connection and Current Direction

In embodiments shown in FIG. 22, coil A 1204, coil C 1208 and coil D 1210 are electrically connected to each other in series. The inner terminal of coil A 1204 is connected to the inner terminal of coil D 1210 through a via. The current flows from a terminal pad to another terminal pad of the connector portion 1210 via coil D 1210, coil A 1204 and coil C 1208 in turn. In one embodiment, the current of coil A 1204 and coil D 1210 flows in a first rotational current direction, while the current of coil C 1208 flows in a second rotational current direction that is opposite to the first rotational current direction. For example, as indicated in FIG. 22 using arrowheads, the current signal of coil A and coil D flows in the clockwise direction while the current signal of coil C 1208 flows in the counterclockwise direction. This current flow configuration shown in FIG. 22 would cause the magnetic flux direction the same as that caused by the current flow configuration shown in FIG. 20; however, its density would be greater than the density in the antenna module shown in FIG. 21. In embodiments, when coil A, coil C and coil D form an antenna functioning as an MST antenna, since coil D 1210 is formed in the top layer, the antenna module can provide the antenna length for the MST antenna while having a reduced or compact size.

Figure 26:
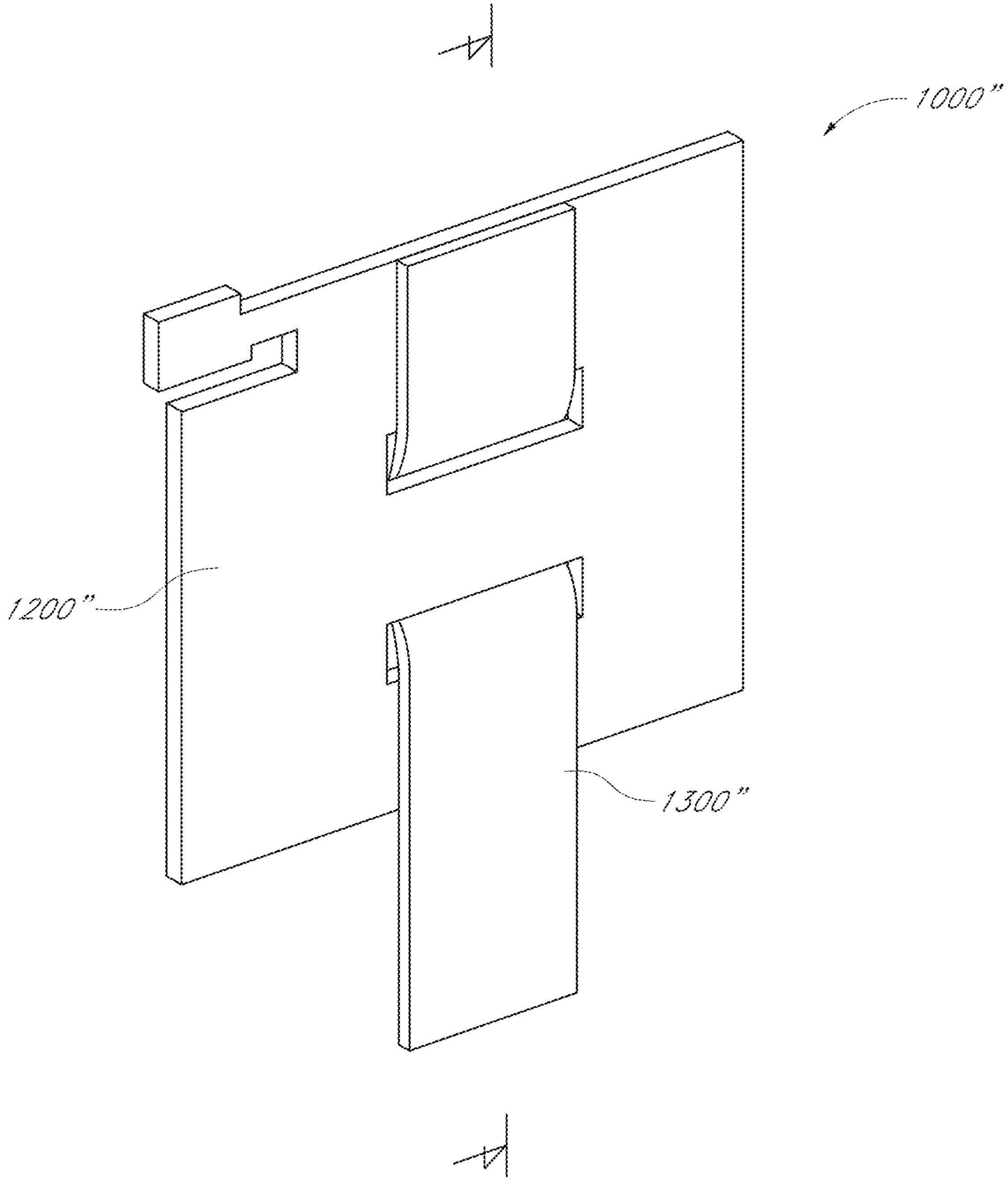
FIG. 26 is a perspective view of an antenna module according to another embodiment of the invention.
Figure 27:
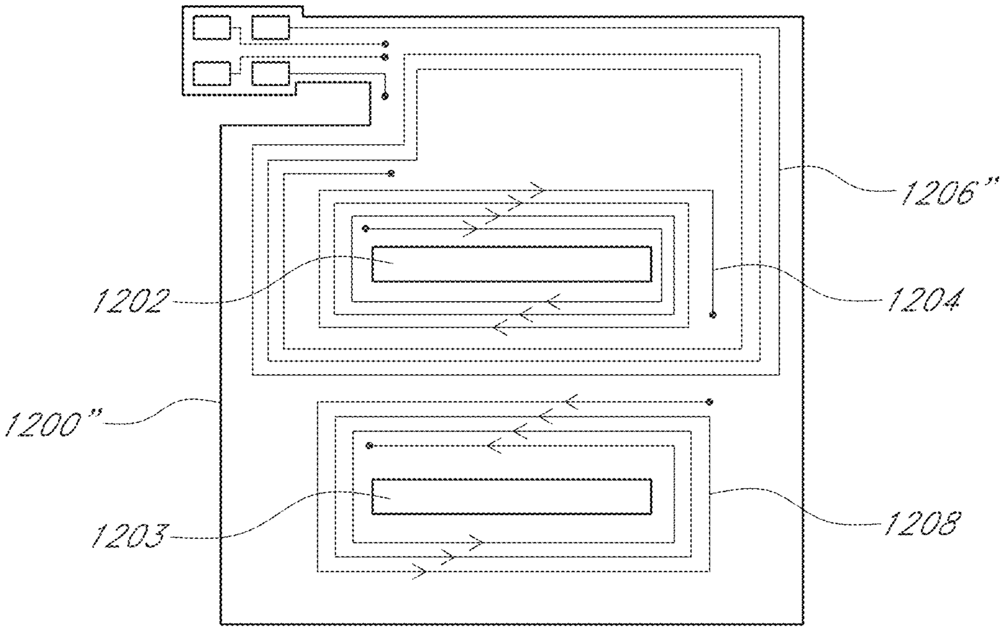
FIG. 27 is a front view of a flexible PCB of the antenna module shown in FIG. 26, schematically showing a pattern of coils, conductive lines and terminal pads in the flexible PCB.
Figure 28:
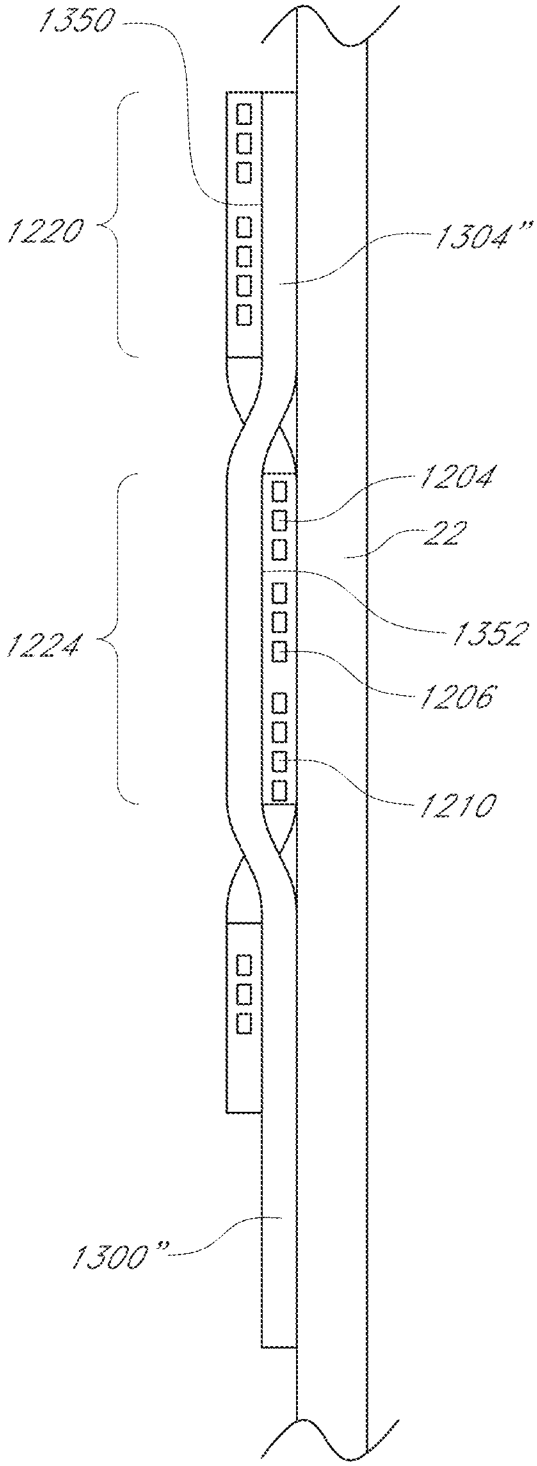
FIG. 28 is a sectional view of the antenna module with the flexible PCB shown in FIG. 27, in which a rear cover of a smartphone is partially illustrated as well.

Other Embodiments Shown in FIGS. 26-28

In the embodiments discussed above, coil B surrounds coil C, but the invention is not limited thereto. In some embodiments illustrated in FIGS. 26-28, an antenna module includes coil 1204 (coil A), coil 1206" (coil B) and coil 1208 (coil C), and coil B 1206" and coil C 1208 are arranged side by side while coil B 1206" surrounds coil A 1204. Referring to FIGS. 26-28, between coil A and coil C 1204 and 1208, the conductive line portions of coil B 1206" extend, while coil A and coil C are connected to each other via a connector line formed in another layer which is different from a layer in which coil A, coil B and coil C are formed. In embodiments, the coiling direction and the current direction of coil A, coil B and coil C shown in FIG. 25 are the same as those shown in FIG. 20.

Locational Relationship of Coils and Magnetic Sheet Shown in FIGS. 26-28

In Embodiments, Referring to FIGS. 27 and 28, Coil B 1206" Includes the conductive line portions that are in the upper PCB section 1220 and overlap the head portion 1304". Further, coil B 1206" includes conductive line portions that are in the intermediate PCB section 1224 and overlap the neck portion. The locational relationship of the magnetic sheet and coil A and coil C are the same as that of the embodiments illustrated in FIGS. 19-21. In the embodiments illustrated in FIGS. 26 and 28, the head portion 1304" of the magnetic sheet 1300" is located close to or adjacent the conductive line portions of coil B 1206" that are in the upper PCB section 1220. This configuration would be advantageous to generate magnetic flux with a higher density in the magnetic sheet by current applied to coil B 1206" than when the magnetic sheet is distant from conductive line portions of coil B that are in the upper PCB section 1220. In the embodiments shown in FIGS. 26-28, the conductive line portions of coil B 1206" in the upper PCB section 1220 are over a first surface 1350 of the magnetic sheet while the conductive line portions of coil B 1206" in the intermediate PCB section 1224 are over a second surface 1352 of the magnetic sheet 1300". This configuration would ensure that the magnetic flux generated in the magnetic sheet 1300 by current of coil B 1206" extends from the head portion toward the base portion via the neck portion.

Figure 29:
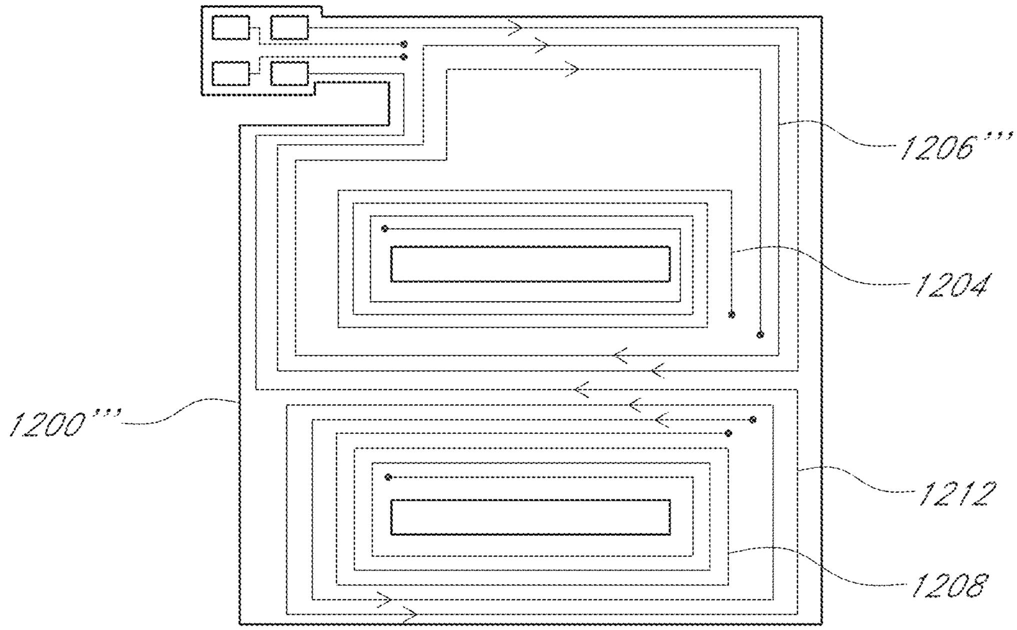
FIG. 29 shows a front view of a flexible PCB according to an alternative embodiment of the antenna module shown in FIG. 26, schematically illustrating schematically showing a pattern of coils, conductive lines and terminal pads in the flexible PCB.
Figure 30:
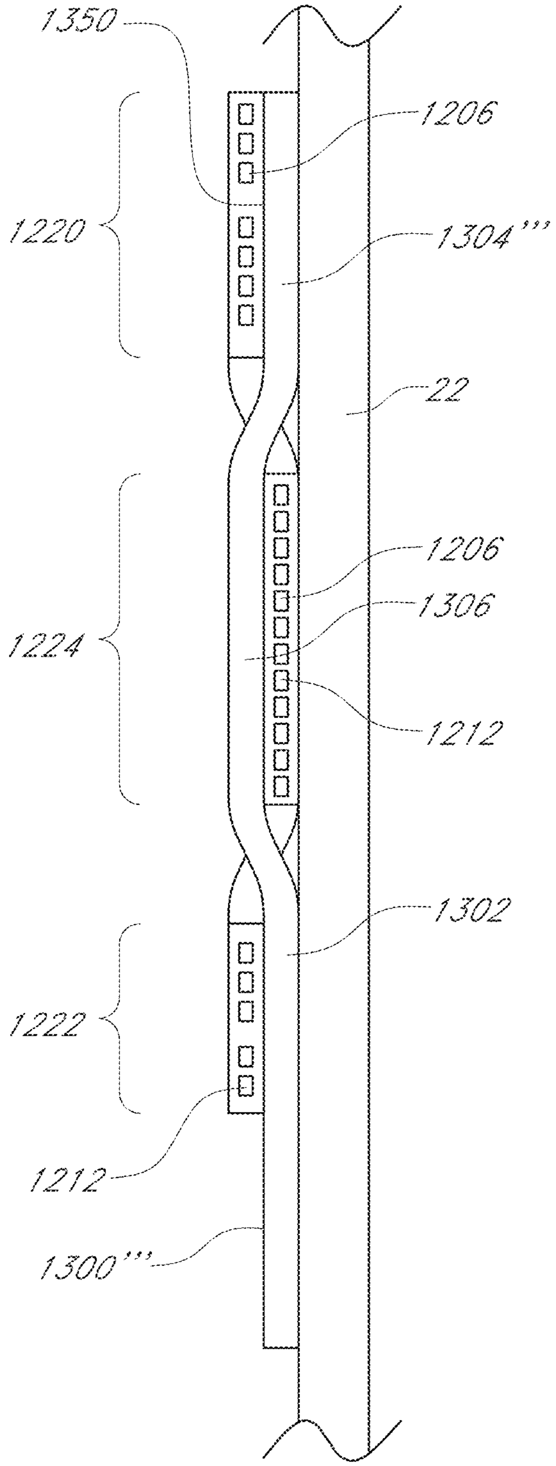
FIG. 30 is a sectional view of the antenna module with the flexible PCB shown in FIG. 29, in which a rear cover of a smartphone is partially illustrated as well.

Embodiments Shown in FIGS. 26, 29 and 30

In embodiments, referring to FIGS. 26, 29 and 30, an antenna module includes coil 1204 (coil A), coil 1206'" (coil B), coil 1208 (coil C) and coil 1212 (coil E). Coil A and coil C 1204 and 1212 are arranged side by side as like embodiments shown in FIGS. 20, 22 and 27. In the embodiments illustrated in FIG. 29, however, coil B 1206'" surrounds coil A 1202, but does not surround coil C 1208. Coil E 1212 surrounds coil C 1208. Coil B 1206''' and coil E 1212 are arranged side by side. In the embodiments illustrated in FIG. 29, the electrical connection, coiling direction and current direction of coil A and coil C 1204 and 1208 are the same as those in embodiments illustrated in FIG. 27. Coil B 1206''' and coil E 1212 are electrically connected to each other in series as shown in FIG. 18A. The conductive lines of coil B and coil E are coiled in the same coiling direction, for example, the counterclockwise direction. Further, the inner terminals of coil B and coil E are connected to each other via a connector line formed in a layer different from another layer in which coil B and coil E are formed. In this connection configuration, the current of coil B 1206''' flows in a rotational current direction opposite that of the current flow of coil E 1212. Thus, in conductive line portions of coil B and coil E which overlap the neck portion 1306 of the magnetic sheet 1300''' when viewed in the viewing direction, the current flows in the same linear direction as shown in FIG. 29.

Locational Relationship of Coils and Magnetic Sheet Shown in FIGS. 29 and 30

In embodiments, referring to FIGS. 26, 29 and 30, coil B 1206''' includes the conductive line portions that are in the upper PCB section 1220''' and overlap the head portion 1304''', and further includes conductive line portions that are in the intermediate PCB section 1224 and overlap the neck portion 1306. Similarly, coil E 1212 includes the conductive line portions that are in the intermediate PCB section 1224 and overlap the neck portion 1306, and further includes conductive line portions that are in the lower PCB section 1222 and overlap the base portion 1302. The locational relationship of the magnetic sheet 1300''' and coil A and coil C are the same as that of the embodiments illustrated in FIGS. 21, 25 and 28. In the embodiments illustrated in FIGS. 29 and 30, when the current of coil B 1206''' flows in the clockwise direction the magnetic flux in the magnetic sheet extends from the head portion to the neck portion. Further, since the current of coil E 1212 flows in the counterclockwise direction, the magnetic flux in the magnetic sheet 1300''' extends from the neck portion 1306 to base portion 1302. As a result, the above current flow configuration would ensure that the magnetic flux generated in the magnetic sheet by current of coil B and the magnetic flux generated in the magnetic sheet by current of coil E extend in the same directions, for example, from the head portion to base portion via the neck portion. Also, the head portion 1304''' of the magnetic sheet is located close to or adjacent the conductive line portions of coil B that are in the upper PCB section.

Usage of Coil a, Coil B, Coil C and Coil E Shown in FIGS. 29 and 30

Similarly to embodiments discussed above, coil A and coil C 1204 and 1208 of the flexible PCB 1200''' can be used as an MST antenna. In the embodiments shown in FIGS. 29 and 30, coil B 1206''' and coil E 1212 can be used as an NFC antenna. In the embodiments, discussed above, coil A and coil C 1204 and 1208 are connected to each other in series, and coil B 1206''' and coil E 1212 are connected to each other in series. However, the invention is not limited thereto. For example, to provide a proper length of antennas, the connections may be modified to parallel connections. Further, the number of turns of each coil may be modified or adjusted. In other embodiments, coil A and coil C may be used as an NFC antenna and coil B and coil E may be used as an MST antenna.

Modification to Embodiments Shown in FIGS. 29 and 30

Embodiments shown in FIGS. 29 and 30 may be modified. In the modified embodiments, the antenna module further includes coil D and coil F formed in a bottom layer of the flexible PCB whereas coil A, coil B, coil C and coil E are formed in a top layer which is disposed over the bottom layer. The structure of coil D and its connection with coil A and coil C are the same as those in the embodiments illustrated in FIGS. 22-25. Coil F is formed over coil B and coiled in a coiling direction opposite to the coiling direction of coil B when viewed in the viewing direction. Coil B, coil E and coil F are connected in series, and the current of coil B and coil F flows in the same rotational direction when viewed in the viewing direction. This addition of coil D and coil F would be able to increase the density of magnetic flux generated in the magnetic sheet and further increase the strength of antenna signals. But, the invention is not limited to the above embodiments. For example, coil A and coil C may be connected to each other in parallel as shown in FIG. 18B. Coil A and coil D may be connected to each other in parallel. Similarly, coil B and coil E may be connected to each other in parallel. Coil B and coil F may be connected to each other in parallel.

Decoupled Multiple Coils

In the embodiments discussed above, two or more coils are connected to each other in the antenna module either in series or parallel. However, the invention is not limited thereto. In alternative embodiments, the coils are decoupled from one another, and each coil functions as an antenna different from antennas that the other coils function as when assembled in a smartphone and connected to circuits in the smartphone. Each coil can be used as one of an MST antenna, an NFC antenna and other antenna that uses a coil antenna, such as wireless charging antenna.

Coil Antenna for Wireless Power Charging Antenna

In embodiments, one of coils may be connected to a wireless power charging circuit in the smartphone such that the coil functions as a wireless power charging antenna or wireless power charging inductor. In embodiments, the wireless power charging circuit and the coil antenna may form a wireless power charging system according to the standard under Wireless Power Consortium (WPC). In other embodiments, the wireless power charging circuit and the coil antenna may form a wireless power charging system according to the standard under Power Matters Alliance (PMA).

Modification of Embodiments Shown in FIGS. 19-30

The embodiments discussed above can be modified various ways. In the embodiments shown in FIGS. 19-30, the head portion of the magnetic sheet is placed over the upper PCB section of the flexible PCB, the neck portion is placed under the intermediate PCB section, and the base portion is placed over the lower PCB section. In the modified example, the base portion may be placed over the lower PCB section, while the head portion is placed over the upper PCB section and the neck portion is placed under the intermediate PCB section. In this modified example, the lower hole is not provided at the second core area that coil C surrounds while the upper hole is provided at the first core area that coil A surrounds when viewed in the viewing direction.

Separate Coil Outside Flexible PCB

Figure 32:
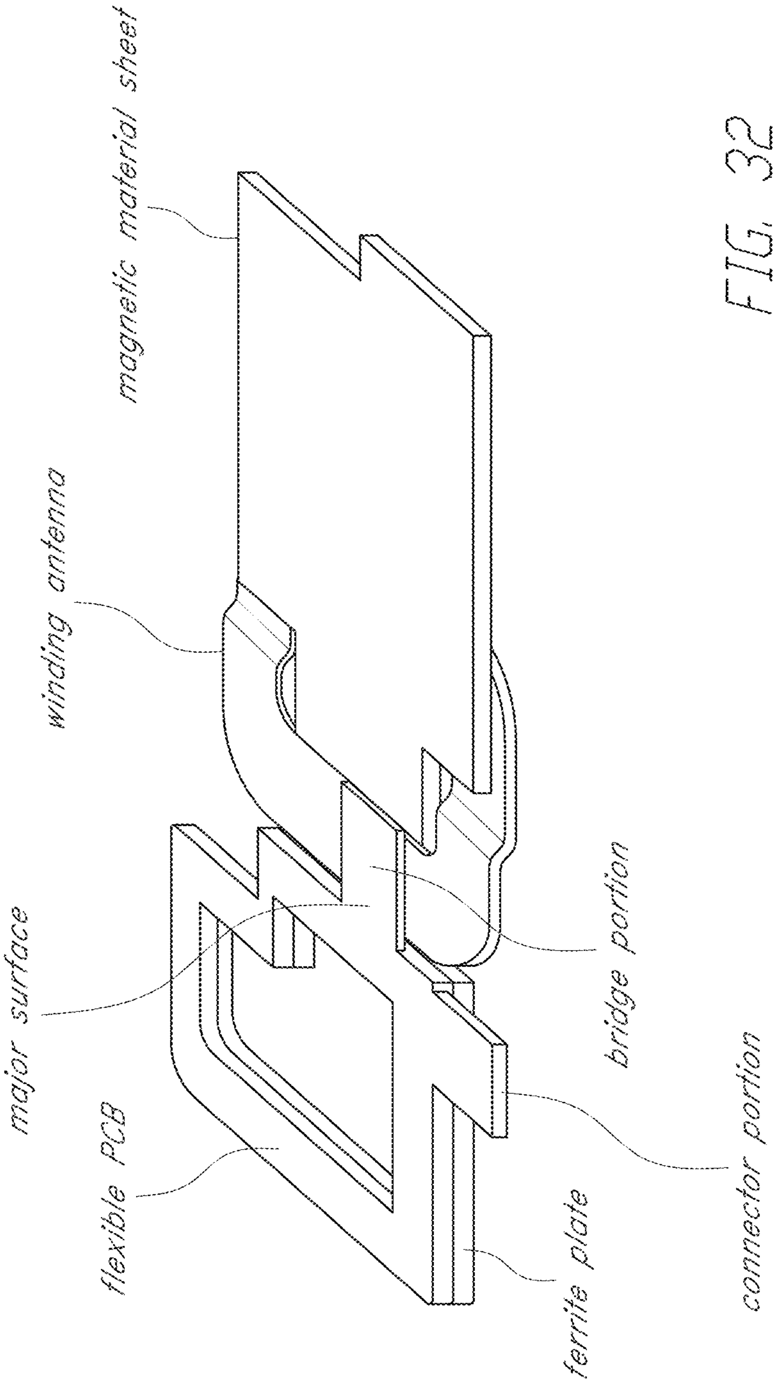
FIG. 32 is a perspective view of a smartphone antenna module and shows another embodiment of the invention.
Figure 33:
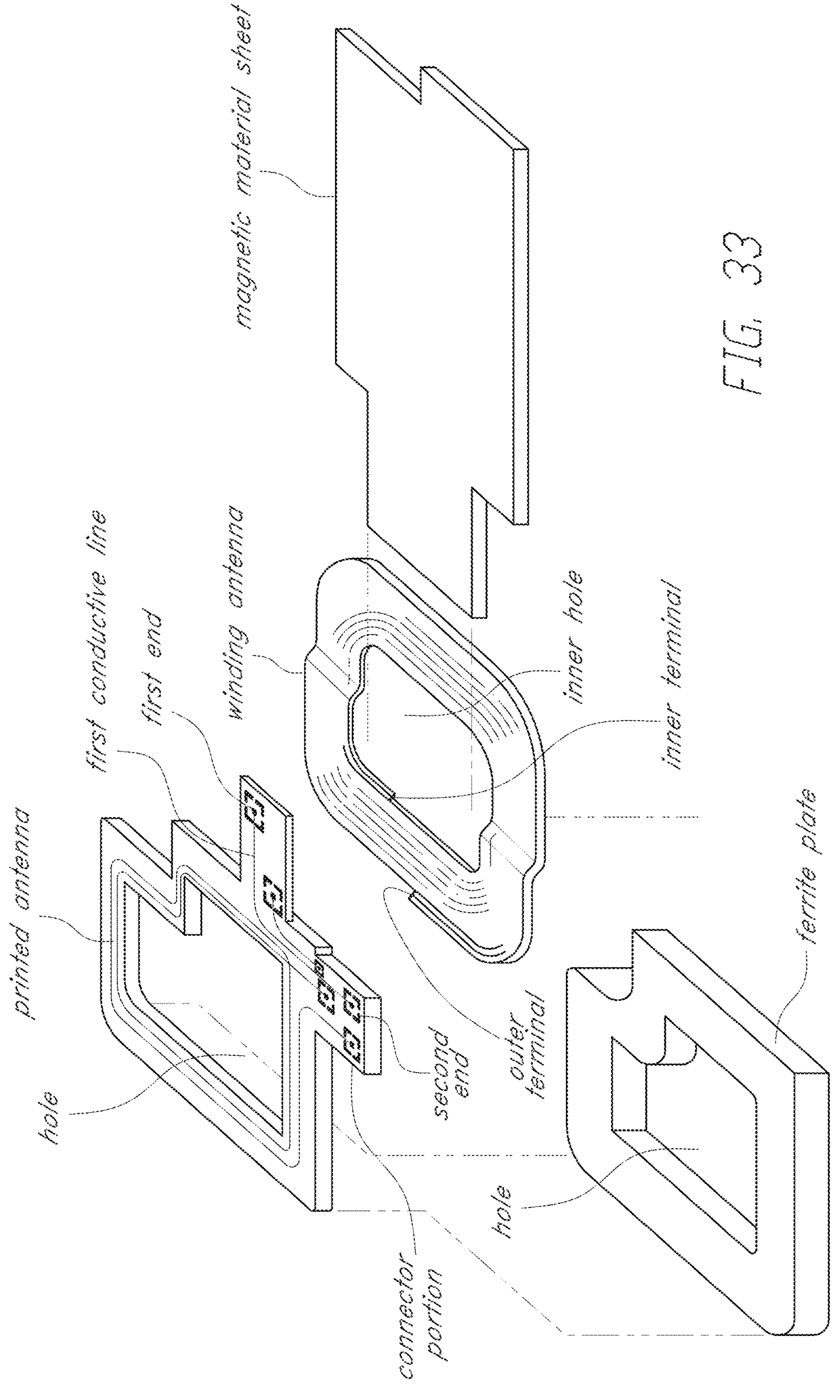
FIG. 33 is an exploded view of the smartphone antenna module shown in FIG. 32.
Figure 34:
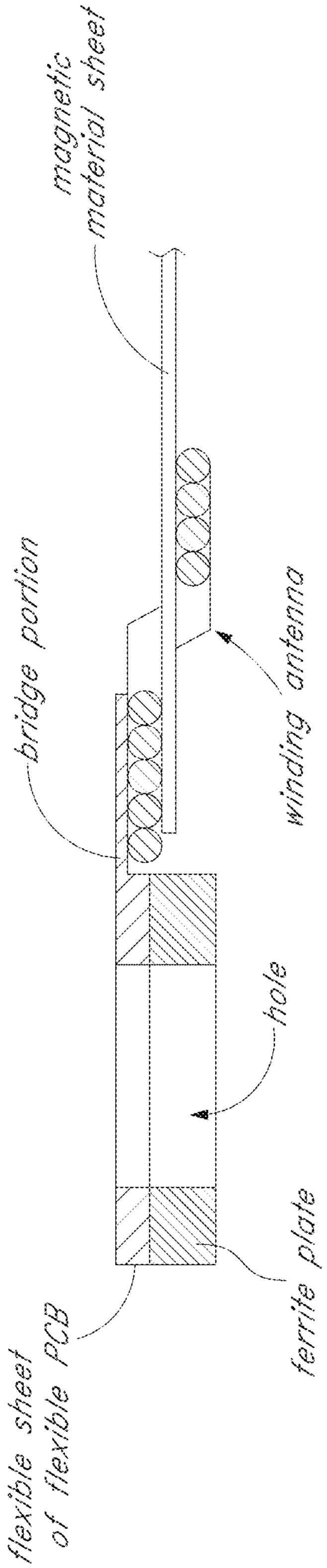
FIG. 34 is a sectional view of the smartphone antenna module shown in FIG. 32.
Figure 35:
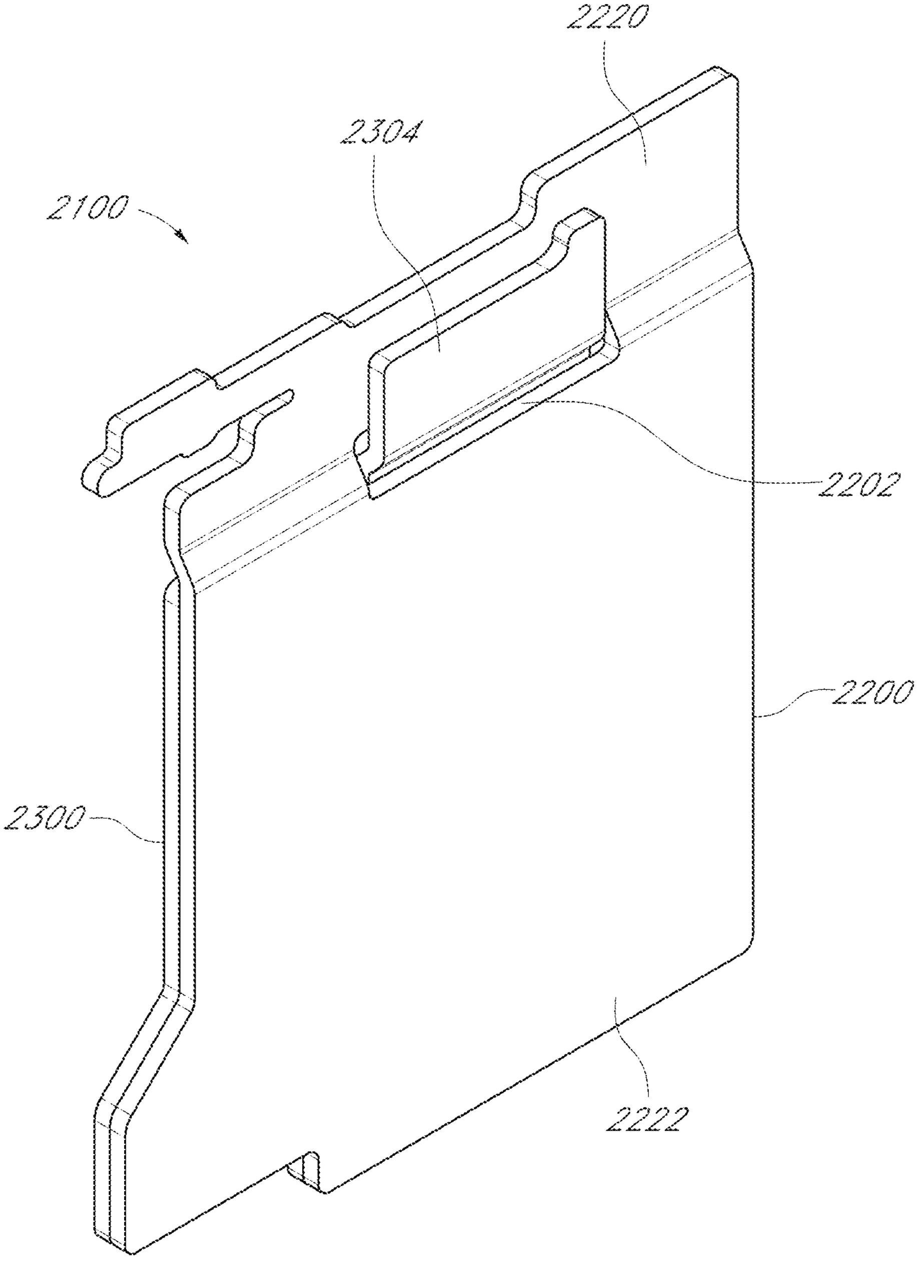
FIG. 35 is a perspective view of a smartphone antenna module and shows yet another embodiment of the invention.
Figure 36:
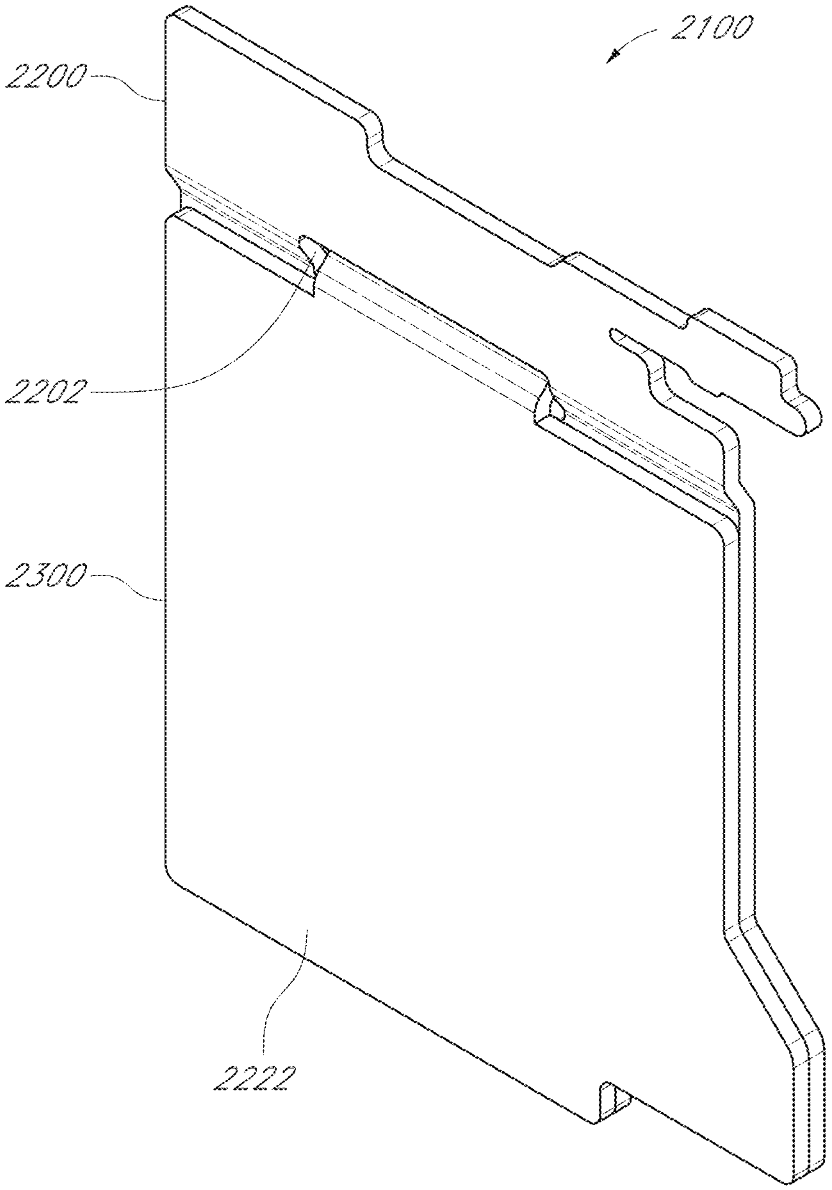
FIG. 36 is another perspective view of the smartphone antenna module shown in FIG. 35.

In the embodiments discussed above, the coils are formed in one flexible PCB. However, the invention is not limited thereto. An antenna module may include one or more coils that are not part of the flexible PCB. The one or more coils comprise coil G that is not part of the flexible PCB and placed over the magnetic sheet. In one embodiment, the portion of coil G when viewed in the viewing direction. Coil G may be placed partially or entirely over the magnetic sheet and may include at least a portion that is interposed between the magnetic sheet and the rear cover of the smartphone when assembled in the smartphone. In the other embodiment, coil G is placed to overlap both the flexible PCB and the magnetic sheet. Further, in one embodiment, coil G may be a winding antenna as shown in FIGS. 32-34. Coil G may be disposed in a side-by-side relationship with the coils in the flexible PCB, and the flexible PCB may further include, for example, a bridge portion as shown in FIGS. 32-34 for providing an electrical connection between coil G and a connector portion of the flexible PCB.

Two Flexible PCBs

In embodiments, the antenna module includes a first flexible PCB and a second flexible PCB. The first flexible PCB includes multiple coils, for example, coil A and coil B as in embodiments discussed above, and the second flexible PCB includes a further coil (coil G). When making the antenna module, in embodiments, the first flexible PCB and the magnetic sheet are assembled as in the embodiments discussed above, and the second flexible PCB is placed over or engaged with the magnetic sheet, and then, the first and second flexible PCBs and the magnetic sheet are integrated into a single body of the antenna module.

Locational Relationship Between Second Flexible PCB and First Flexible PCB

Figure 31:
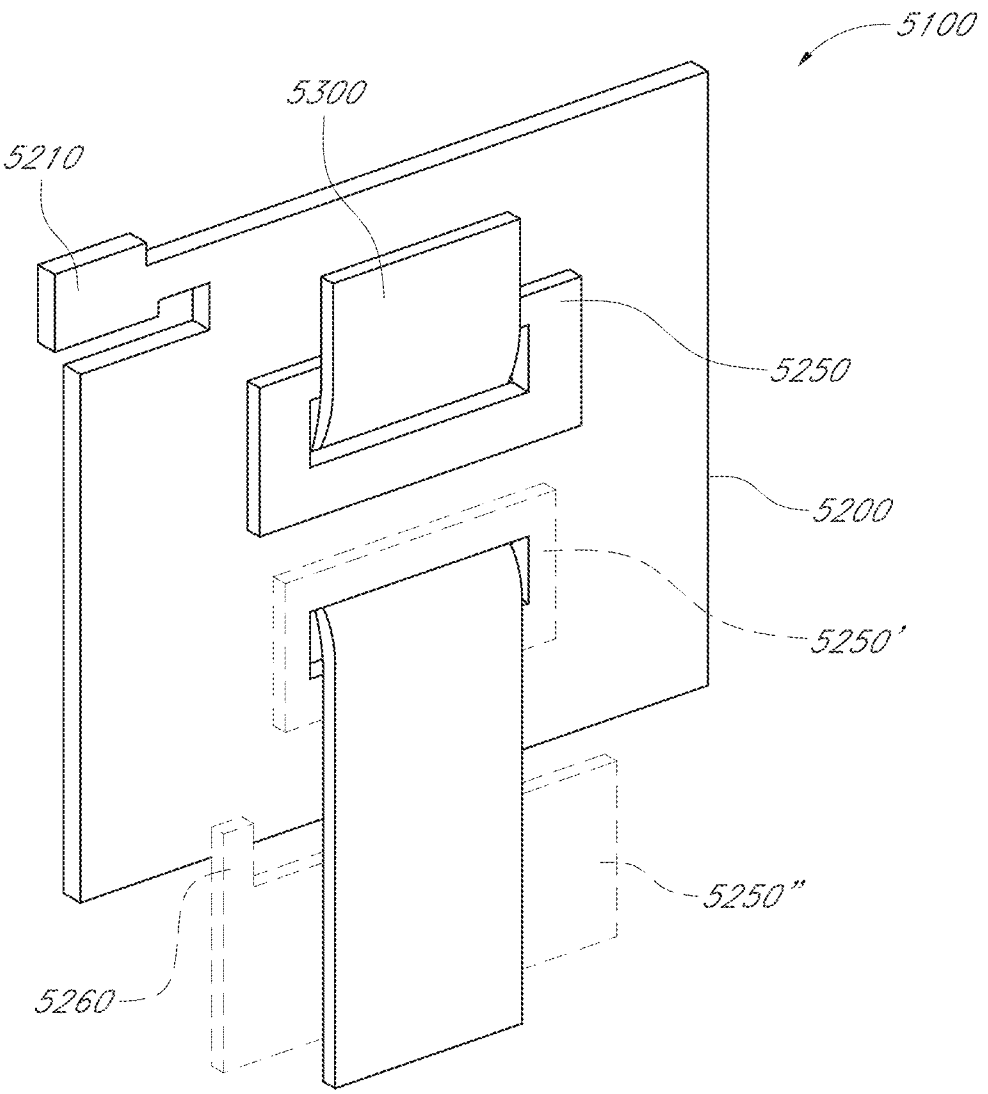
FIG. 31 is a perspective view of an antenna module according to a further embodiment of the invention.

In embodiments, the second flexible PCB includes a central portion that coil G surrounds. The second flexible PCB 5250 may have a hole at the central portion as shown in FIG. 31. In one embodiment, the second flexible PCB 5250 is placed over the first flexible PCB 5200 such that substantially the entire portion of the second flexible PCB 5250 overlaps the first flexible PCB 5200. In the embodiment shown in FIG. 31, the magnetic sheet 5300 passes through the holes of the first and second flexible PCBs. In another embodiment, as illustrated using dotted lines in FIG. 31, the second flexible PCB 5250' is placed over the first flexible PCB and its hole overlaps another hole of the first flexible PCB 5200. In the other embodiments, as illustrated using dotted lines in FIG. 31, the second flexible PCB 5250" is placed over the magnetic sheet and does not overlap the first flexible PCB 5200 when viewed in the viewing direction. However, the invention is not limited thereto. In alternative embodiments, the second flexible PCB is placed over the magnetic sheet to partially overlap the first flexible PCB when viewed in the viewing direction. In the embodiments shown in FIG. 31, the second flexible PCB 5250" is located under the base portion of the magnetic sheet. However, the invention is not limited thereto. In one embodiment, the second flexible PCB 5250" may be located over the base portion of the magnetic sheet. In another embodiment, the base portion of the magnetic sheet passes through the hole of the second flexible PCB 5250".

Connection Between First and Second Flexible PCB

In embodiments, referring to FIG. 31, the first flexible PCB 5200 includes a connector portion 5210 and the second flexible PCB 5250" includes a bridge portion 5260. The connector portion 5210 extends from a body portion of the first flexible PCB. The connector portion includes a plurality of terminal pads formed at an end portion of the connector portion 5210. In embodiments, the connector portion includes three or more pairs of the terminal pads. A first pair of terminal pads among the plurality of terminal pads are connected to the inner and outer terminals of coil A of the first flexible PCB via connector lines. A second pair of terminal pads among the plurality of terminal pads are connected to the inner and outer terminals of coil B of the first flexible PCB via connector lines. The bridge portion is located at a location close to or overlapping the first flexible PCB. The bridge portion includes two terminal pads which are connected to the inner and the outer terminal of coil G of the second flexible PCB. A third pair of terminal pads in the connector portion 5210 is connected to the terminal pads contacting the terminal pads of the bridge portion via connector lines formed in the first flexible PCB. When the second flexible PCB is placed over the assembly of the first flexible PCB and the magnetic sheet, in one embodiment, each terminal pad of the first flexible PCB contacts and bonded to the corresponding terminal pad of the bridge portion of the second flexible PCB for allowing electrical connection therebetween. They are bonded to each other by welding or soldering. The contact and electrical connection between the terminal pads of the first flexible PCB and the terminal pads of the bridge portion can be maintained after the first and second flexible PCBs and the magnetic sheet are integrated into a single body. In another embodiment, the bridge portion is formed in the first flexible PCB rather than the second flexible PCB. In embodiments, when assembled in the smartphone, the terminal pads of the connector portion 5210 are connected to counterpart connection terminals of the smartphone circuit for electrically connecting coil A, coil B and coil G to the smartphone circuit.

Usage of Coils in First and Second Flexible PCBs

In the embodiments discussed above, coil A, coil B and coil G are used as an MST antenna, an NFC antenna and a wireless power charging antenna, respectively. However, the invention is not limited thereto. In embodiments, when the antenna module is assembled in a smartphone, each of coil A, coil B and coil C is used as either one of the MST antenna, the NFC antenna and the wireless power charging antenna. In one example, coil B antenna functions as an MST antenna, coil G antenna functions as an NFC antenna and coil A functions as a wireless charging transformer. In another example, when the antenna module is assembled in a smartphone, coil G antenna functions as an MST antenna, coil A functions as an NFC antenna and coil B antenna functions as a wireless power charging transformer. When coil G antenna is used as a wireless charging antenna, in embodiments, coil G is placed over the magnetic sheet and the magnetic sheet does not pass through a hole that coil G surrounds.

Coil U, Coil W and Coil V in the Same Flexible PCB

In embodiments, referring to FIGS. 35-39, an antenna module 2100 includes a flexible PCB 2200 and a magnetic sheet 2300. The antenna module 2100 further includes coil 2204 (coil U), coil 2206 (coil W) and coil 2208 (coil V) in the flexible PCB 2200. The flexible PCB 2200 includes a through-hole 2202. The through-hole 2202 is located between the upper edge 22002 and the lower edge 22004. The flexible PCB 2200 includes an upper PCB section 2220 located between an upper edge 2230 and the through-hole 2202, and a lower PCB section 2222 located between the lower edge 2232 and the through-hole 2202. Referring to FIGS. 35-39, in embodiments, the upper PCB section 2220, the through-hole 2202, and the lower PCB section 2222 are arranged along an axis 2102 such that the axis 2102 passes the upper PCB section 2220, the through-hole 2202, and the lower PCB section 2222 in order.

Coil U

Figure 37:
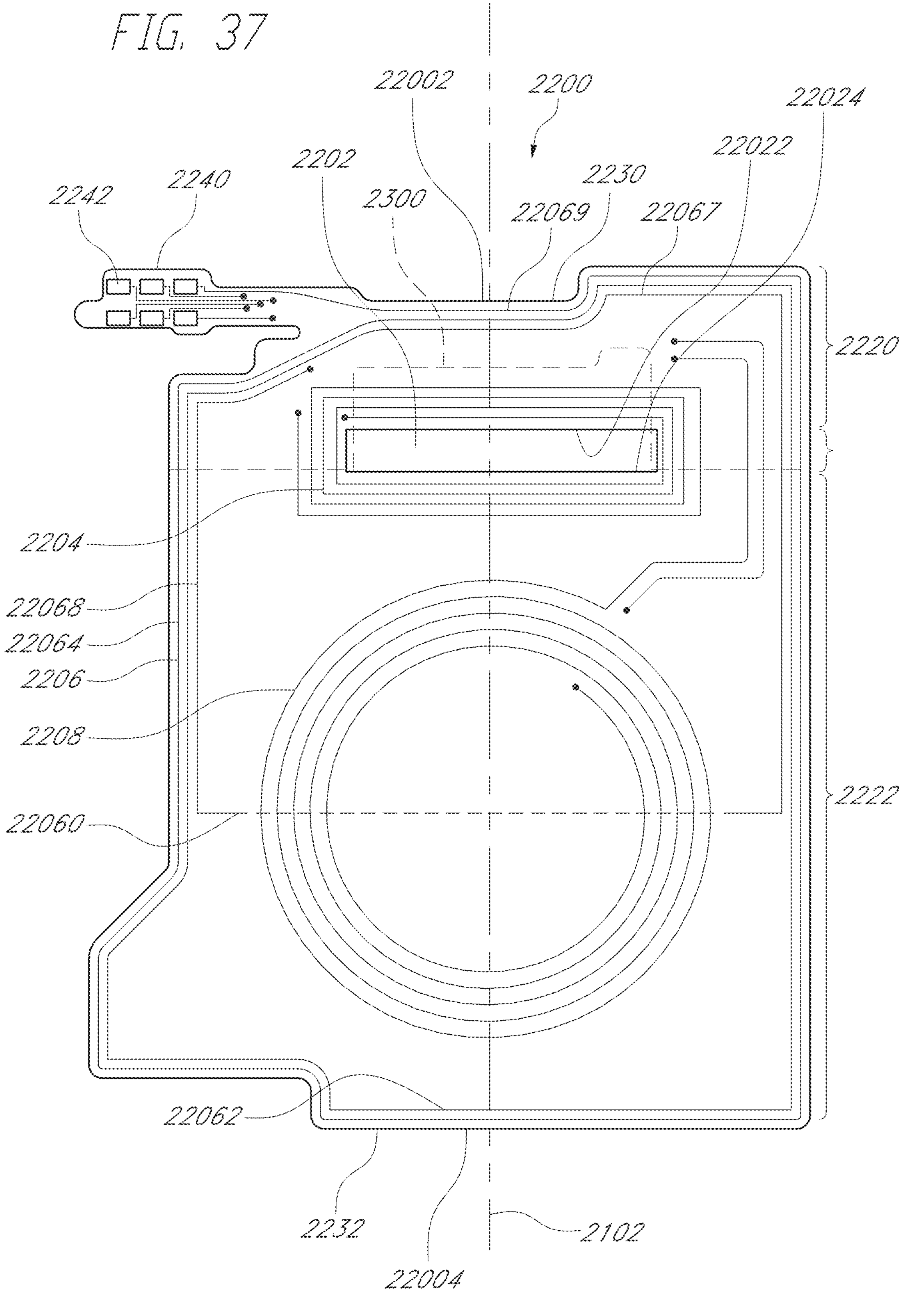
FIG. 37 is a front view of a flexible PCB of the smartphone antenna module shown in FIG. 35.

In embodiments, coil U 2204 is formed of a printed electrically conductive wire and coiled to surround or turn around the through-hole 2202. Coil U 2204 may have one or more turns that completely turn around the through-hole 2202. Referring to FIG. 37, coil U 2204 includes four turns;

however, the invention is not limited thereto. In another embodiment, coil U may have 1, 2, 3, 5, 6, 7, 8 and 9 turns. In embodiments, coil U 2204 may have the same configuration as those of coils 204 and 1204 shown in FIGS. 6 and 26. In one embodiment, the coiled conductive wire of coil U 2204 may be printed in a single layer of the flexible PCB. In other embodiments, the coiled conductive wire of coil U 2204 may include wire portions printed in multiple layers of the flexible PCB and vias connecting the wire portions printed in multiple layers.

Coil V

Referring to the embodiment of FIG. 37, coil U 2204 and coil V 2208 are located by side by side. In one embodiment, coil V 2208 is located in the lower PCB section 2222 and does not extend beyond the lower PCB section 2222. In the illustrated embodiments, coil V does not include a portion overlapping coil U 2204. Coil V 2208 is formed of a printed electrically conductive wire. As shown in FIG. 37, coil V 2208 is coiled in a circular-spiral shape. Coil V 2208 has one or more turns. In one embodiment, the coiled conductive wire of coil V 2208 may be printed in a single layer of the flexible PCB. In other embodiments, the coiled conductive wire of coil V 2208 may include wire portions printed in multiple layers of the flexible PCB and vias connecting the wire portions printed in multiple layers.

Coil W

In embodiments, coil W 2206 is formed of a printed electrically conductive wire. Referring to FIG. 37, two outer turns 22064 of coil W 2206 extend along the periphery of the flexible PCB 2200. An inner turn 22068 of coil W 2206 includes a line segment 22060 that crosses coil V as shown in FIG. 37. In one embodiment, the line segment 22060 passes through the center of coil V 2208 and extends generally perpendicular to the axis 2102. The line segment 22060 is insulated from coil V 2208. In embodiments, coil W 2206 may have the same configuration as those of coil 1206 shown in FIG. 20. In one embodiment, the coiled conductive wire of coil W 2206 may be printed in a single layer of the flexible PCB. In other embodiments, the coiled conductive wire of coil W 2206 may include wire portions printed in multiple layers of the flexible PCB and vias connecting the wire portions printed in multiple layers. Although FIG. 37 shows that two outer turns 22064 extend along the periphery of the PCB, the invention is not limited thereto. The entire turns of coil W may have a shape different from that of the periphery of the PCB 2200.

Coil W Surrounding Through-Hole, Coil U and Coil V

In embodiments, coil W 2206 includes one or more turns that surround or turn around all of coil U 2204, the through-hole 2202 and coil V 2208, as shown in FIG. 37. Coil V 2208 is located between coil U 2204 and line portions 22062 adjacent the lower edge of the flexible PCB. In the illustrated embodiment, two turns 22064 of coil W 2206 extend along the periphery to surround or turn around all of the through-hole 2202, the entire turns of coil U 2204 and the entire turns of coil V 2208. Coil W 2206 further include a single inner turn 22068 that surrounds or turns around both the through-hole 2202 and the entire turns of coil U. However, one half of coil V 2208 is surrounded by the single inner turn 22068 and the other half of coil V 2208 is located outside the single inner turn 22068.

Shape of Magnetic Sheet

In embodiments, referring to FIGS. 35-39, a magnetic sheet 2300 includes a base portion 2302, a head portion 2304 and a neck portion 2306 connecting the base portion 2302 and head portion 2304. In the embodiment illustrated in FIG. 38, the head portion 2304 has a width as measured in a horizontal direction the same as that of the neck portion 2306, and the magnetic sheet 2300 does not a structure dividing the head portion and the neck portion. The base portion 2302 has a width greater than those of the head and neck portions. In other embodiments, the head portion has a width greater than that of the neck portion. The head portion may have a width even greater than that of the through-hole such that the head portion is deformed for inserting the head portion through the through-hole. In one embodiment, the head portion has a width smaller than that of the neck portion. In another embodiment, the base, neck and head portions have the same width.

Assembly of Magnetic Sheet and Flexible PCB Including Coils U, V and W

When engaged or assembled with the flexible PCB 2200, the head portion 2304 overlaps the upper PCB section 2220; the base portion 2302 overlaps the lower PCB section 2222; and the neck portion 2306 overlaps the through-hole 2202. When assembling the magnetic sheet 2300 with the flexible PCB 2200, in one embodiment, the head portion 2304 go through the through-hole 2202 from the side of a surface 2350 of the flexible PCB 2200 to the side of the opposite surface 2252 of the flexible PCB 2200 that faces away from the surface 2350. When assembled, the base portion 2302 is placed on the surface 2350 of the flexible PCB 2200 while the head portion 2302 is placed on the opposite surface 2252 of the flexible PCB. In FIGS. 35-39, the flexible PCB and the magnetic sheet are shown to be thicker than actual products for the sake of illustration; however, the invention is not limited to the thickness shown in the drawings.

Figure 39:
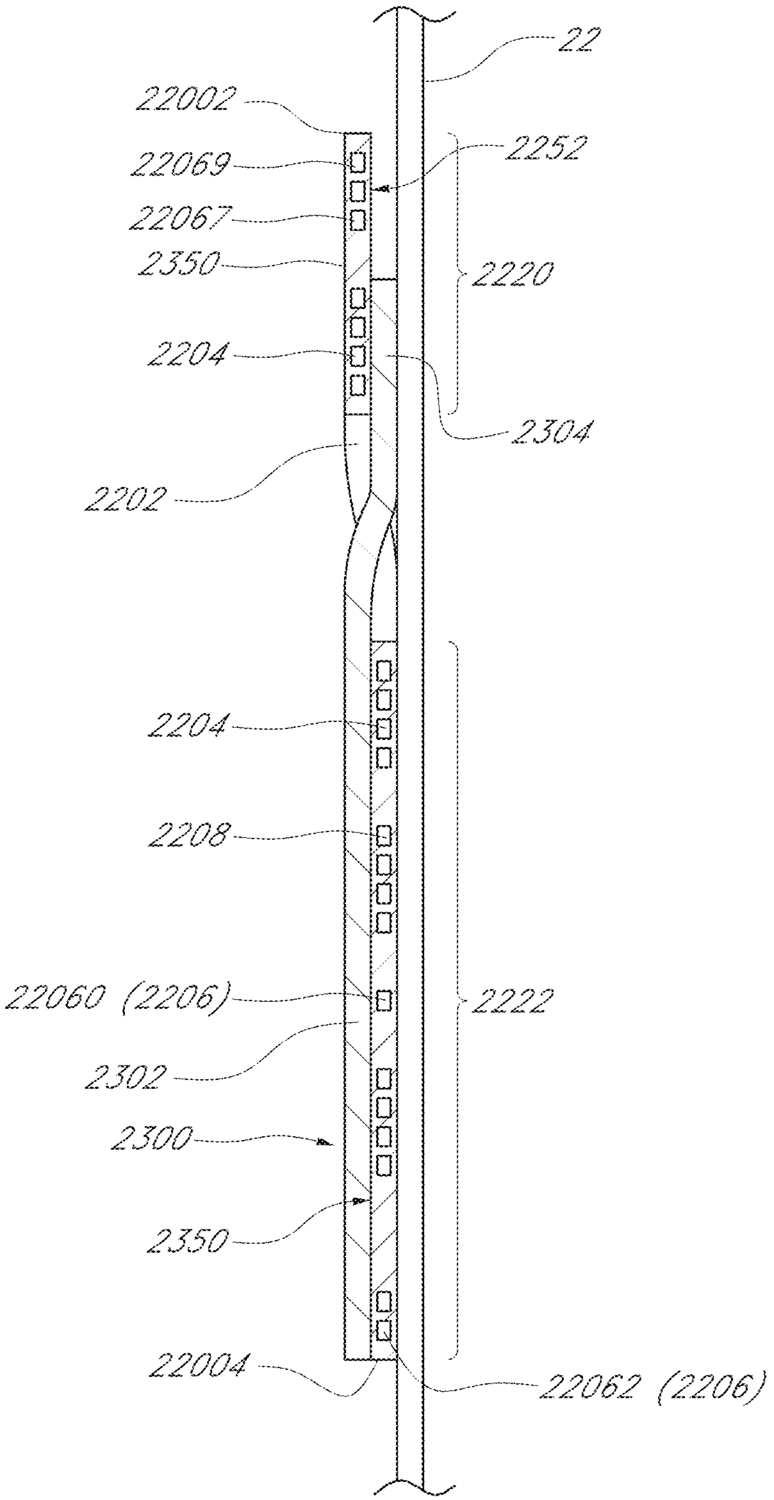
FIG. 39 is a sectional view of the smartphone antenna module shown in FIG. 35, showing a state in which the smartphone antenna module is installed in a smartphone.

Locational Relationship of Components of Antenna Module when Assembled in a Smartphone Referring to FIG. 39, when the antenna module 2100 is installed in a smartphone 10, the surface 2252 of the flexible PCB 2200 faces a rear cover 22 of the smartphone. Thus, the head portion 2304 is located between the rear cover 22 and the upper PCB section 2220. Since the base portion 2302 is located on the surface 2350, the lower PCB section 2222 is located between the rear cover 22 and the base portion 2302. However, the invention is not limited thereto. When the antenna module is arranged such that the surface 2350 of the flexible PCB 2200 faces the rear cover 22 of the smartphone, the base portion may be located between the lower PCB section 2222 and the rear cover 22.

Locational Relationship of Magnetic Sheet and Coil U

Referring to FIG. 37, coil U 2204 includes, for example, four conductive lines that are located in the upper PCB section 2220 and extend along an upper edge 22022 of the through-hole 2202. In the illustrated embodiment, each of the four lines of coil U in the upper section 2220 overlaps the head portion 2304. But, the invention is not limited thereto. In another embodiment, at least one of the four lines of coil U does not overlap the head portion 2304. Coil U 2204 further includes four lines that are located in the lower PCB section 2222 and extend along a lower edge 22024 of the through-hole 2202. In the illustrated embodiment, each of the four lines of coil U in the lower PCB section 2222 overlaps the base portion 2304.

Locational Relationship of Magnetic Sheet and Coil V

Figure 38:
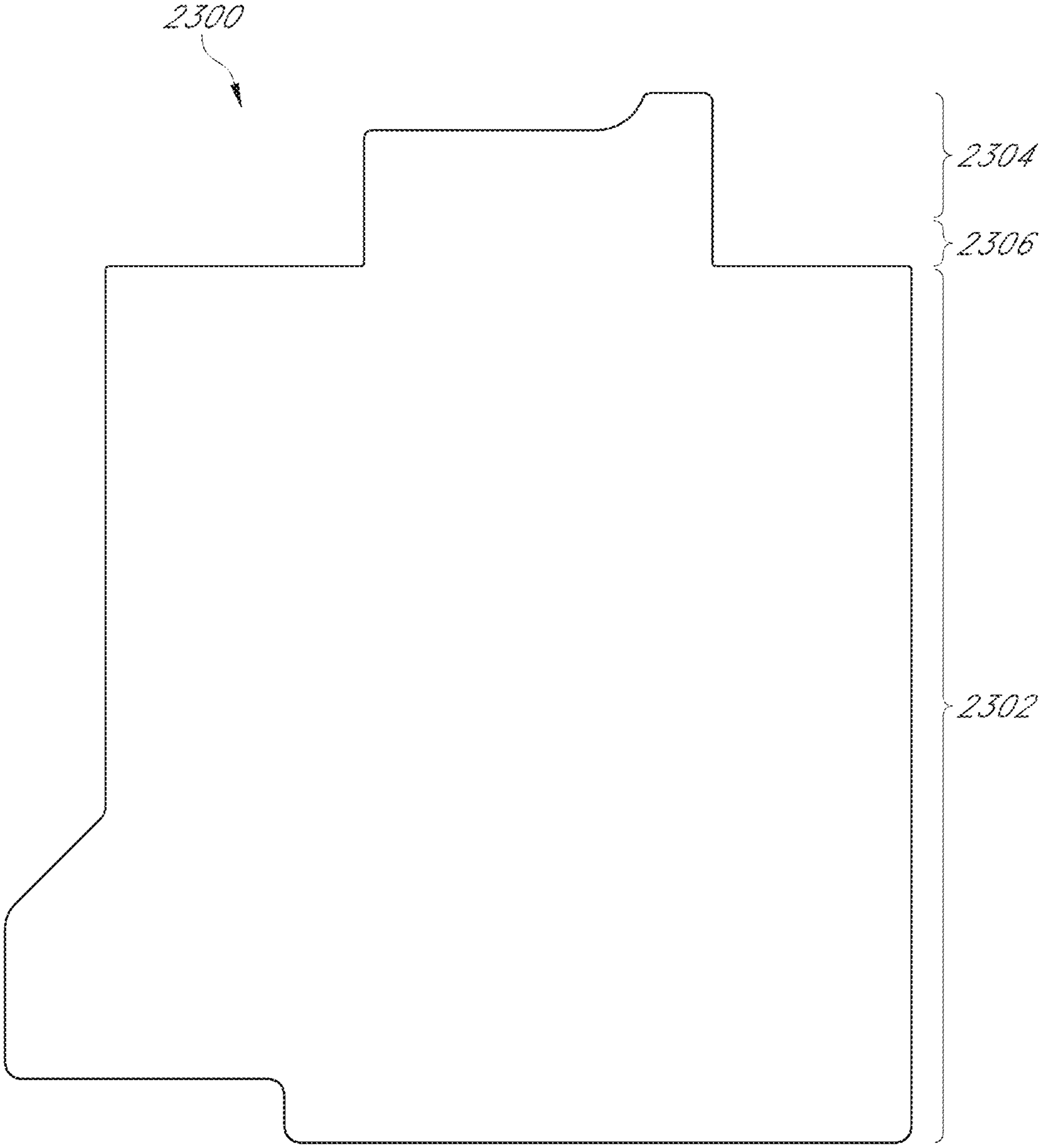
FIG. 38 is a front view of a magnetic sheet of the smartphone antenna module shown in FIG. 35.

Referring to FIGS. 37 and 39, the entire turns of coil V 2208 are located in the lower PCB section 2222 and overlap the base portion 2302 when viewed in the viewing direction. In FIG. 38, the entire portion of coil V 2208 is located between the base portion 2302 and the rear cover 22 of the smartphone.

Locational Relationship of Magnetic Sheet and Coil W

Referring to FIGS. 37 and 39, coil W 2206 includes three lines 22069 that are located in the upper PCB section 2220 and extend along the upper edge 22002 of the flexible PCB. In embodiments, none of the three lines of coil W 2206 in the upper PCB section 2220 overlaps the head portion 2304. But, the invention is not limited thereto. In other embodiments, at least one of the three lines of coil W 2206 in the upper PCB section 2220 overlaps the head portion 2304. Referring to FIG. 37, coil W 2206 further includes three lines 22062 and 22060 that are located in the lower PCB section 2222. In one embodiment, each of the three lines of coil W located in the lower PCB section 2222 overlaps the base portion 2308 when viewed in the viewing direction. In another embodiment, the entire portions of coil W that are located in the lower PCB section 2222 overlap the base portion 2302.

No Electric Connection Among Coils U, V and W of Flexible PCB

In embodiments, referring to FIG. 37, there is no electric connection among coil U 2204, coil W 2206 and coil V 2208 in the flexible PCB. Specifically, each of coil U 2204, coil W 2206 and coil V 2208 has an inner terminal and an outer terminal. Each of the inner and outer terminals of coil U 2204, coil W 2206 and coil V 2208 is connected to a corresponding one among connector terminal pads 2242 formed in a connector portion 2240 of the flexible PCB 2200.

Magnetic Flux in Magnetic Sheet

Referring to FIG. 37, when current flows through coil U 2204, magnetic flux are generated to generally extend from the head portion 2304 to the base portion 2302 via the neck portion 2306 of the magnetic sheet 2300. In embodiments, when current flows through coil V 2208, magnetic flux are generated to generally extend radially from the peripheral area of the base portion to the central portion of coil V 2208.

Coil U for MST Antenna, Coil V for Wireless Charging and Coil W for NFC Antenna

In embodiments, when the antenna module is installed in a smartphone, coil U 2204 is connected to an MST circuit in the smartphone and functions as an MST antenna. Coil V 2208 is connected to a wireless charging circuit for charging a battery in the smartphone and functions as a wireless charging antenna. Coil W 2206 is connected to an NFC circuit in the smartphone and functions as an NFC antenna. In embodiments, the smartphone includes a controller which operates coil U, coil V and coil W as an MST antenna, a wireless charging antenna and an NFC antenna, respectively. The controller can operate coils U, V and W such that coil U and coil W does not operate while coil V is operating as a wireless charging antenna. Similarly, the controller operates coils U, V and W such that coil W and coil V do not operate while coil U is operating as an MST antenna. The controller can also operate coil U, V and W such that coil U and coil V does not operate while coil W is operating as an NFC antenna.

Coils Printed in Multiple Layers of Flexible PCB

The flexible PCB may include two or more layers. For example, a coil (at least one turn of printed line) is formed in one layer, and another coil is formed in another layer. Further, another coil may be formed in another layer of the two or more layers. One or more vias interconnect these coils such that these coils form a serial connection for providing a serially connected coil antenna. In other embodiment, two or more coils of different layers are connected by parallel connection to provide two more coil antennas that are parallel connected. In one embodiment, a coil is formed in each of the two or more layers. In another embodiment, at least one layer of the flexible PCB does not include a coil.

Printed Coil Segments

In embodiments, at least one of the multiple layers contain a printed line (or printed coil segment) that does not form a turn. The printed coil segment of a layer may be connected to another coil segment of another layer or to a coil of another layer via one or more vias.

Embodiments Shown in FIGS. 40-44

For example, referring to FIGS. 40-44, an antenna module 2100' includes a flexible PCB 2200' which includes a bottom layer 2270, a top layer 2272 and an insulation layer interposed therebetween. In embodiments, the top layer 2272 is placed over the bottom layer 2270 such that the through-holes 2202 of the top and bottom layers are aligned. The bottom layer 2270 includes coil 2204' (coil U), coil 2206' (coil W), and line segments of coil V (for example, line segments 22085, 22086 and 22087 of coil V shown in FIGS. 43 and 44). The top layer 2270 includes coil 2210 (coil X), line segments for coil W, and line segments of coil V (for example, line segments 22081, 22082 and 22083 shown in FIGS. 42 and 44). In the discussions of embodiments illustrated in FIGS. 40-44, the terms “top” and “bottom” do not refer to their absolute location. In some circumstances, for example, an item labeled with term “top” may be located lower or under an item labeled with the term “bottom.” The locational relationship between the magnetic sheet 2300' and each of coil U, coil W and coil V is the same as the locational relationship illustrated in FIGS. 37 and 39.

Connections of Coils in Multiple Layers in FIGS. 40-44

Figure 40:
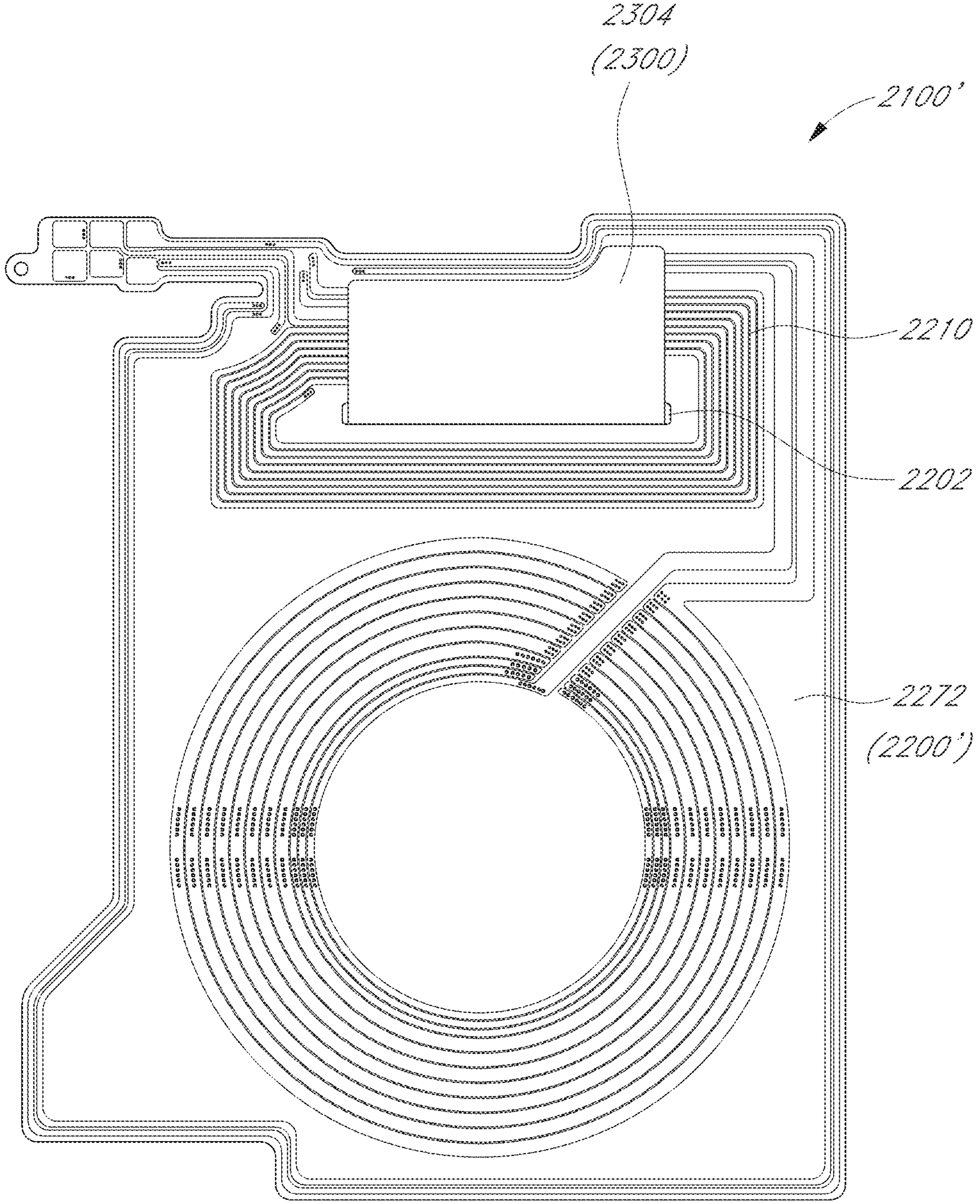
FIG. 40 is a front view of a smartphone antenna module according to a further embodiment.
Figure 41:
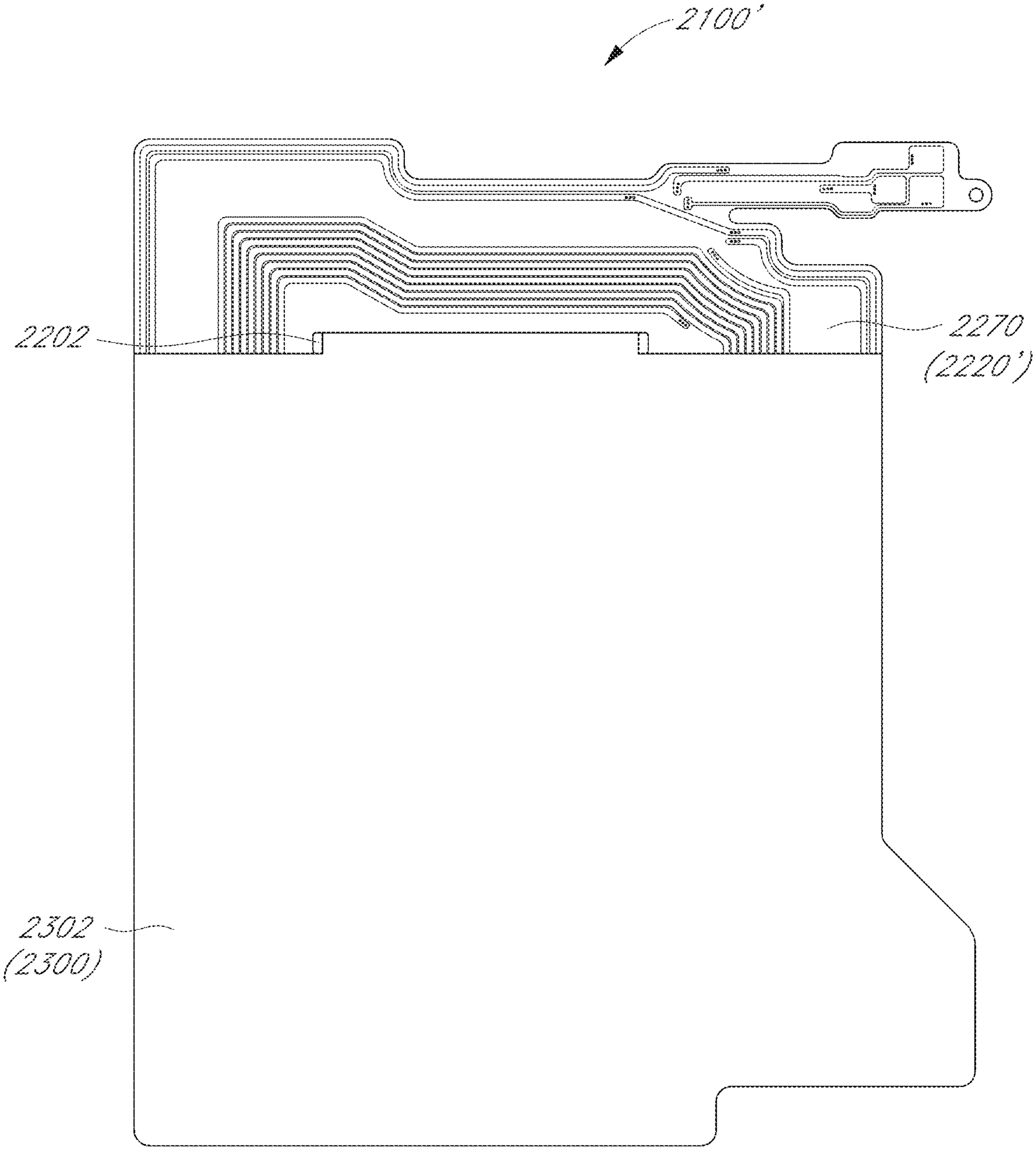
FIG. 41 is a rear view of the smartphone antenna module shown in FIG. 40.
Figure 42:
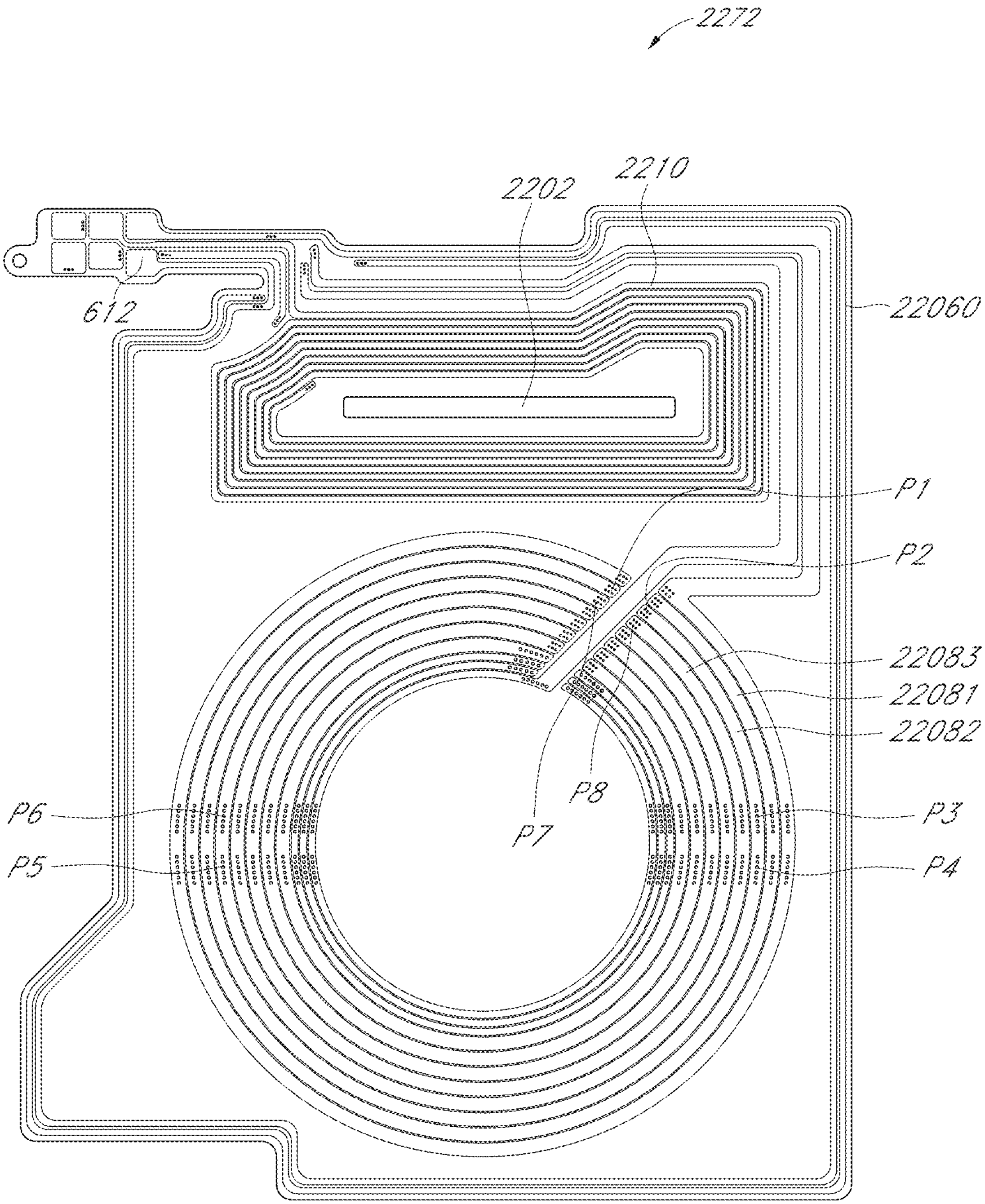
FIG. 42 is a front view of a top layer of a flexible PCB of the smartphone antenna module shown in FIG. 40
Figure 43:
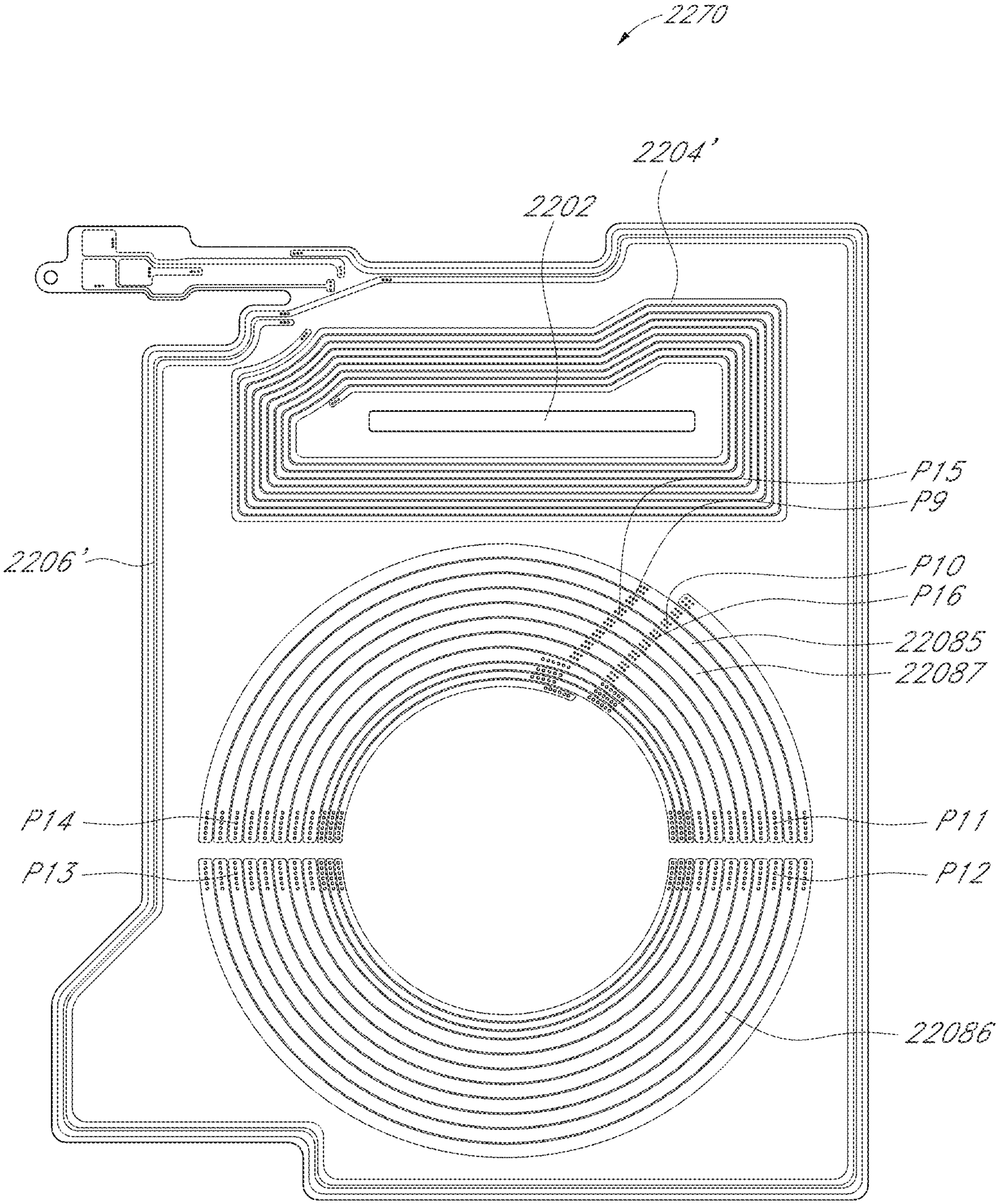
FIG. 43 is a front view of a bottom layer of a flexible PCB of the smartphone antenna module shown in FIG. 40.
Figure 44:
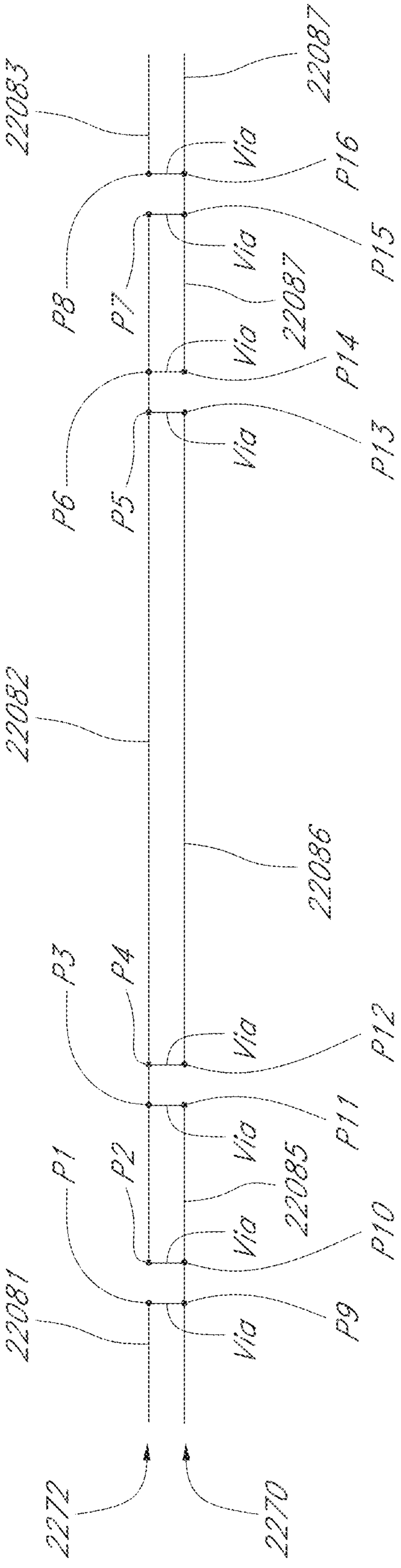
FIG. 44 shows connection of lines formed in multiple layers of the flexible PCB.

In embodiments, coil U and coil X are connected to each other in series likewise coils 1204 and 1210 of the embodiments shown in FIG. 22. Referring to FIGS. 42-44, line segments 22081, 22082, 22083, 22085, 22086 and 22087 are connected via vias to form coil V. Each via connects corresponding two points, among the points P1-P16. In embodiments, line segments 22060 formed in the top layer are connected to coil 2206' (coil W) formed on the bottom layer via vias likewise coil 1206 and line segments of the embodiments shown in FIGS. 22 and 23B. In the embodiments illustrated in FIGS. 40-44, coil W does not include a line segment that crosses coil V, but not limited thereto. In embodiments, the magnetic sheet 2300' shown in FIGS. 40 and 41 is the same as that shown in FIG. 38.

Configuration of Coils and Magnetic Sheets

In the embodiments illustrated in FIGS. 35-44, the configuration of coils and the magnetic sheet can be replaced with that of coils and magnetic sheet discussed above with reference to FIGS. 1-40. For example, a magnetic sheet shown in FIG. 17 can be used as the magnetic sheet shown in FIG. 38 or the magnetic sheet shown in FIG. 19.

Additional Embodiments

Embodiments shown in FIGS. 32-34 provides following features. One embodiment provides a smartphone antenna module for use in a smartphone comprising:

- a winding antenna comprising a winding of at least one wire with an inner terminal and an outer terminal, the inner terminal being located in an inner portion of the winding and the outer terminal being located in an outer portion of the winding;
- a flexible PCB (printed circuit board) comprising a thin flexible body comprising a printed antenna portion, a bridge portion and a connector portion;

the printed antenna portion comprising a printed antenna in the flexible PCB;

a first conductive line formed in the flexible PCB and extending between a first end and a second end, the first end and at least part of the first conductive line formed in the bridge portion;

the connector portion accommodating at least part of the connection terminals for the printed antenna and the winding antenna for connecting to a counterpart connection terminal of a smartphone; and the bridge portion extending across the winding such that the bridge portion and a portion of the winding overlap when viewed in a viewing direction perpendicular to a major surface of the bridge portion and further such that the first end of the conductive line reaches the inner portion of the winding for electrical connection with the inner terminal of the winding antenna, the major surface being the most wide surface of the bridge portion, wherein a thickness of the bridge portion in the viewing direction including the first conductive line integrated therein is smaller than a thickness of the at least one wire in the viewing direction.

In the smartphone antenna module of proceeding embodiment, the printed antenna portion including the printed antenna is at least in part thicker than the bridge portion including the first conductive line. In the smartphone antenna module of proceeding embodiments, the thickness of the bridge portion at any point thereof is smaller than a thickness of the printed antenna portion in the viewing direction. In the smartphone antenna module of any one of the preceding embodiments, the printed antenna and the winding antenna are arranged generally side by side such that the printed antenna and the winding antenna do not overlap when viewed in the viewing direction. In the smartphone antenna module of any one of the preceding embodiments, the antenna module further comprises a second conductive line extending in the bridge portion and comprising a third end and a fourth end, wherein the third end is connected to the outer portion of the winding for electrical connection with the outer terminal of the winding antenna. In the antenna module shown in FIGS. 32-34, there is no electric connection between the winding antenna and the coil antenna in the flexible PCB.

In the smartphone antenna module of any one of the preceding embodiments, each of the first and second conductive lines has a thickness substantially smaller than its width (e.g., width at least 3 times thickness). In the smartphone antenna module of any one of the preceding embodiments, one of the first and second conductive lines has a thickness substantially smaller than its width. In the smartphone antenna module of any one of the preceding embodiments, the flexible PCB and the winding antenna are arranged generally side by side such that the printed antenna portion and the winding antenna do not overlap when viewed in the viewing direction.

In the smartphone antenna module of any one of the preceding embodiments, the printed antenna and the winding antenna are electrically decoupled within the smartphone antenna module. In the smartphone antenna module of any one of the preceding embodiments, the second end is formed in the connector portion. In the smartphone antenna module of any one of the preceding embodiments, the antenna module further comprises a second conductive line formed in the flexible PCB extending between a third end and a fourth end. In the smartphone antenna module of any one of the preceding embodiments, the third end is formed in the bridge portion, and the fourth end is formed in the connector portion.

In the smartphone antenna module of any one of the preceding embodiments, the connector portion is referred to as a first connector portion, the antenna module further comprises a second connector portion, wherein the third end is formed in the second connector portion, and the fourth end is formed in the first connector portion. In the smartphone antenna module of any one of the preceding embodiments, the connector portion is referred to as a first connector portion, wherein the antenna module further comprises a second connector portion and a third connector portion, wherein the third end is formed in the second connector portion, and the fourth end is formed in the third connector portion. In the smartphone antenna module of any one of the preceding embodiments, each of the first, second, third and fourth ends comprises a contact terminal pad.

In the smartphone antenna module of any one of the preceding embodiments, the contact terminal pads of the first and third ends face in a first direction wherein the contact terminal pads of the second and fourth ends face in a second direction opposite to the first direction. In the smartphone antenna module of any one of the preceding embodiments, the contact terminal pads of the first, second, third and fourth ends face in the same direction. In the smartphone antenna module of any one of the preceding embodiments, the connection terminals for the winding antenna comprise the second end of the first conductive line and the fourth end of the second conductive line.

In the smartphone antenna module of any one of the preceding embodiments, the printed antenna comprises a coil of a printed wire. In the smartphone antenna module of any one of the preceding embodiments, each of the first and second ends comprises a contact terminal pad. In the smartphone antenna module of any one of the preceding embodiments, the connection terminals for the printed antenna comprise first and second connection terminals connected to first and second ends of the printed wire, respectively, wherein each of the first and second connection terminals comprises a contact terminal pad, wherein the contact terminal pads of the first and second connection terminals and the contact terminal pads of the first end of the first conductive line face the same direction.

In the smartphone antenna module of any one of the preceding embodiments, the printed antenna comprises a coil of a printed wire, wherein the flexible PCB comprises a hole surrounded by the coil of the printed wire. In the smartphone antenna module of any one of the preceding embodiments, the coil of the printed wire comprises 2-7 turns, in one embodiment, 3-5 turns. In the smartphone antenna module of any one of the preceding embodiments, a thickness of the printed antenna portion including the printed antenna is about 100-140 μm, in one embodiment, about 120 μm, wherein a thickness of the bridge portion including the first conductive line is about 40-80 μm, in one embodiment, about 60 μm. In the smartphone antenna module of any one of the preceding embodiments, the module further comprises a magnetic material plate attached to the flexible PCB. In the smartphone antenna module of any one of the preceding embodiments, the magnetic material plate comprises a ferrite plate which comprises a hole aligned with the hole of the flexible PCB.

In the smartphone antenna module of any one of the preceding embodiments, the winding antenna comprises a coil of an insulation-coated wire. In the smartphone antenna module of any one of the preceding embodiments, the at least one wire comprises an enamel-coated wire, wherein the winding has a single layer of the enamel-coated wire such that the layer of the coil of the coated wire has a thickness substantially same as the diameter of coated wire. In the smartphone antenna module of any one of the preceding embodiments, the enamel-coated wire has a thickness about 100-140, in one embodiment, 120 μm. In the smartphone antenna module of any one of the preceding embodiments, the at least one wire comprise two or more wires, each of which comprises the inner terminal and the outer terminal, wherein the inner terminals of the two or more wires are attached to the contact terminal pad of the first end of the first conductive line and the outer terminals of the two or more wires are attached to the contact terminal pad of the third end of the second conductive line such that the two or more wires are electrically connected to each other in parallel. In the smartphone antenna module of any one of the preceding embodiments, the inner end of the wire is welded to the contact terminal pad of the first end of the first conductive line. In the smartphone antenna module of any one of the preceding embodiments, the outer end of the wire is welded to the contact terminal pad of the third end of the second conductive line. In the smartphone antenna module of any one of the preceding embodiments, each of the two or more wires has about 16-20 turns, in one embodiment, about 18 turns.

In the smartphone antenna module of any one of the preceding embodiments, the number of two or more wires is 2 as shown in FIG. 16, wherein the inner ends of the two wires are attached to the contact terminal pad of the first conductive line, wherein the outer ends of the two wires are attached to the contact terminal pad of the second conductive line, wherein the two wires are connected to each other in parallel. In the smartphone antenna module of any one of the preceding embodiments, the number of two or more wires is 3 or 4.

In the smartphone antenna module of any one of the preceding embodiments, the winding antenna does not comprise a portion of the wire which crosses the winding when viewed in the direction. In the smartphone antenna module of any one of the preceding embodiments, the winding antenna comprises an inner hole, wherein the smartphone antenna module comprises a magnetic material sheet extending through the inner hole.

In the smartphone antenna module of any one of the preceding embodiments, the magnetic material sheet comprises a neck extending through the inner hole and surrounded by the winding and a body connected to the neck and extending from the neck and away from the flexible PCB. In the smartphone antenna module of any one of the preceding embodiments, the magnetic material sheet is flat and the winding antenna is stepped for allowing the magnetic material sheet to extend through the inner hole without substantial deformation of the magnetic material sheet. In the smartphone antenna module of the foregoing embodiment, the printed antenna is for near field communication (NFC), wherein the winding antenna is for magnetic secure transmission (MST). In the smartphone antenna module of any one of the preceding embodiments, the printed antenna is configured to emit signals having about 13.56 MHz, and the winding antenna is configured to emit signals having about 85-100 KHz.

Other embodiments provide a smartphone comprising:

a display disposed at the front side of the smartphone;

a housing comprising a rear cover with a camera hole;

the smartphone antenna module housed in the housing;

a camera module comprising a lens aligned with the camera hole;

the smartphone antenna module of any one of the preceding embodiments; and a smartphone circuit module housed in the housing and comprising a connector portion which comprises terminals for electrically connecting with at least one terminal of the smartphone antenna module, wherein the smartphone antenna module is arranged within the housing such that the printed antenna portion of the smartphone antenna module surrounds the camera module when viewing in a direction perpendicular to the rear cover.

In the smartphone of proceeding embodiment, the rear cover comprises a metal plate and a plastic plate arranged in order along a longitudinal direction of the rear cover, wherein the metal plate is substantially longer than the plastic portion in the longitudinal direction, wherein the metal plate overlaps the flexible PCB and the winding antenna when viewed in the viewing direction. In the smartphone of any one of the preceding embodiments, the smartphone further comprises a magnetic material sheet comprising a main body and an insertion portion, wherein the magnetic material sheet is arranged with the smartphone antenna module such that the insertion portion is inserted into a central opening of the winding antenna and the main body extends in a direction away from the flexible PCB, wherein the metal plate overlaps the flexible PCB, winding antenna and the magnetic material sheet.

In the smartphone of any one of the preceding embodiments, the metal plate comprises an edge contacting, overlapping op neighboring the plastic plate, wherein the main body of the magnetic material sheet extends to or near the edge of the metal plate. In the smartphone of any one of the preceding embodiments, the metal plate comprises an edge contacting, overlapping op neighboring the plastic plate, wherein the main body of the magnetic material sheet extends to the plastic plate. In the smartphone of any one of the preceding embodiments, the metal plate extends at least three quarter the length of the rear cover in the longitudinal direction of the smartphone.

In the smartphone of any one of the preceding embodiments, the flexible PCB is disposed between the metal plate and the ferrite plate. In the smartphone of any one of the preceding embodiments, the magnetic material sheet is substantially parallel to the rear surface of the rear cover. In the smartphone of any one of the preceding embodiments, the metal portion comprises a non-magnetic metal which is electrically conductive. In the smartphone of any one of the preceding embodiments, the metal portion is made of aluminum.

In the smartphone of any one of the preceding embodiments, the smartphone further comprises a plastic sheet disposed between the smartphone antenna module and the rear cover. In the smartphone of any one of the preceding embodiments, the smartphone further comprise another plastic sheet disposed between the smartphone antenna module and the smartphone circuit.

In embodiments, referring to FIGS. 32-34, when the winding antenna is assembled in a smartphone, the winding antenna can be used for wirelessly charging a battery in the smartphone. The smartphone has a controller to control a charging circuit in the smartphone to operate the winding antenna as a transformer coil for wirelessly charging a battery when the smartphone is placed close to a wireless charger. In one embodiment, the entire portion of the magnetic sheet may be placed under the winding antenna coil.

One or more features of each of the embodiments discussed above may be replaced by one or more features included in the other embodiments discussed above. For example, the magnetic sheet 300 of the embodiment shown in FIG. 3 can be replaced with the magnetic sheet 1300 of the embodiment shown in FIG. 19. Further, one or more features of one embodiment discussed above may be added to the other embodiments. For example, the fourth coil 1210 of the embodiment shown in FIG. 22 can be added to the flexible PCB of the embodiment shown FIG. 6 such that the fourth coil overlaps the first coil when viewed in the viewing direction and is connected to the first coil in series. In a further example, the conductive line segments 1280 and 1282 shown in FIGS. 22, 23A and 23B can be added to all the other embodiments.

In embodiments, the antenna module illustrated in FIGS. 1-49 may further include a protective or covering sheet placed over and attached to the assembly of the flexible PCB and magnetic sheet. Further, for facilitating to assembling the antenna module in the smartphone the antenna module further includes a step-compensation sheet placed over and attached to the assembly of the flexible PCB and magnetic sheet for reducing or minimizing steps that may be resulted from the assembly of the flexible PCB and the magnetic sheet having different sizes and shapes. This step-compensation sheet may be tailor-made or customized to fit a space required by the assembly of the flexible PCB and the magnetic sheet. These can be made of a plastic resin material.

In the foregoing discussions, the antenna module according to embodiments are used as a smartphone antenna module that is to be installed in the smartphone. In the foregoing discussions, the smartphone may include any mobile device that can provide voice communication and data communication through wireless networks. In embodiments, the antenna modules discussed in the above can be used in a laptop computer, a slate computer, a personal digital assistant, a portable multimedia player, a navigation device, a wearable device, etc.

Figure 45:
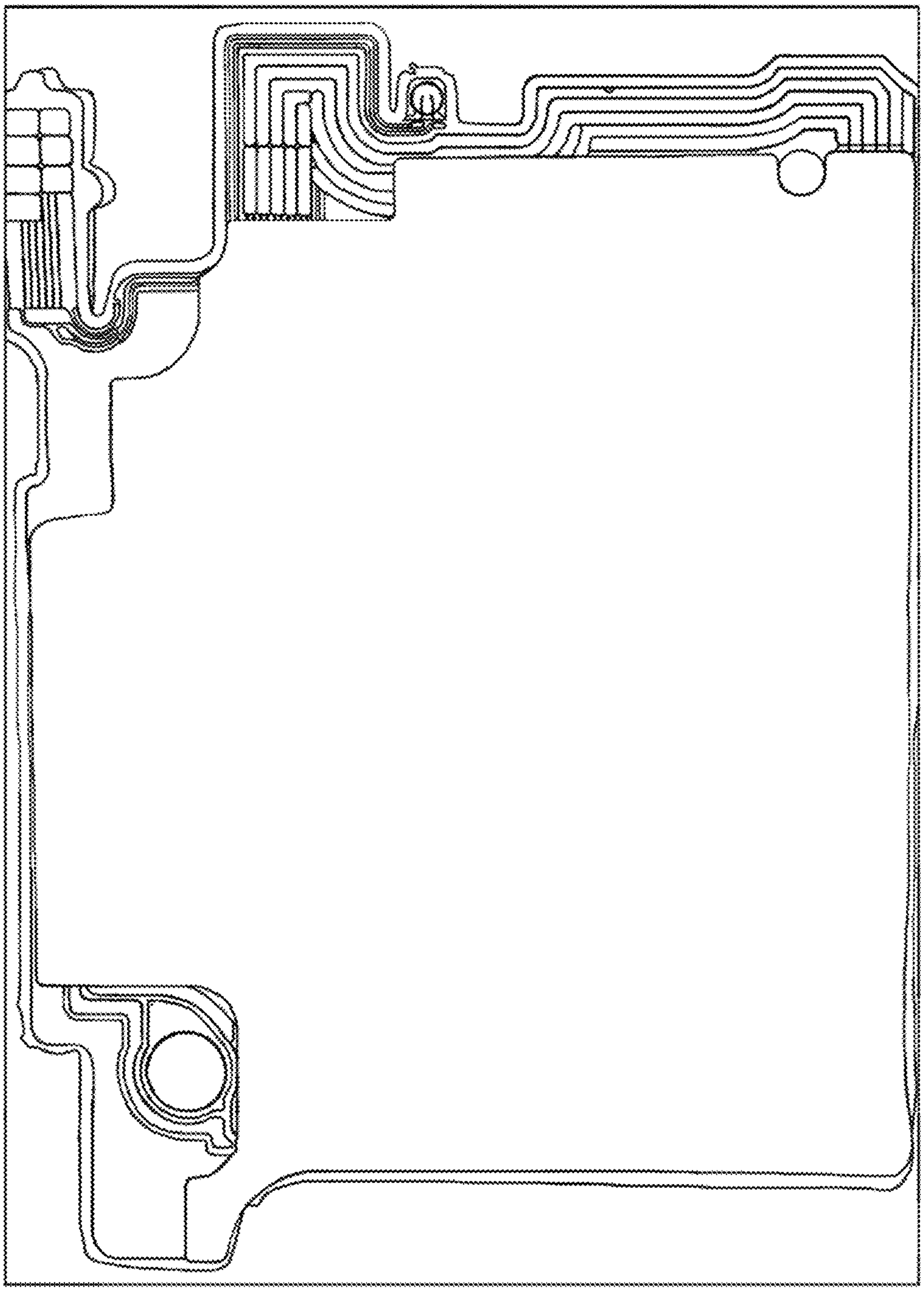
FIGS. 45-52 show a smartphone antenna module and its components according to additional embodiments of the invention.
Figure 46:
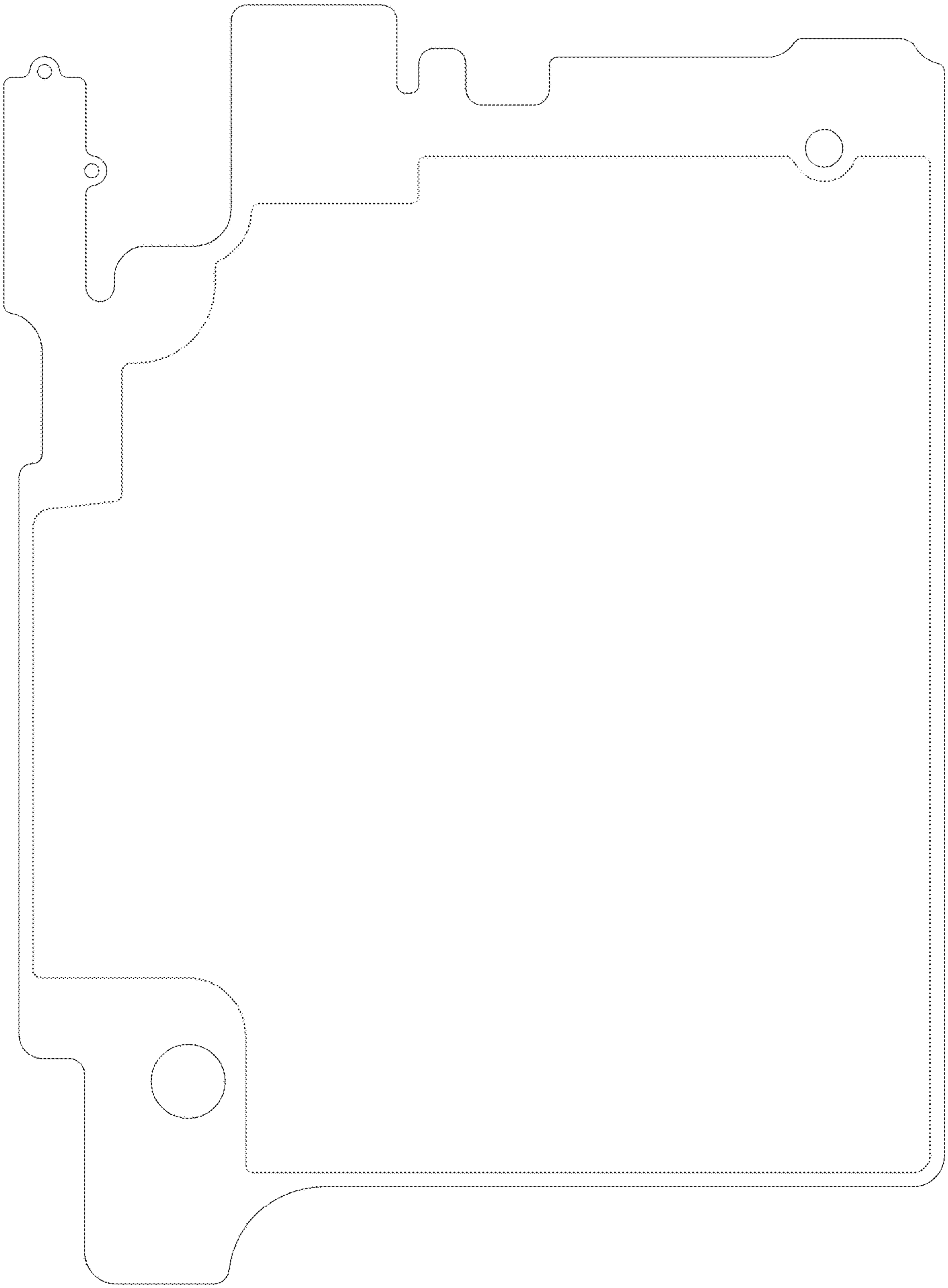

FIG. 45 is a photograph of a smartphone antenna module according to embodiments of the invention. Similar to other embodiments discussed above, the smartphone antenna module includes a flexible PCB and a magnetic sheet attached to the flexible PCB. FIG. 46 shows contours of the flexible PCB and the magnetic sheet as attached to each other.

Figure 47:
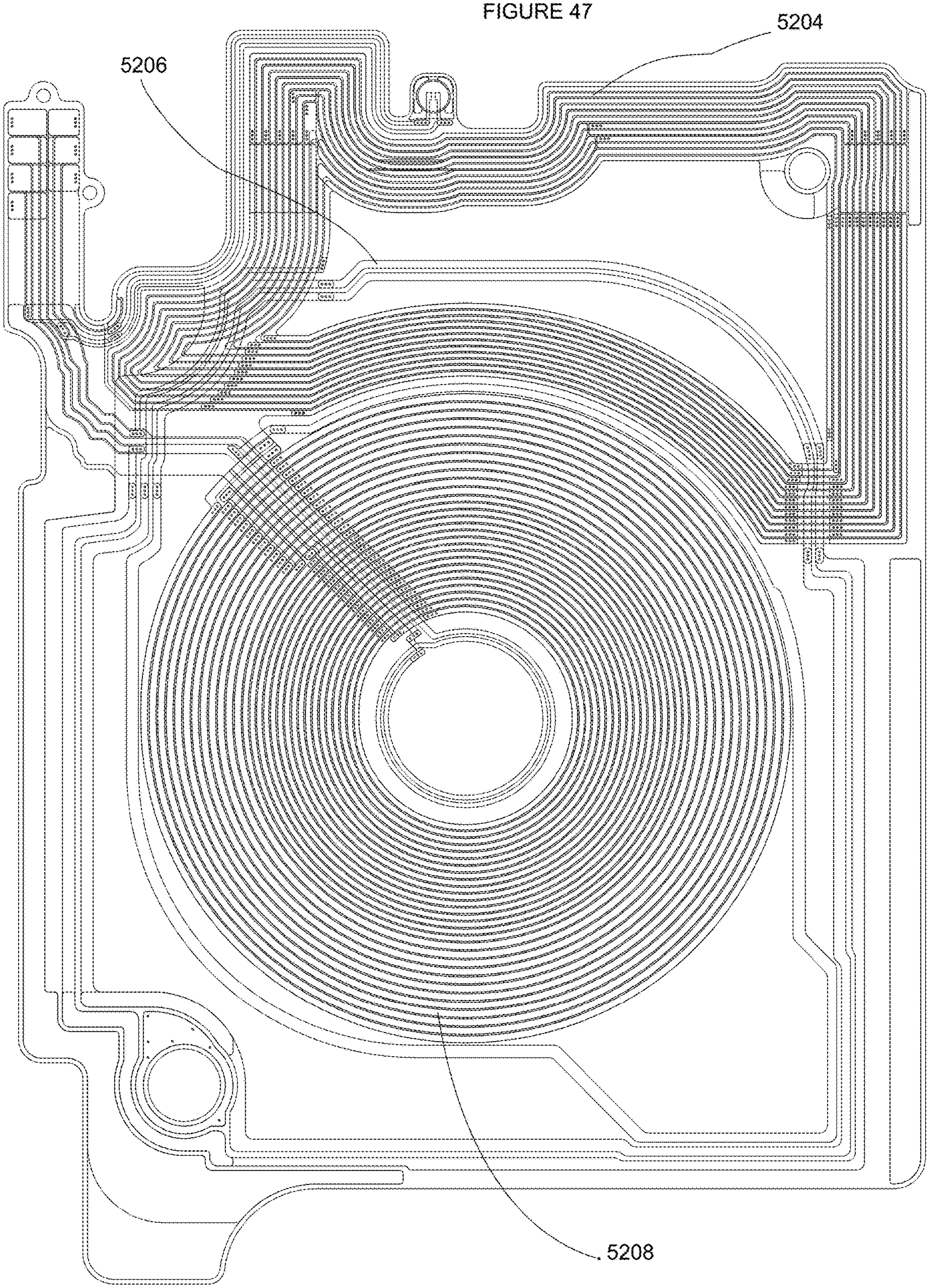
Figure 48:
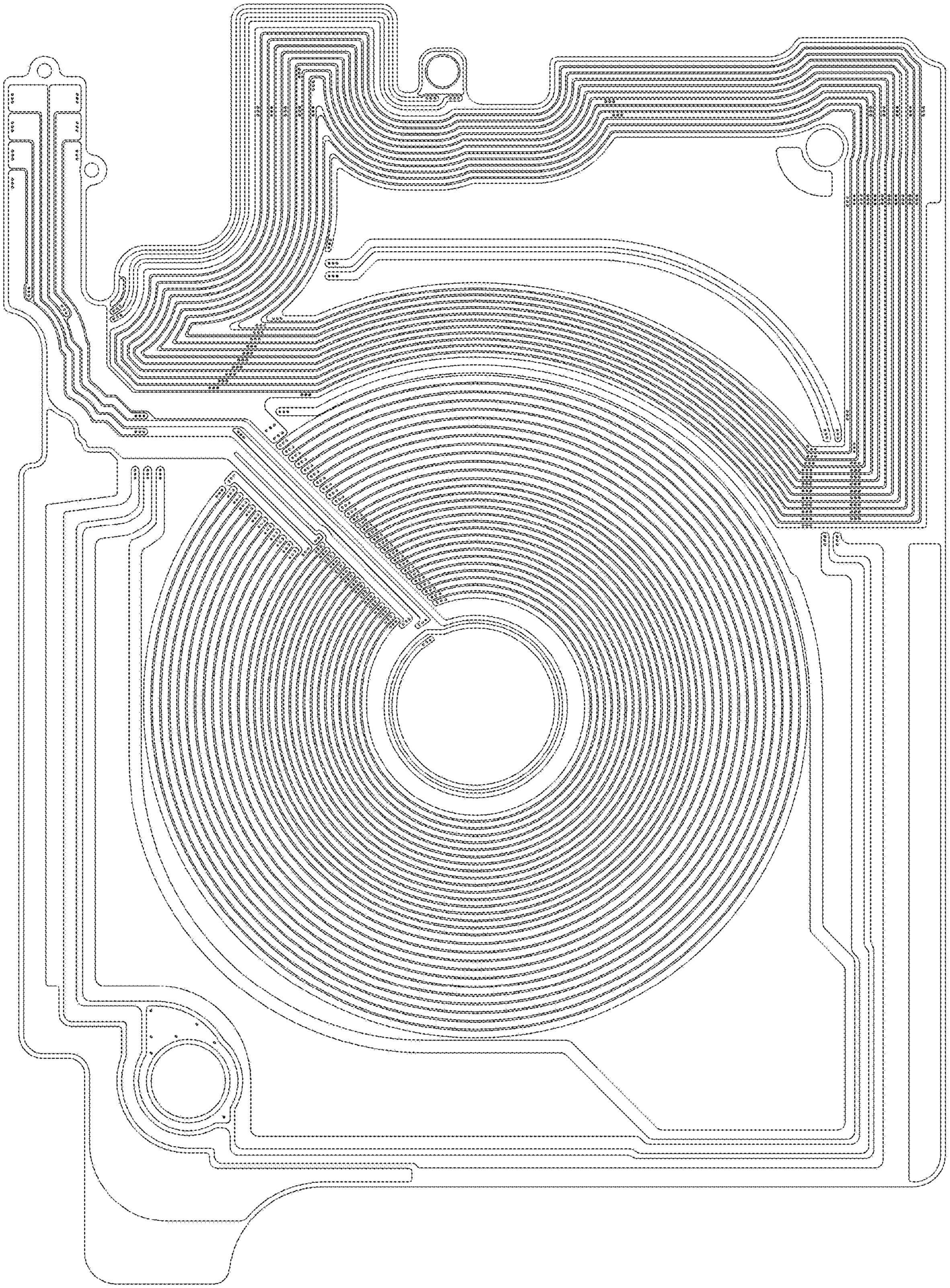
Figure 49:
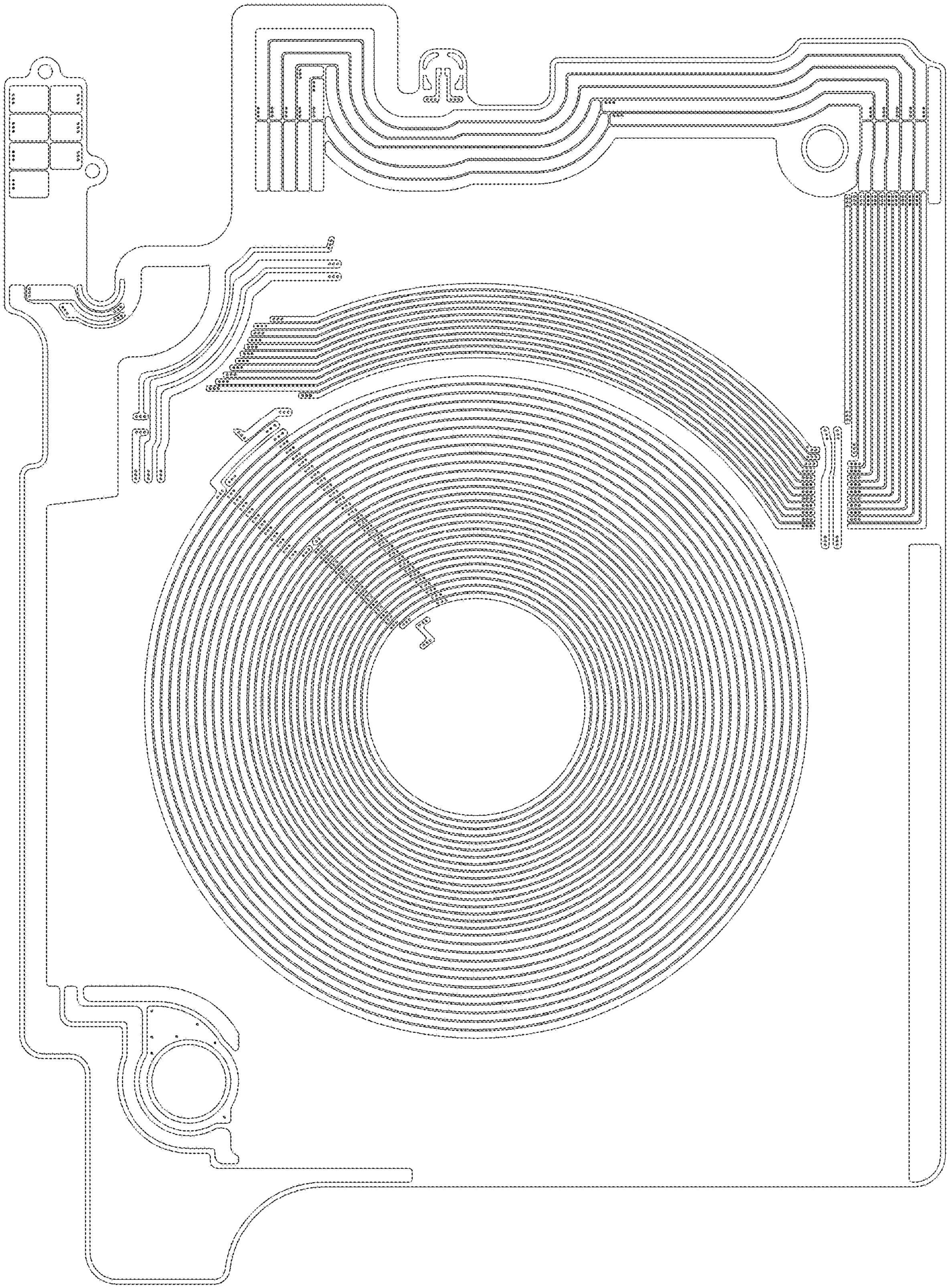

FIGS. 47-49 show wire patterns formed in the flexible PCB. FIG. 48 shows top patterns of the flexible PCB, and FIG. 49 shows bottom patterns of the flexible PCB. To show three complete coil antenna patterns, in FIG. 47, the top and bottom wire patterns are shown as overlapped. The three coil antenna patterns include an MST coil antenna 5204, a wireless charging coil antenna 5208, and an NFC coil antenna 5206.

Referring to FIGS. 47 and 48, the MST coil antenna 5204 is located close to a top edge of the flexible PCB. Referring to FIGS. 47 and 49, the circular wireless charging coil antenna 5208 is disposed at a location spaced from the MST coil antenna and located between the MST coil antenna and a bottom edge of the flexible PCB. As shown in FIG. 47, the NFC coil antenna 5206 is located to surround the wireless charging coil antenna 5208 and overlaps the MST coil antenna when viewed in the thickness direction of the flexible PCB. The MST coil antenna does not overlap the wireless charging coil antenna. The top and bottom patterns of each of the MST coil antenna, NFC coil antenna and wireless charging coil antenna are electrically connected each other through a plurality of vias.

Figure 50:
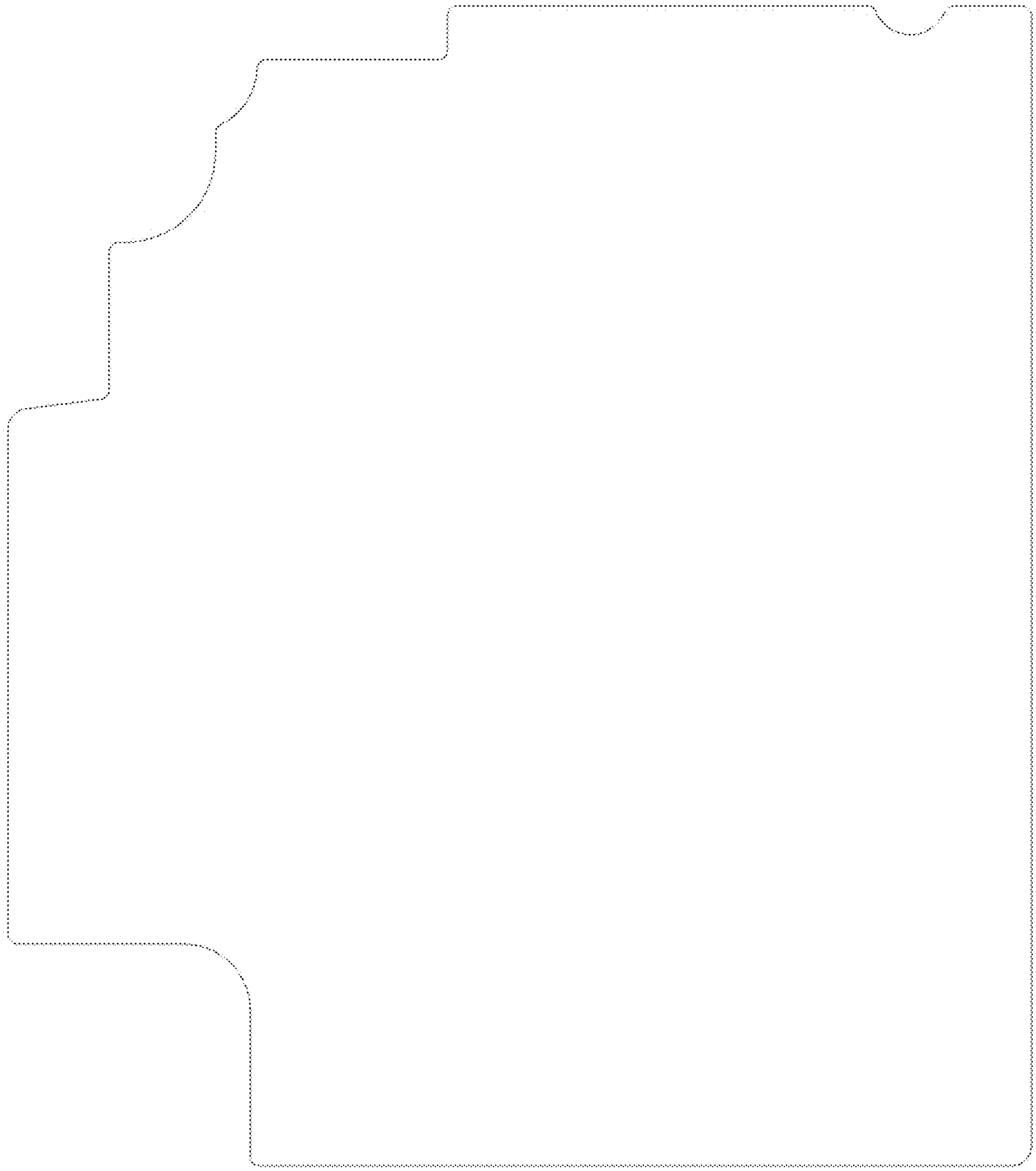

FIG. 50 shows a magnetic sheet.

Figure 51:
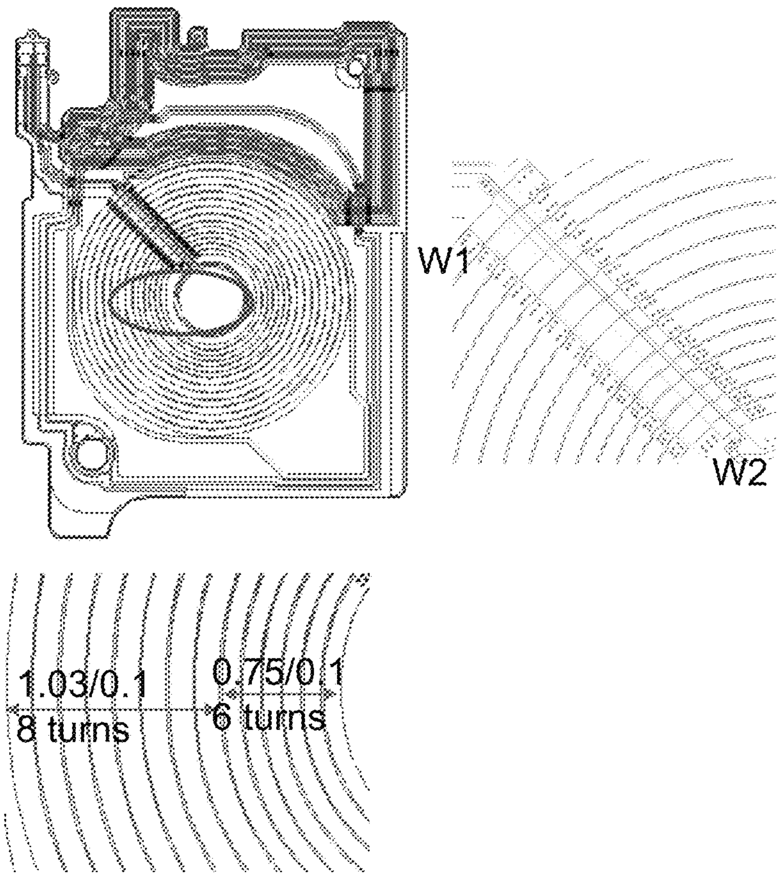
Figure 51:
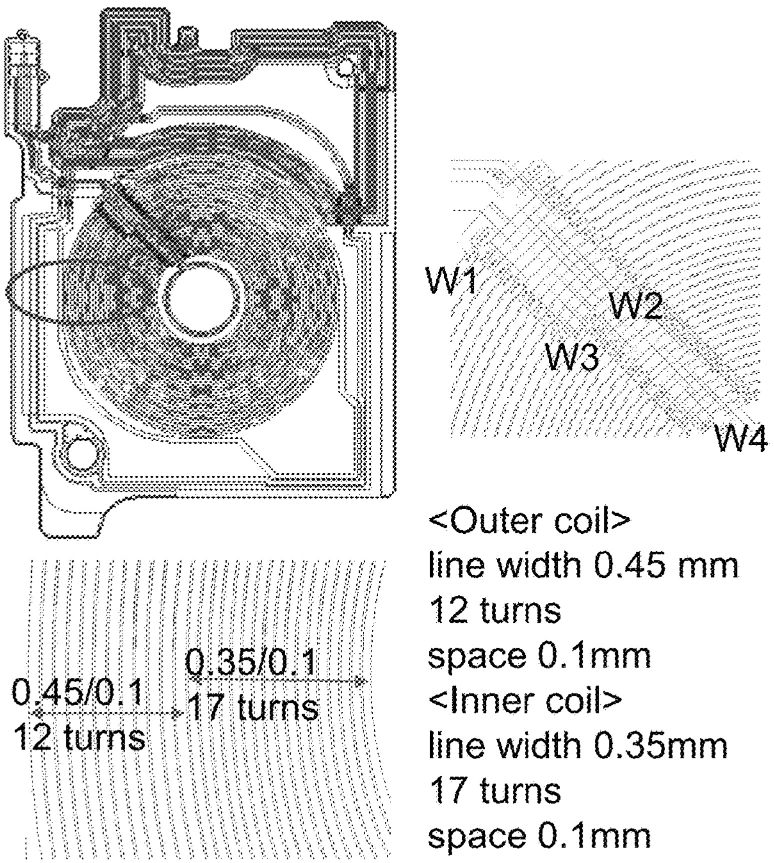

FIG. 51 shows (a) a smartphone antenna module with a wireless charging coil antenna of non-parallel coil design and (b) a smartphone antenna module with a wireless charging coil antenna with parallel coil design. Referring to (b) of FIG. 51, the wireless charging coil antenna includes two circular coils which are connected each other in parallel as shown in FIG. 18B.

Figure 52:
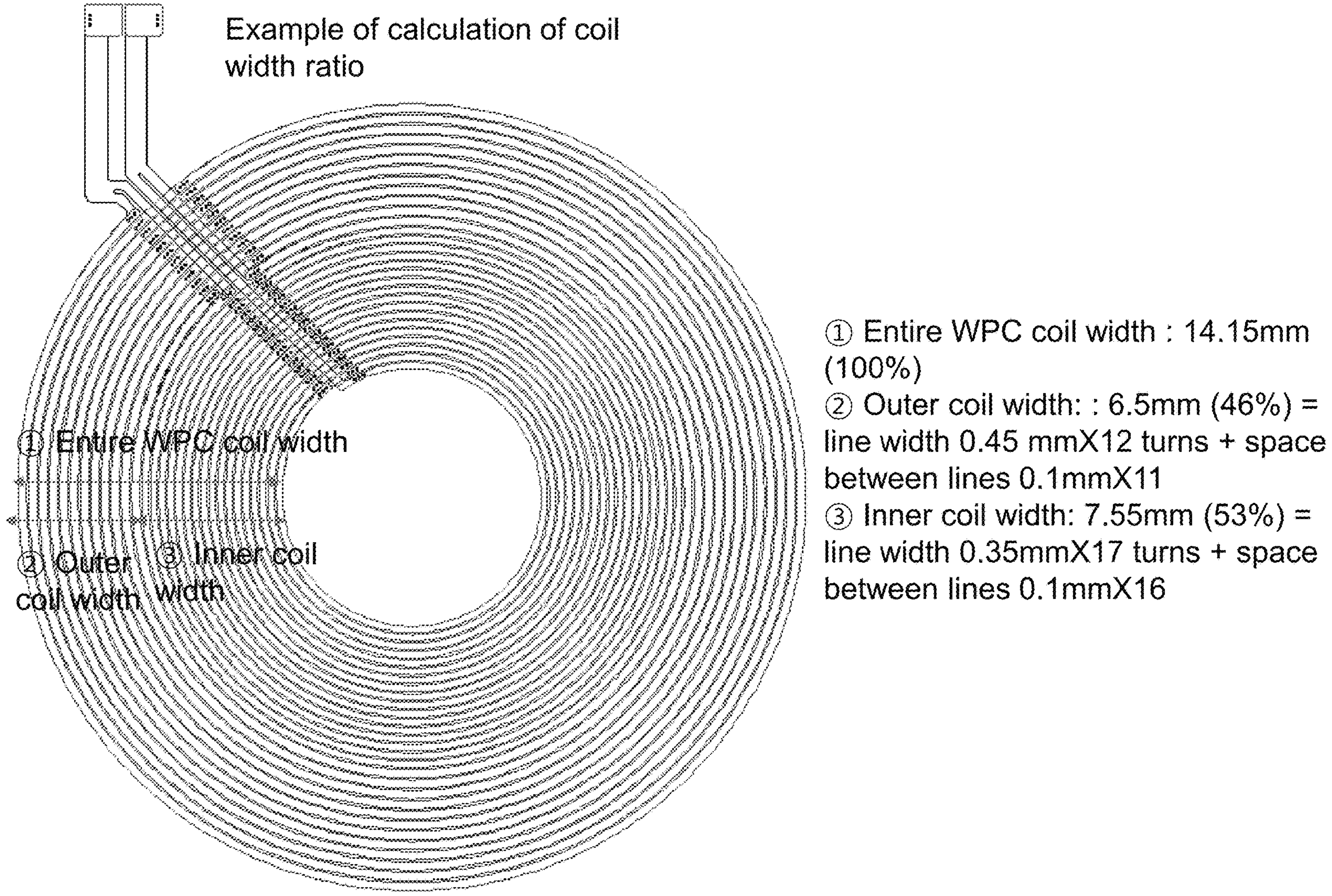
Figure 53A:
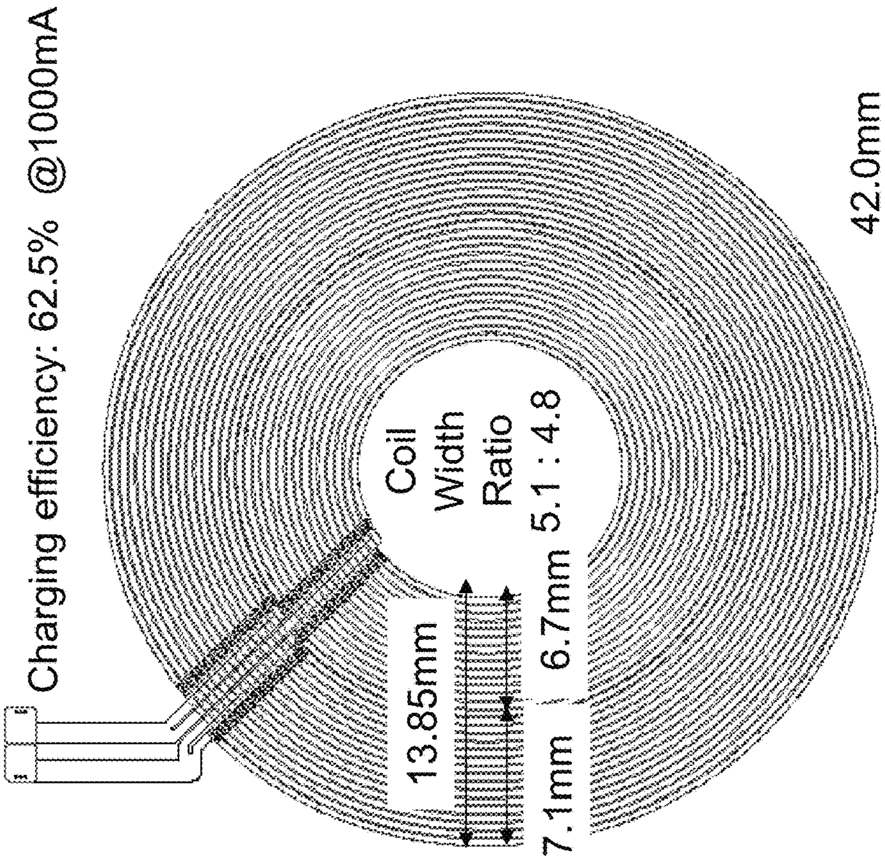
FIGS. 53A, 53B, 53C, 54A, 54B and 54C show various design examples of a wireless charging coil antenna in the smartphone antenna module
Figure 53B:
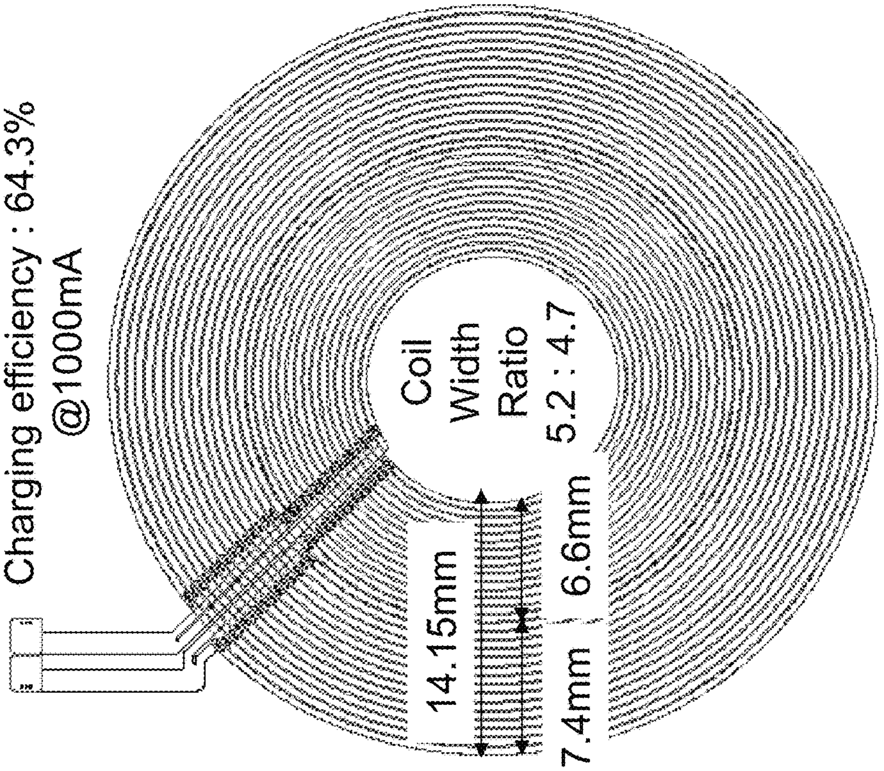
Figure 53C:
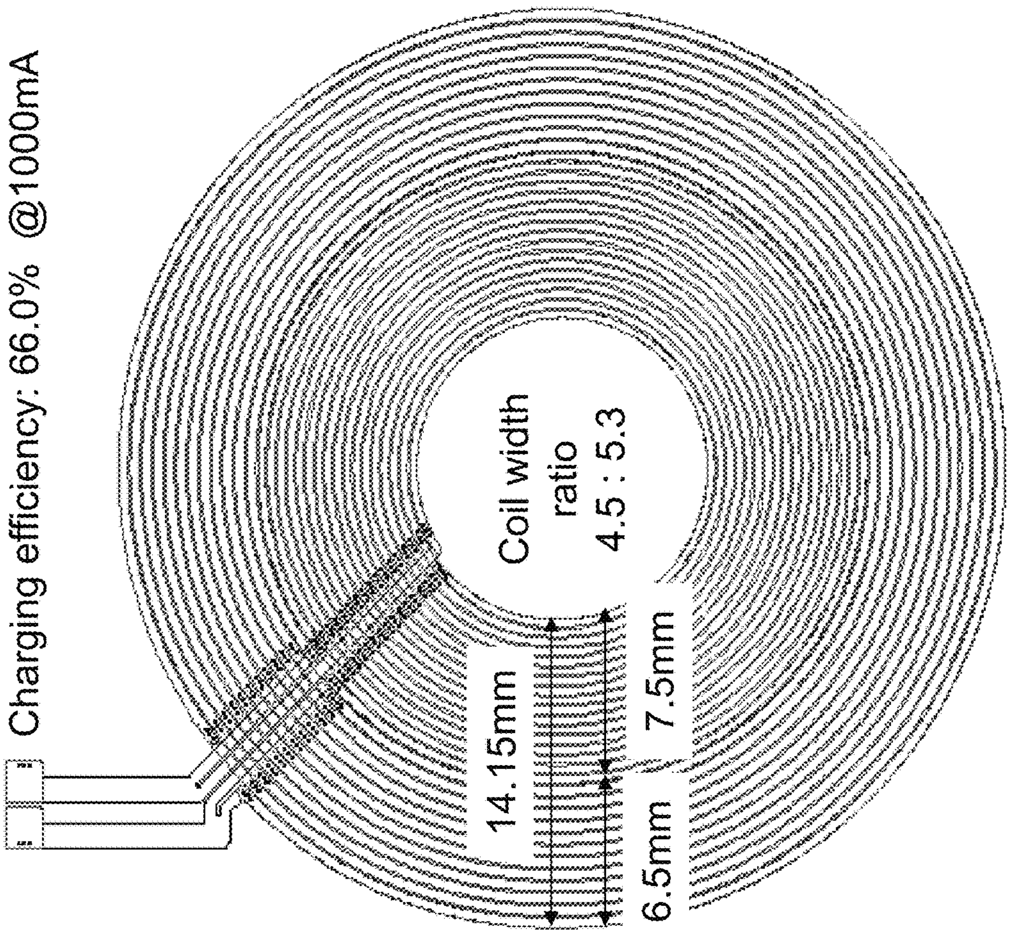
Figure 54A:
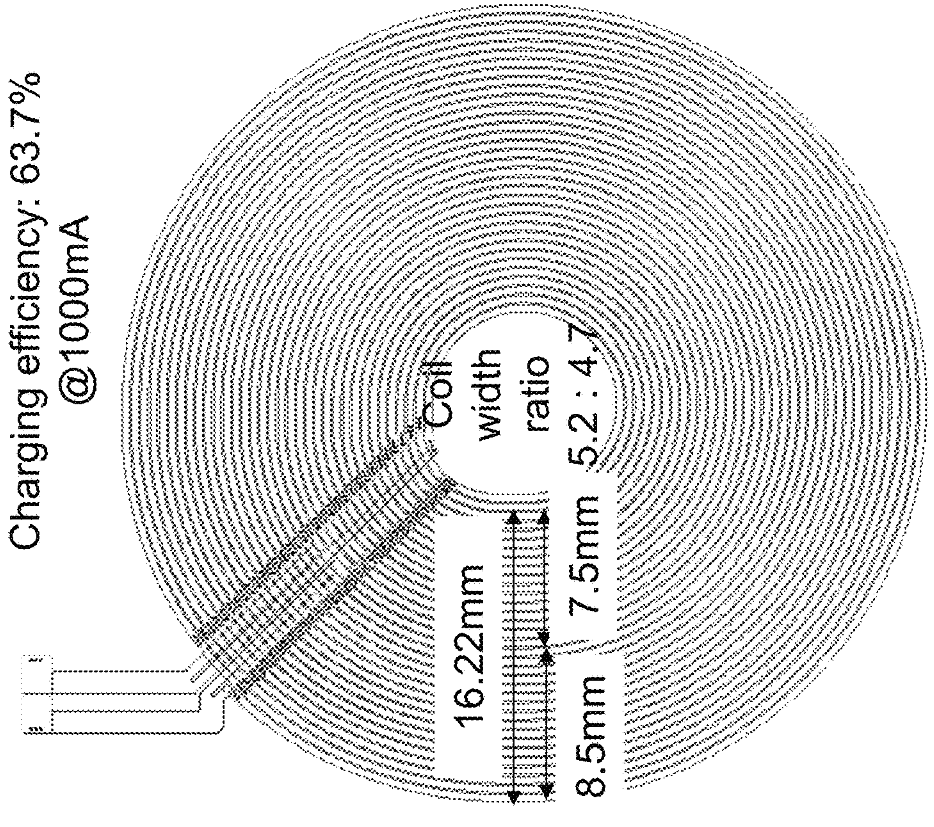
Figure 54B:
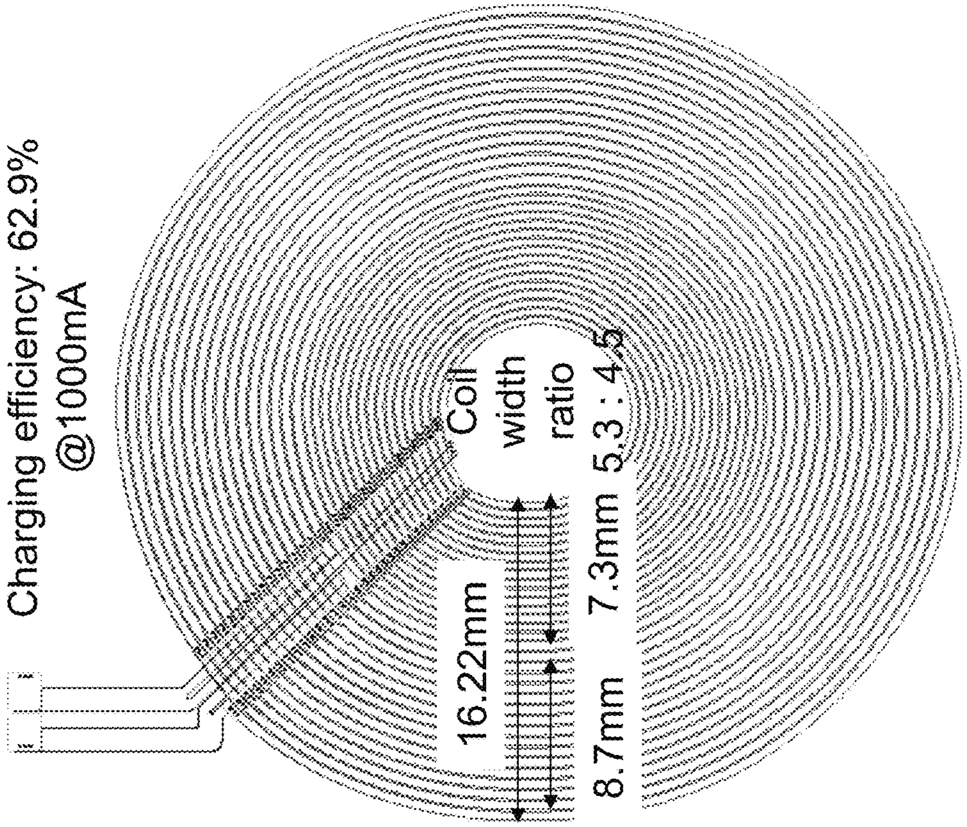
Figure 54C:
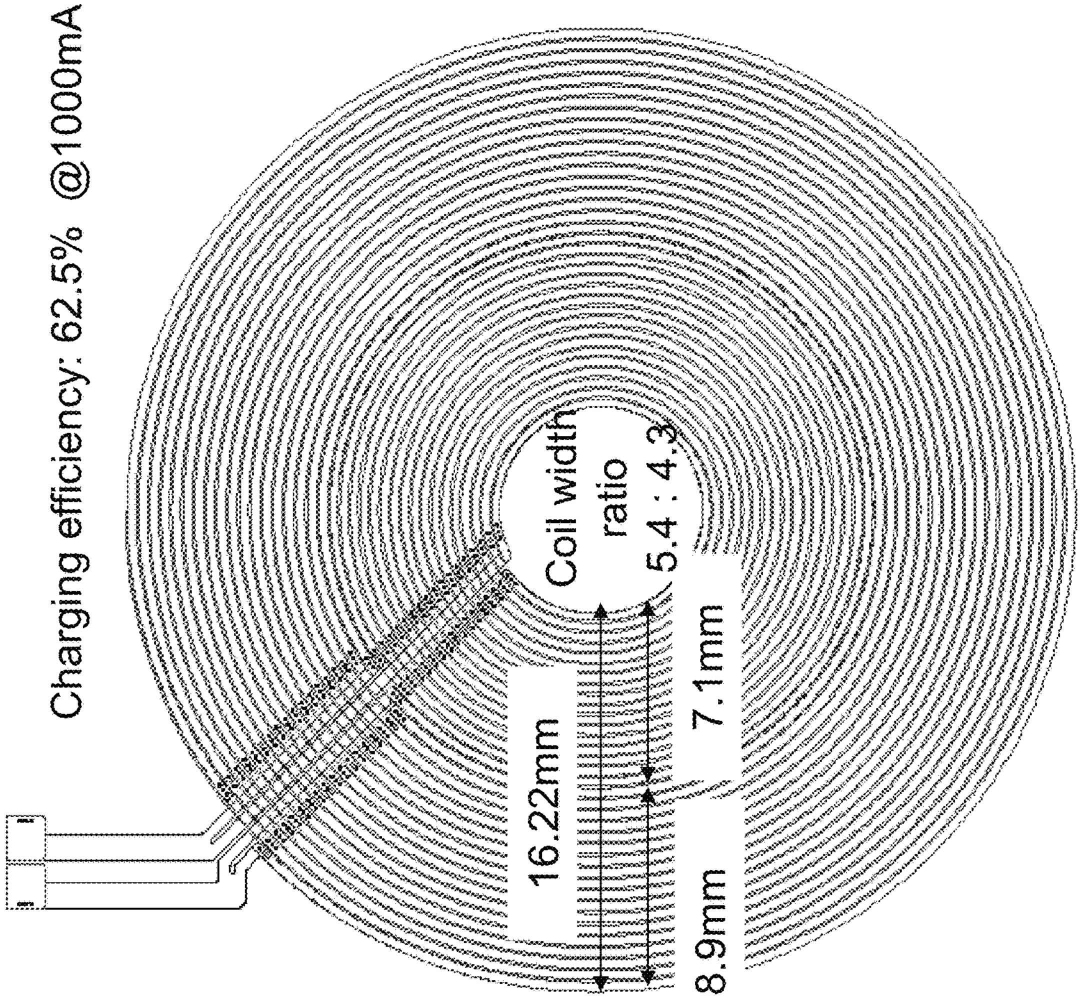

The two circular coil of the wireless charging coil antenna includes an inner coil and an outer coil. The inner coil has the number of turns which is different from that of the outer coil. The inner coil includes a wire line having a width different from that of a wire line of the outer coil. In the embodiment illustrated in (b) of FIG. 51, the line width of the inner coil, e.g., 0.35 mm, is smaller than the line width of the outer coil, e.g., 0.45 mm. The number of turns of the inner coil, e.g., 17 turns, is greater than the number of turns, of the outer coil, e.g., 12 turns. But the invention is not limited thereto. Further, as show in FIG. 52, the entire coil width of the inner coil, e.g., 7.55 mm, is greater than the entire coil width of the outer coil, e.g., 6.5 mm.

FIGS. 53A, 53B, 53C, 54A, 54B and 54C show various examples of the wireless charging coil antenna of the smartphone antenna module. The wireless charging coil antennas in these figures are different from each other in the aspect of the ratio of an outer coil width and an inner coil width, i.e., the outer coil width:the inner coil width. FIG. 55 shown the charging efficiencies depending on the ratio.

Although embodiments of the invention have been described above, those skilled in the art may understand that configurations of the various embodiments described above may be changed without departing from the spirit of the invention. It will be also understood that the changes fall within the scope of the invention.

What is claimed is:

1. A smartphone comprising:

an antenna substrate having a first major surface and a second major surface facing away from the first major surface;

a first antenna pattern formed on the first major surface and comprising an inner conductive coil and an outer conductive coil surrounding the inner conductive coil, wherein the first major surface comprises a first central area surrounded by the inner conductive coil;

a second antenna pattern formed on the second major surface and comprising an inner pattern, an outer pattern, and an extension pattern, wherein the second major surface comprises a second central area surrounded by the inner pattern;

the inner pattern comprising a plurality of curved conductive lines and defining a radially-extending inner channel, wherein the plurality of curved conductive lines of the inner pattern does not extend into the radially-extending inner channel, wherein at least part of the curved conductive lines of the inner pattern overlaps the inner conductive coil formed on the first major surface and is electrically connected to the inner conductive coil through vias;

the outer pattern comprising a plurality of curved conductive lines and defining a radially-extending outer channel, wherein the plurality of curved conductive lines of the outer pattern does not extend into the radially-extending outer channel, wherein at least part of the curved conductive lines of the outer pattern overlaps the outer conductive coil formed on the first major surface and is electrically connected to the outer conductive coil through vias; and the extension pattern provided in the radially-extending inner channel and the radially-extending outer channel, wherein the extension pattern is connected to the inner pattern and the outer pattern to make the inner conductive coil and the outer conductive coil electrically connected in parallel for a wireless power transfer antenna.

2. The smartphone of claim 1, wherein at least some of the plurality of curved conductive lines of the inner pattern extend generally parallel to one another, wherein at least some of the plurality of curved conductive lines of the outer pattern extend generally parallel to one another.

3. The smartphone of claim 2, wherein the extension pattern comprises:

a first conductive extension line extending through at least part of the radially-extending outer channel but not extending through the radially-extending inner channel, and a second conductive extension line through the radially-extending outer channel and through at least part of the radially-extending inner channel.

4. The smartphone of claim 3, wherein the second antenna pattern comprises a central pattern in the central area, wherein the extension pattern further comprises a third conductive extension line and a fourth conductive extension line, wherein the third conductive extension line extends through both the radially-extending inner channel and the radially-extending outer channel, wherein the fourth conductive extension line extends through both the radially-extending inner channel and the radially-extending outer channel, and wherein the third conductive extension line and the fourth conductive extension line are electrically connected to the central pattern.

5. The smartphone of claim 4, wherein the first conductive extension line extends substantially straight in the radially-extending outer channel, wherein the second conductive extension line extends substantially straight in both the radially-extending inner channel and the radially-extending outer channel, wherein the third conductive extension line extends substantially straight through both the radially-extending inner channel and the radially-extending outer channel, and wherein the fourth conductive extension line extends substantially straight through both the radially-extending inner channel and the radially-extending outer channel.

6. The smartphone of claim 4, wherein the first conductive extension line is electrically connected to the outer conductive coil and also electrically connected to a first contact terminal, wherein the second conductive extension line is electrically connected to the inner conductive coil and also electrically connected to a second contact terminal.

7. The smartphone of claim 4, wherein the inner conductive coil comprises an inner end and an outer end, in which the outer end is located radially farther from the first central area than the inner end, wherein the first conductive extension line is electrically connected to inner end of the outer conductive coil and also electrically connected to a first contact terminal, wherein the second conductive extension line is electrically connected to the inner conductive coil and also electrically connected to a second contact terminal.

8. The smartphone of claim 4, wherein the outer conductive coil comprises an inner end and an outer end, in which the inner end is closer to the first central area than the outer end, wherein the first conductive extension line is electrically connected to the outer conductive coil and also electrically connected to a first contact terminal, wherein the second conductive extension line is electrically connected to the inner end of the inner conductive coil and also electrically connected to a second contact terminal.

9. The smartphone of claim 4, wherein the inner conductive coil comprises an inner end and an outer end, in which the inner end of the inner conductive coil is closer to the first central area than the outer end the inner conductive coil, wherein the outer conductive coil comprises an inner end and an outer end, in which the inner end of the outer conductive coil is closer to the first central area than the outer end the inner conductive coil, wherein the first conductive extension line is electrically connected to inner end of the outer conductive coil and also electrically connected to a first contact terminal, wherein the second conductive extension line is electrically connected to the inner end of the inner conductive coil and also electrically connected to a second contact terminal.

10. The smartphone of claim 9, wherein the inner conductive coil has a first number of turns between two ends thereof, wherein the outer conductive coil has a second number of turns between two ends thereof, wherein the first number is greater than the second number.

11. The smartphone of claim 9, wherein the inner conductive coil has, at least in part, a first line width, wherein the outer conductive coil has, at least in part, a second line width, wherein the second line width is greater than the first line width, wherein the inner conductive coil has a first number of turns between two ends thereof, wherein the outer conductive coil has a second number of turns between two ends thereof, wherein the first number is greater than the second number.

12. The smartphone of claim 9, wherein the inner conductive coil has, at least in part, a first line width, wherein the outer conductive coil has, at least in part, a second line width, wherein the second line width is greater than the first line width.

13. The smartphone of claim 9, wherein the radially-extending outer channel is wider than the radially-extending inner channel, wherein the radially-extending outer channel and the radially-extending inner channel are connected and aligned in a radial direction.

14. The smartphone of claim 4, wherein the inner conductive coil is hereinafter referred to as a first coil, wherein the outer conductive coil is hereinafter referred to as a second coil, wherein the first coil comprises a first inner end and a first outer end, wherein the second coil comprises a second inner end and a second outer end, wherein one of the first inner end and the first outer end is electrically coupled to one of the second inner end and the second outer end to provide parallel connection between the first coil and the second coil.

15. The smartphone of claim 14, wherein one of the first inner end and the first outer end is coupled to one of the second inner end and the second outer end to provide the parallel connection, wherein the other one of the first inner end and the first outer end is coupled to the other one of the second inner end and the second outer end to provide the parallel connection.

16. The smartphone of claim 4, wherein the smartphone further comprises another pattern formed on the second major surface and generally surrounding both the inner pattern and the outer pattern.

17. The smartphone of claim 4, wherein at least part of the curved conductive lines of the outer pattern generally surround at least part of the curved conductive lines of the inner pattern.

18. The smartphone of claim 4, further comprising:

a display module comprising a display surface;

a rear cover comprising a rear surface facing away from the display surface; and a battery placed between the display module and the rear cover, wherein the antenna substrate is placed between the battery and the rear cover, wherein at least one of the inner conductive coil and the outer conductive coil are configured for wireless battery charging.

19. The smartphone of claim 4, wherein at least part of the plurality of curved conductive lines of the inner pattern is generally parallel to one another.

20. The smartphone of claim 4, wherein at least part of the plurality of curved conductive lines of the inner pattern is generally concentric.

21. The smartphone of claim 4, wherein at least part of the plurality of curved conductive lines of the inner pattern is in a C shape.

22. The smartphone of claim 4, wherein the antenna substrate with the first antenna pattern and the second antenna pattern is in the form of a flexible printed circuit board.

23. The smartphone of claim 2, wherein the extension pattern comprises:

an inner extension line formed on the second major surface and extending through the radially-extending outer channel and further through at least part of the radially-extending inner channel; and an outer extension line formed on the second major surface and extending through at least part of the radially-extending outer channel.

24. The smartphone of claim 23, wherein the inner extension line and the outer extension line extend generally in parallel, and wherein each of the inner extension line and the outer extension line formed on the second major surface comprises a portion that overlaps the outer conductive coil formed on the first major surface.

25. The smartphone of claim 23, wherein the inner extension line is electrically connected to the inner conductive coil, wherein at least part of the curved conductive lines of the inner pattern is in a C shape.

26. The smartphone of claim 23, wherein the outer extension line is electrically connected to the outer conductive coil, wherein at least part of the curved conductive lines of the outer pattern is in a C shape.

27. The smartphone of claim 23, wherein at least one of the inner extension line and the outer extension line is electrically connected to the first antenna pattern formed on the first major surface through at least one via.

28. The smartphone of claim 23, wherein the inner extension line is referred to as a first inner extension line and is electrically connected to a first end of the inner conductive coil, wherein the smartphone further comprises a second inner extension line formed on the second major surface, wherein the second inner extension line is electrically connected to a second end of the inner conductive coil and extends through at least part of the radially-extending outer channel.

* * * * *